(12) United States Patent
Takimoto

(10) Patent No.: US 11,230,340 B2
(45) Date of Patent: Jan. 25, 2022

(54) LEANING VEHICLE

(71) Applicant: YAMAHA HATSUDOKI KABUSHIKI KAISHA, Iwata (JP)

(72) Inventor: Hiroshi Takimoto, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 41 days.

(21) Appl. No.: 16/701,954

(22) Filed: Dec. 3, 2019

(65) Prior Publication Data

US 2020/0102038 A1 Apr. 2, 2020

Related U.S. Application Data

(63) Continuation of application No. PCT/JP2018/030153, filed on Aug. 10, 2018.

(30) Foreign Application Priority Data

Sep. 4, 2017 (JP) .............................. JP2017-169542

(51) Int. Cl.
| | |
|---|---|
| B62K 5/10 | (2013.01) |
| B60G 13/00 | (2006.01) |
| B60G 21/00 | (2006.01) |
| B60G 21/05 | (2006.01) |
| B60W 30/04 | (2006.01) |
| B62D 9/02 | (2006.01) |

(Continued)

(52) U.S. Cl.
CPC .............. *B62K 5/10* (2013.01); *B60G 13/003* (2013.01); *B60G 21/007* (2013.01); *B60G 21/05* (2013.01); *B60W 30/04* (2013.01); *B62D 9/02* (2013.01); *B62K 5/027* (2013.01); *B62K 5/05* (2013.01); *B60G 2300/122* (2013.01); *B60G 2400/0511* (2013.01); *B60W 2030/043* (2013.01)

(58) Field of Classification Search
CPC .......... B62D 5/10; B62D 9/02; B60G 13/003; B60G 21/007; B60G 21/05; B60G 2300/122; B62K 5/027; B62K 5/05
See application file for complete search history.

(56) References Cited

U.S. PATENT DOCUMENTS

| | | |
|---|---|---|
| 4,360,224 A | 11/1982 | Sato et al. |
| 4,632,413 A * | 12/1986 | Fujita ....................... B60G 3/01 |
| | | 280/124.103 |
| 7,530,419 B2 | 5/2009 | Brudeli |

(Continued)

FOREIGN PATENT DOCUMENTS

| | | | | |
|---|---|---|---|---|
| EP | 1813450 A1 * | 8/2007 | ........... | B60G 21/007 |
| GB | 2155411 A * | 9/1985 | ............... | B62D 9/02 |

(Continued)

*Primary Examiner* — Paul N Dickson
*Assistant Examiner* — Caitlin Anne Miller
(74) *Attorney, Agent, or Firm* — Rabin & Berdo, P.C.

(57) ABSTRACT

In a leaning vehicle, a shock absorber tower is disposed further forward in a vehicle-body-frame frontward direction than an upper-left-arm-member supported part at which an upper-left arm member to which a first end part of a left shock absorber is connected is supported by the vehicle body frame, and an upper-right-arm-member supported part at which an upper-right arm member to which a first end part of a right shock absorber is connected is supported by the vehicle body frame.

14 Claims, 18 Drawing Sheets

(51) Int. Cl.
 *B62K 5/027* (2013.01)
 *B62K 5/05* (2013.01)

(56) References Cited

U.S. PATENT DOCUMENTS

| | | | |
|---|---|---|---|
| 7,648,148 B1 | 1/2010 | Mercier | |
| 8,070,172 B1 * | 12/2011 | Smith | B60G 11/08 |
| | | | 280/124.103 |
| 9,238,482 B2 * | 1/2016 | Huang | B60G 3/20 |
| 9,527,543 B2 * | 12/2016 | Mercier | B60G 15/062 |
| 9,994,277 B2 * | 6/2018 | Malphettes | B60G 3/20 |
| 10,737,720 B2 * | 8/2020 | Kanehara | B62K 5/027 |
| 2005/0206101 A1 * | 9/2005 | Bouton | B60G 21/007 |
| | | | 280/6.154 |
| 2007/0182120 A1 * | 8/2007 | Tonoli | B60G 21/007 |
| | | | 280/124.142 |
| 2011/0006498 A1 | 1/2011 | Mercier | |
| 2011/0215544 A1 * | 9/2011 | Rhodig | B62K 5/08 |
| | | | 280/124.103 |
| 2012/0181765 A1 | 7/2012 | Hill et al. | |

FOREIGN PATENT DOCUMENTS

| | | | | |
|---|---|---|---|---|
| JP | 2010-052666 A | 3/2010 | | |
| JP | 2017-095088 A | 6/2017 | | |
| WO | WO-2014201463 A2 * | 12/2014 | | B60G 13/005 |
| WO | WO-2015028767 A1 * | 3/2015 | | B62K 5/08 |
| WO | 2017/082424 A1 | 5/2017 | | |
| WO | WO-2017082425 A1 * | 5/2017 | | B62K 5/05 |

\* cited by examiner

LEANING VEHICLE

CROSS-REFERENCE TO RELATED APPLICATIONS

This application is a continuation of International Application PCT/JP2018/030153 filed on Aug. 10, 2018, which claims priority from Japanese Patent Application No. 2017-169542 filed on Sep. 4, 2017. The contents of each of the identified applications are entirely incorporated herein by reference.

BACKGROUND

Technical Field

The present invention relates to a leaning vehicle that includes a left wheel tire assembly and a right wheel tire assembly.

Background Art

Leaning vehicles disclosed in, for example, Patent Literature 1 to Patent Literature 5 (identified further on) are known as conventional leaning vehicles. The leaning vehicles disclosed in Patent Literature 1 to Patent Literature 5 include a vehicle body frame, a left wheel tire assembly, a right wheel tire assembly, a left shock absorber, a right shock absorber, a link mechanism and a shock absorber tower.

The link mechanism is a double wishbone-type link mechanism. The link mechanism includes a left arm mechanism and a right arm mechanism. The left arm mechanism swings in the vehicle-body-frame upward direction when the vehicle body frame leans in the leaning-vehicle leftward direction, and swings in the vehicle-body-frame downward direction when the vehicle body frame leans in the leaning-vehicle rightward direction. The left arm mechanism includes an upper-left arm member, a lower-left arm member and a left connection member. The upper-left arm member is supported by the vehicle body frame so as to rotate about an axis extending in the vehicle-body-frame front-back direction centering on a right part of the upper-left arm member. The lower-left arm member is disposed further downward in the vehicle-body-frame downward direction than the upper-left arm member. The lower-left arm member is supported by the vehicle body frame so as to rotate about an axis extending in the vehicle-body-frame front-back direction centering on a right part of the lower-left arm member. The left connection member is connected to a left part of the upper-left arm member, and to a left part of the lower-left arm member. The right arm mechanism swings in the vehicle-body-frame upward direction when the vehicle body frame leans in the leaning-vehicle rightward direction, and swings in the vehicle-body-frame downward direction when the vehicle body frame leans in the leaning-vehicle leftward direction. The right arm mechanism includes an upper-right arm member, a lower-right arm member and a right connection member. The upper-right arm member is supported by the vehicle body frame so as to rotate about an axis extending in the vehicle-body-frame front-back direction centering on a left part of the upper-right arm member. The lower-right arm member is disposed further downward in the vehicle-body-frame downward direction than the upper-right arm member. The lower-right arm member is supported by the vehicle body frame so as to rotate about an axis extending in the vehicle-body-frame front-back direction centering on a left part of the lower-right arm member. The right connection member is connected to a right part of the upper-right arm member, and to a right part of the lower-right arm member.

The left shock absorber has a cushioning action. A first end part of the left shock absorber is connected to the upper-left arm member or the lower-left arm member. A second end part of left shock absorber is connected to a top end part of the shock absorber tower that is described later. The right shock absorber has a cushioning action. A first end part of the right shock absorber is connected to the upper-right arm member or the lower-right arm member. The second end part of the right shock absorber is connected to the top end part of the shock absorber tower that is described later.

The shock absorber tower is supported by the vehicle body frame so as to rotate around a tower central shaft that extends in the vehicle-body-frame front-back direction. When the vehicle body frame is in an upright state, the shock absorber tower extends in the vehicle-body-frame upward direction from the tower central shaft.

The left wheel is rotatably supported by the left connection member. The right wheel tire assembly is rotatably supported by the right connection member.

CITATION LIST

Patent Literature

Patent Literature 1: U.S. Pat. No. 7,530,419
Patent Literature 2: U.S. Pat. No. 7,648,148
Patent Literature 3: U.S. Patent Application Publication No. 2007/0182120
Patent Literature 4: U.S. Patent Application Publication No. 2011/0006498
Patent Literature 5: International Application Publication No. WO 2017/082424

In the leaning vehicles disclosed in Patent Literature 1 to Patent Literature 5, the shock absorber tower has a structure described in either (a) or (b) which are described hereunder. In (a) and (b), a tower supported part is a portion at which the shock absorber tower is supported by the vehicle body frame. The upper-left-arm-member supported part is a portion at which the upper-left arm member is supported by the vehicle body frame. The upper-right-arm-member supported part is a portion at which the upper-right arm member is supported by the vehicle body frame. The lower-left-arm-member supported part is a portion at which the lower-left arm member is supported by the vehicle body frame. The lower-right-arm-member supported part is a portion at which the lower-right arm member is supported by the vehicle body frame.

(a)

The first end part of the left shock absorber is connected to the upper-left arm member.

The first end part of the right shock absorber is connected to the upper-right arm member.

The tower supported part is disposed at a position that is between a front end and a back end of the upper-left-arm-member supported part and between a front end and a back end of the upper-right-arm-member supported part.

(b)

The first end part of the left shock absorber is connected to the lower-left arm member.

The first end part of the right shock absorber is connected to the lower-right arm member.

The tower supported part is disposed at a position that is between a front end and a back end of the lower-left-arm-member supported part and between a front end and a back end of the lower-right-arm-member supported part.

As described above, in the leaning vehicles disclosed in Patent Literature 1 to Patent Literature 5, the tower supported part of the shock absorber tower is disposed between the front end and back end of arm-member supported parts (generic name for the upper-left-arm-member supported part, the lower-left-arm-member supported part, the upper-right-arm-member supported part and the lower-right-arm-member supported part) of arm members (generic name for the upper-left arm member, the lower-left arm member, the upper-right arm member and the lower-right arm member) to which the first end part of the shock absorbers (generic name for the left shock absorber and the right shock absorber) is connected. By this means, in the leaning vehicles disclosed in Patent Literature 1 to Patent Literature 5, as described hereunder, the size of a mechanism that includes a shock absorber tower and a link mechanism is reduced and the rigidity of a support mechanism for supporting the shock absorber tower in the vehicle body frame is enhanced.

A space in which it is difficult to interfere with the movable range of an arm member exists between the front end and back end of the arm-member supported part. Therefore, in the leaning vehicles disclosed in Patent Literature 1 to Patent Literature 5, the tower supported part is disposed between the front end and back end of an arm-member supported part of an arm member to which a shock absorber is connected. By this means, the space between the front end and back end of the arm-member supported part of the arm member is effectively utilized. As a result, a reduction in size of the mechanism including the shock absorber tower and the link mechanism is achieved.

Further, because a portion located between the front end and back end of an arm-member supported part in the vehicle body frame supports an arm member, such a portion has high rigidity. Therefore, a portion that is located between the front end and back end of an arm-member supported part in the vehicle body frame is suitable for supporting the shock absorber tower. As described above, in the leaning vehicles disclosed in Patent Literature 1 to Patent Literature 5, the size of the mechanism that includes the shock absorber tower and the link mechanism is reduced and the rigidity of the support mechanism for supporting the shock absorber tower in the vehicle body frame is also enhanced.

In this connection, in the leaning vehicles disclosed in Patent Literature 1 to Patent Literature 5, it is sometimes desired to change positions of tires in the vehicle body frame. However, because the left arm mechanism, the right arm mechanism and the shock absorber tower are designed to have a small size while also avoiding interference therebetween, the gaps between the shock absorber tower and the left arm mechanism and between the shock absorber tower and the right arm mechanism are small. Therefore, it is difficult to significantly change the respective shapes of the left arm mechanism, the right arm mechanism and the shock absorber tower. Consequently, it is necessary to change the positions at which the left arm mechanism and the right arm mechanism are mounted to the vehicle body frame, while maintaining the respective shapes of the left arm mechanism, the right arm mechanism and the shock absorber tower. In order to change the positions of the tires in the vehicle body frame, it has been necessary to change the length of the vehicle body frame in the vehicle-body-frame front-back direction. Consequently, in the leaning vehicles disclosed in Patent Literature 1 to Patent Literature 5, it has been difficult to increase the degree of freedom regarding the positions of the tires in the vehicle body frame.

SUMMARY OF THE INVENTION

Therefore, it is an object of the present invention to provide a leaning vehicle in which the degree of freedom regarding the positions of tires in the vehicle body frame can be increased while also reducing the size of a mechanism that includes a shock absorber tower and a link mechanism and maintaining the rigidity of a support mechanism for supporting the shock absorber tower in the vehicle body frame.

The inventors of the present application conducted detailed studies with respect to a leaning vehicle in which the degree of freedom regarding the positions of tires in the vehicle body frame can be increased while also reducing the size of a mechanism that includes a shock absorber tower and a link mechanism and maintaining the rigidity of a support mechanism for supporting the shock absorber tower in the vehicle body frame.

First, the inventors of the present application focused their attention on the characteristics of a shock absorber tower. A force that is applied to the shock absorber tower is mainly a tensile load. For example, when a left wheel tire assembly is caused to move in the vehicle-body-frame upward direction due to unevenness of the road surface, the left arm mechanism is caused to swing in the vehicle-body-frame upward direction. At such time, the left shock absorber contracts. Therefore, the left shock absorber pushes the shock absorber tower in the leaning-vehicle upper-right direction. By this means, the shock absorber tower is pulled in the upper-right direction. Further, when a right wheel tire assembly is caused to move in the vehicle-body-frame upward direction due to unevenness of the road surface, the right arm mechanism is caused to swing in the vehicle-body-frame upward direction. At such time, the right shock absorber contracts. Therefore, the right shock absorber pushes the shock absorber tower in the leaning-vehicle upper-left direction. By this means, the shock absorber tower is pulled in the upper-left direction.

As described above, mainly a tensile load is applied to the shock absorber tower, and it is difficult for a large bending load to be applied to the shock absorber tower. In general, in a bar-shaped member such as a shock absorber tower, it is easier to secure rigidity with respect to a tensile load than to secure rigidity with respect to a bending load. Therefore, it is easy to establish the function of the shock absorber tower even without increasing the rigidity of the shock absorber tower. Accordingly, the thickness in the vehicle-body-frame front-back direction of a shock absorber tower can be reduced.

If the thickness in the vehicle-body-frame front-back direction of the shock absorber tower is small, it suffices that a shaft (support mechanism for the shock absorber tower in the vehicle body frame) for supporting the shock absorber tower in the vehicle body frame be short. It is easier to obtain high rigidity with a short shaft in comparison to a long shaft. Thus, the shock absorber tower has a characteristic such that it is easy to secure the rigidity of the support mechanism for the shock absorber tower in the vehicle body frame. Based on the foregoing considerations, the inventors of the present application noticed that even if the shock absorber tower is supported at a portion other than a portion which is located between the front end and back end of an arm-member supported part in the vehicle body frame, the rigidity of the support mechanism for the shock absorber tower in the vehicle body frame is maintained.

Therefore, the inventors of the present application examined the feasibility of disposing the shock absorber tower further forward in the vehicle-body-frame frontward direction or further backward in the vehicle-body-frame backward direction than the arm-member supported part. As a result, as described hereunder, the inventors of the present application arrived at an idea whereby the size of the mechanism including the shock absorber tower and the link mechanism is reduced and the degree of freedom regarding the positions of the tires in the vehicle body frame is increased.

When the shock absorber tower is disposed further forward in the vehicle-body-frame frontward direction or further backward in the vehicle-body-frame backward direction than the arm-member supported part, the shock absorber tower is not supported at a portion located between the front end and back end of the arm-member supported part in the vehicle body frame. Therefore, the length between the front end and back end of the arm-member supported part can be reduced. Consequently, the inventors of the present application arrived at the idea that the size of the mechanism including the shock absorber tower and the link mechanism can be reduced even though a portion located between the front end and back end of the arm-member supported part in the vehicle body frame is not utilized to support the shock absorber tower.

In addition, when the shock absorber tower is disposed further forward in the vehicle-body-frame frontward direction or further backward in the vehicle-body-frame backward direction than the arm-member supported part, the movable range of the shock absorber tower is separated from the movable range of the left arm mechanism and movable range of the right arm mechanism in the vehicle-body-frame front-back direction. By this means, interference between the shock absorber tower and the left arm mechanism and right arm mechanism can be avoided comparatively easily. That is, with respect to the design of the left arm mechanism and the right arm mechanism, a restriction for preventing the interference between the shock absorber tower and the left arm mechanism and right arm mechanism is alleviated. As a result, the degree of design freedom with respect to the left arm mechanism and the right arm mechanism increases.

When the degree of design freedom with respect to the left arm mechanism and the right arm mechanism increases as described above, the degree of freedom with respect to the positional relation between the arm-member supported part and the left connection member and between the arm-member supported part and right connection member increases. As a result, the inventors of the present application arrived at the idea that, by devising a suitable modification for shape of the arm members, the degree of freedom regarding the positions of the tires in the vehicle body frame can be increased.

To solve the problem described above, the present invention adopts the following configurations.

(1) A leaning vehicle, including:

a vehicle body frame that leans in a leaning-vehicle leftward direction at a time of turning left, and leans in a leaning-vehicle rightward direction at a time of turning right;

a link mechanism including a left arm mechanism including: an upper-left arm member that is supported by the vehicle body frame so as to rotate about an axis extending in a vehicle-body-frame front-back direction centering on a right part of the upper-left arm member; a lower-left arm member that is disposed further downward in a vehicle-body-frame downward direction than the upper-left arm member and is supported by the vehicle body frame so as to rotate about an axis extending in the vehicle-body-frame front-back direction centering on a right part of the lower-left arm member; and a left connection member that is connected to a left part of the upper-left arm member and a left part of the lower-left arm member, wherein the left arm mechanism swings in a vehicle-body-frame upward direction when the vehicle body frame leans in the leaning-vehicle leftward direction and swings in the vehicle-body-frame downward direction when the vehicle body frame leans in the leaning-vehicle rightward direction; and a right arm mechanism including: an upper-right arm member that is supported by the vehicle body frame so as to rotate about an axis extending in the vehicle-body-frame front-back direction centering on a left part of the upper-right arm member; a lower-right arm member that is disposed further downward in the vehicle-body-frame downward direction than the upper-right arm member and is supported by the vehicle body frame so as to rotate about an axis extending in the vehicle-body-frame front-back direction centering on a left part of the lower-right arm member; and a right connection member that is connected to a right part of the upper-right arm member and a right part of the lower-right arm member, wherein the right arm mechanism swings in the vehicle-body-frame upward direction when the vehicle body frame leans in the leaning-vehicle rightward direction and swings in the vehicle-body-frame downward direction when the vehicle body frame leans in the leaning-vehicle leftward direction;

a left shock absorber having a cushioning action, with a first end part of the left shock absorber being connected to the left arm mechanism;

a right shock absorber having a cushioning action, with a first end part of the right shock absorber being connected to the right arm mechanism;

a shock absorber tower to which a second end part of the left shock absorber and a second end part of the right shock absorber are connected, the shock absorber tower being supported by the vehicle body frame so as to rotate around a tower central shaft that extends in the vehicle-body-frame front-back direction, the shock absorber tower having a shape in which, when the vehicle body frame is in an upright state, a distance in a vehicle-body-frame up-down direction between the tower central shaft and the second end part of the left shock absorber or the second end part of the right shock absorber is longer than a distance in a vehicle-body-frame left-right direction between the second end part of the left shock absorber and the second end part of the right shock absorber;

a left wheel tire assembly that is rotatably supported by the left connection member; and a right wheel tire assembly that is rotatably supported by the right connection member, wherein the leaning vehicle has a structure of (A) or (B):

(A)

the shock absorber tower is disposed further forward in a vehicle-body-frame frontward direction or further backward in a vehicle-body-frame backward direction than an upper-left-arm-member supported part at which the upper-left arm member to which the first end part of the left shock absorber is connected is supported by the vehicle body frame, and than an upper-right-arm-member supported part at which the upper-right arm member to which the first end part of the right shock absorber is connected is supported by the vehicle body frame; or (B) the shock absorber tower is disposed further forward in the vehicle-body-frame frontward direction or further backward in the vehicle-body-frame backward direction than a lower-left-arm-member supported part at which the lower-left arm member to which the first end part of the left shock absorber is connected is supported by the vehicle body frame, and than a lower-right-arm-member supported part at which the lower-right arm member to which the first end part of the right shock absorber is connected is supported by the vehicle body frame.

According to the leaning vehicle of (1), the rigidity of the support mechanism for supporting the shock absorber tower can be maintained. A tensile load is mainly applied to the shock absorber tower, and it is difficult for a large bending load to be applied to the shock absorber tower. In general, it is easier to secure rigidity with respect to a tensile load than to secure rigidity with respect to a bending load. Therefore, it is easy to establish the function of the shock absorber tower even without increasing the rigidity of the shock absorber tower. Accordingly, a thickness in the vehicle-body-frame front-back direction of the shock absorber tower can be reduced.

If the thickness in the vehicle-body-frame front-back direction of the shock absorber tower is small, it suffices that a shaft (support mechanism for the shock absorber tower in the vehicle body frame) for supporting the shock absorber tower in the vehicle body frame be short. It is easier to obtain high rigidity with a short shaft in comparison to a long shaft. Thus, the shock absorber tower has a characteristic such that it is easy to secure the rigidity of the support mechanism for the shock absorber tower in the vehicle body frame. Therefore, in a case where the leaning vehicle of (1) has the structure of (A), even if the shock absorber tower is supported at a portion other than a portion located between the front end and back end of the upper-left-arm-member supported part and a portion located between the front end and back end of the upper-right-arm-member supported part in the vehicle body frame, the rigidity of the support mechanism for the shock absorber tower in the vehicle body frame is maintained. Further, in a case where the leaning vehicle of (1) has the structure of (B), even if the shock absorber tower is supported at a portion other than a portion located between the front end and back end of the lower-left-arm-member supported part and a portion located between the front end and back end of the lower-right-arm-member supported part in the vehicle body frame, the rigidity of the support mechanism for the shock absorber tower in the vehicle body frame is maintained.

Furthermore, according to the leaning vehicle of (1), the mechanism including the shock absorber tower and the link mechanism is reduced in size. More specifically, in a case where the leaning vehicle of (1) has the structure of (A), the shock absorber tower is disposed further forward in the vehicle-body-frame frontward direction or further backward in the vehicle-body-frame backward direction than the upper-left-arm-member supported part at which the upper-left arm member to which the first end part of the left shock absorber is connected is supported by the vehicle body frame, and the upper-right-arm-member supported part at which the upper-right arm member to which the first end part of the right shock absorber is connected is supported by the vehicle body frame. Thus, the shock absorber tower is not supported at a portion that is located between the front end and back end of the upper-left-arm-member supported part and a portion that is located between the front end and back end of the upper-right-arm-member supported part in the vehicle body frame. Therefore, a length between the front end and the back end of the upper-left-arm-member supported part and a length between the front end and the back end of the upper-right-arm-member supported part can be reduced.

In general, a length between the front end and back end of the upper-left-arm-member supported part of the upper-left arm member to which the first end part of the left shock absorber is connected is equal to or longer than the length between the front end and back end of the lower-left-arm-member supported part of the lower-left arm member to which the first end part of the left shock absorber is not connected. Similarly, a length between the front end and back end of the upper-right-arm-member supported part of the upper-right arm member to which the first end part of the right shock absorber is connected is equal to or longer than the length between the front end and back end of the lower-right-arm-member supported part of the lower-right arm member to which the first end part of the right shock absorber is not connected. Hence, the length of the link mechanism in the vehicle-body-frame front-back direction depends greatly on the length between the front end and back end of the upper-left-arm-member supported part and the length between the front end and back end of the upper-right-arm-member supported part. Therefore, if the length between the front end and back end of the upper-left-arm-member supported part and the length between the front end and back end of the upper-right-arm-member supported part can be made smaller, the length of the link mechanism in the vehicle-body-frame front-back direction can be shortened. As a result, a reduction in size of the mechanism including the shock absorber tower and the link mechanism is achieved irrespective of the fact that a portion located between the front end and back end of the upper-left-arm-member supported part and a portion located between the front end and back end of the upper-right-arm-member supported part in the vehicle body frame are not utilized to support the shock absorber tower.

Further, in a case where the leaning vehicle of (1) has the structure of (B), the shock absorber tower is disposed further forward in the vehicle-body-frame frontward direction or further backward in the vehicle-body-frame backward direction than the lower-left-arm-member supported part at which the lower-left arm member to which the first end part of the left shock absorber is connected is supported by the vehicle body frame, and the lower-right-arm-member supported part at which the lower-right arm member to which the first end part of the right shock absorber is connected is supported by the vehicle body frame. Thus, the shock absorber tower is not supported at a portion that is located between the front end and back end of the lower-left-arm-member supported part and a portion located between the front end and back end of the lower-right-arm-member supported part in the vehicle body frame. Therefore, a length between the front end and the back end of the lower-left-arm-member supported part and a length between the front end and the back end of the lower-right-arm-member supported part can be reduced.

In general, a length between the front end and back end of the lower-left-arm-member supported part of the lower-left arm member to which the first end part of the left shock absorber is connected is equal to or longer than the length of a length between the front end and back end of the upper-left-arm-member supported part of the upper-left arm member to which the first end part of the left shock absorber is not connected. Similarly, a length between the front end and back end of the lower-right-arm-member supported part of the lower-right arm member to which the first end part of the right shock absorber is connected is equal to or longer than the length between the front end and back end of the upper-right-arm-member supported part of the upper-right arm member to which the first end part of the right shock absorber is not connected. Hence, the length of the link mechanism in the vehicle-body-frame front-back direction depends greatly on the length between the front end and back end of the lower-left-arm-member supported part and the length between the front end and back end of the lower-right-arm-member supported part. Therefore, if the length between the front end and back end of the lower-left-arm-member supported part and the length between the front end and back end of the lower-right-arm-member supported part can be made smaller, the length of the link mechanism in the vehicle-body-frame front-back direction can be shortened. As a result, a reduction in size of the mechanism including the shock absorber tower and the link mechanism is achieved irrespective of the fact that a portion located between the front end and back end of the lower-left-arm-member supported part and a portion located between the front end and back end of the lower-right-arm-member supported part in the vehicle body frame are not utilized to support the shock absorber tower.

Furthermore, according to the leaning vehicle of (1), the degree of freedom regarding the positions of the tires in the vehicle body frame can be increased. More specifically, in a case where the leaning vehicle of (1) has the structure of (A), the shock absorber tower is disposed further forward in the vehicle-body-frame frontward direction or further backward in the vehicle-body-frame backward direction than the upper-left-arm-member supported part at which the upper-left arm member to which the first end part of the left shock absorber is connected is supported by the vehicle body frame, and the upper-right-arm-member supported part at which the upper-right arm member to which the first end part of the right shock absorber is connected is supported by the vehicle body frame. In a case where the leaning vehicle of (1) has the structure of (B), the shock absorber tower is disposed further forward in the vehicle-body-frame frontward direction or further backward in the vehicle-body-frame backward direction than the lower-left-arm-member supported part at which the lower-left arm member to which the first end part of the left shock absorber is connected is supported by the vehicle body frame, and the lower-right-arm-member supported part at which the lower-right arm member to which the first end part of the right shock absorber is connected is supported by the vehicle body frame. By this means, the movable range of the shock absorber tower is separated from the movable range of the left arm mechanism and movable range of the right arm mechanism in the vehicle-body-frame front-back direction. Therefore, interference between the shock absorber tower and the left arm mechanism and interference between the shock absorber tower and the right arm mechanism can be avoided comparatively easily. That is, with respect to the design of the left arm mechanism and the right arm mechanism, a restriction for preventing the interference between the shock absorber tower and the left arm mechanism and the interference between the shock absorber tower and the right arm mechanism is alleviated. As a result, the degree of design freedom with respect to the left arm mechanism and the right arm mechanism increases.

When the degree of design freedom with respect to the left arm mechanism and the right arm mechanism increases as described above, the degree of freedom with respect to the positional relation between the upper-left-arm-member supported part and the left connection member and between lower-left-arm-member supported part and the left connection member as well as the degree of freedom with respect to the positional relation between the upper-right-arm-member supported part the right connection member and between lower-right-arm-member supported part and the right connection member increases. As a result, the shape of the arm members can be suitably modified and the degree of freedom regarding the positions of the tires in the vehicle body frame can be increased.

A leaning vehicle of (2) is configured in accordance with the leaning vehicle of (1), wherein:

the leaning vehicle has the structure of (A);

a length in the vehicle-body-frame front-back direction between a front end of the upper-left-arm-member supported part and a back end of the upper-left-arm-member supported part is shorter than a radius of a tire of the left wheel tire assembly; and a length in the vehicle-body-frame front-back direction between a front end of the upper-right-arm-member supported part and a back end of the upper-right-arm-member supported part is shorter than a radius of a tire of the right wheel tire assembly.

According to the leaning vehicle of (2), a reduction in size of the mechanism including the shock absorber tower and the link mechanism is achieved. More specifically, in general, a length between the front end and back end of the upper-left-arm-member supported part of the upper-left arm member to which the first end part of the left shock absorber is connected is equal to or longer than the length between the front end and back end of the lower-left-arm-member supported part of the lower-left arm member to which the first end part of the left shock absorber is not connected. Similarly, a length between the front end and back end of the upper-right-arm-member supported part of the upper-right arm member to which the first end part of the right shock absorber is connected is equal to or longer than the length between the front end and back end of the lower-right-arm-member supported part of the lower-right arm member to which the first end part of the right shock absorber is not connected. Hence, the length of the link mechanism in the vehicle-body-frame front-back direction depends greatly on the length between the front end and back end of the upper-left-arm-member supported part and the length between the front end and back end of the upper-right-arm-member supported part. Therefore, in the leaning vehicle of (2), the length in the vehicle-body-frame front-back direction between the front end of the upper-left-arm-member supported part and the back end of the upper-left-arm-member supported part is shorter than the radius of the tire of the left wheel tire assembly, and the length in the vehicle-body-frame front-back direction between the front end of the upper-right-arm-member supported part and the back end of the upper-right-arm-member supported part is shorter than the radius of the tire of the right wheel tire assembly. By this means, the length in the vehicle-body-frame front-back direction between the front end of the upper-left-arm-member supported part and the back end of the upper-left-arm-member supported part, and the length in the vehicle-body-frame front-back direction between the front end of the upper-right-arm-member supported part and the back end of the upper-right-arm-member supported part are shortened. As a result, a reduction in size of the mechanism including the shock absorber tower and the link mechanism is achieved.

A leaning vehicle of (3) is configured in accordance with the leaning vehicle of (1), wherein:

the leaning vehicle has the structure of (B);

a length in the vehicle-body-frame front-back direction between a front end of the lower-left-arm-member supported part and a back end of the lower-left-arm-member supported part is shorter than a radius of a tire of the left wheel tire assembly; and a length in the vehicle-body-frame front-back direction between a front end of the lower-right-arm-member supported part and a back end of the lower-right-arm-member supported part is shorter than a radius of a tire of the right wheel tire assembly.

According to the leaning vehicle of (3), a reduction in size of the mechanism including the shock absorber tower and the link mechanism is achieved. More specifically, in general, a length between the front end and back end of the lower-left-arm-member supported part of the lower-left arm member to which the first end part of the left shock absorber is connected is equal to or longer than the length between the front end and back end of the upper-left-arm-member supported part of the upper-left arm member to which the first end part of the left shock absorber is not connected. Similarly, a length between the front end and back end of the lower-right-arm-member supported part of the lower-right arm member to which the first end part of the right shock absorber is connected is equal to or longer than the length between the front end and back end of the upper-right-arm-member supported part of the upper-right arm member to which the first end part of the right shock absorber is not connected. Hence, the length of the link mechanism in the vehicle-body-frame front-back direction depends greatly on the length between the front end and back end of the lower-left-arm-member supported part and the length between the front end and back end of the lower-right-arm-member supported part. Therefore, in the leaning vehicle of (3), the length in the vehicle-body-frame front-back direction between the front end of the lower-left-arm-member supported part and the back end of the lower-left-arm-member supported part is shorter than the radius of the tire of the left wheel tire assembly, and the length in the vehicle-body-frame front-back direction between the front end of the lower-right-arm-member supported part and the back end of the lower-right-arm-member supported part is shorter than the radius of the tire of the right wheel tire assembly. By this means, the length in the vehicle-body-frame front-back direction between the front end of the lower-left-arm-member supported part and the back end of the lower-left-arm-member supported part, and the length in the vehicle-body-frame front-back direction between the front end of the lower-right-arm-member supported part and the back end of the lower-right-arm-member supported part are shortened. As a result, a reduction in size of the mechanism including the shock absorber tower and the link mechanism is achieved.

A leaning vehicle of (4) is configured in accordance with the leaning vehicle of (1), wherein:

the leaning vehicle has the structure of (A);

a length in the vehicle-body-frame front-back direction between a front end of the upper-left-arm-member supported part and a back end of the upper-left-arm-member supported part is shorter than a diameter of a wheel of the left wheel tire assembly; and a length in the vehicle-body-frame front-back direction between a front end of the upper-right-arm-member supported part and a back end of the upper-right-arm-member supported part is shorter than a diameter of a wheel of the right wheel tire assembly.

According to the leaning vehicle of (4), a reduction in size of the mechanism including the shock absorber tower and the link mechanism is achieved. More specifically, in general, a length between the front end and back end of the upper-left-arm-member supported part of the upper-left arm member to which the first end part of the left shock absorber is connected is equal to or longer than the length between the front end and back end of the lower-left-arm-member supported part of the lower-left arm member to which the first end part of the left shock absorber is not connected. Similarly, a length between the front end and back end of the upper-right-arm-member supported part of the upper-right arm member to which the first end part of the right shock absorber is connected is equal to or longer than the length between the front end and back end of the lower-right-arm-member supported part of the lower-right arm member to which the first end part of the right shock absorber is not connected. Hence, the length of the link mechanism in the vehicle-body-frame front-back direction depends greatly on the length between the front end and back end of the upper-left-arm-member supported part and the length between the front end and back end of the upper-right-arm-member supported part. Therefore, in the leaning vehicle of (4), the length in the vehicle-body-frame front-back direction between the front end of the upper-left-arm-member supported part and the back end of the upper-left-arm-member supported part is shorter than the diameter of the wheel of the left wheel tire assembly, and the length in the vehicle-body-frame front-back direction between the front end of the upper-right-arm-member supported part and the back end of the upper-right-arm-member supported part is shorter than the diameter of the wheel of the right wheel tire assembly. By this means, the length in the vehicle-body-frame front-back direction between the front end of the upper-left-arm-member supported part and the back end of the upper-left-arm-member supported part, and the length in the vehicle-body-frame front-back direction between the front end of the upper-right-arm-member supported part and the back end of the upper-right-arm-member supported part are shortened. As a result, a reduction in size of the mechanism including the shock absorber tower and the link mechanism is achieved.

A leaning vehicle of (5) is configured in accordance with the leaning vehicle of (1), wherein:

the leaning vehicle has the structure of (B);

a length in the vehicle-body-frame front-back direction between a front end of the lower-left-arm-member supported part and a back end of the lower-left-arm-member supported part is shorter than the diameter of the wheel of the left wheel tire assembly; and a length in the vehicle-body-frame front-back direction between a front end of the lower-right-arm-member supported part and a back end of the lower-right-arm-member supported part is shorter than the diameter of the wheel of the right wheel tire assembly.

According to the leaning vehicle of (5), a reduction in size of the mechanism including the shock absorber tower and the link mechanism is achieved. More specifically, in general, a length between the front end and back end of the lower-left-arm-member supported part of the lower-left arm member to which the first end part of the left shock absorber is connected is equal to or longer than the length between the front end and back end of the upper-left-arm-member supported part of the upper-left arm member to which the first end part of the left shock absorber is not connected. Similarly, a length between the front end and back end of the lower-right-arm-member supported part of the lower-right arm member to which the first end part of the right shock absorber is connected is equal to or longer than the length between the front end and back end of the upper-right-arm-member supported part of the upper-right arm member to which the first end part of the right shock absorber is not connected. Hence, the length of the link mechanism in the vehicle-body-frame front-back direction depends greatly on the length between the front end and back end of the lower-left-arm-member supported part and the length between the front end and back end of the lower-right-arm-member supported part. Therefore, in the leaning vehicle of (5), the length in the vehicle-body-frame front-back direction between the front end of the lower-left-arm-member supported part and the back end of the lower-left-arm-member supported part is shorter than the diameter of the wheel of the left wheel tire assembly, and the length in the vehicle-body-frame front-back direction between the front end of the lower-right-arm-member supported part and the back end of the lower-right-arm-member supported part is shorter than the diameter of the wheel of the right wheel tire assembly. By this means, the length in the vehicle-body-frame front-back direction between the front end of the lower-left-arm-member supported part and the back end of the lower-left-arm-member supported part, and the length in the vehicle-body-frame front-back direction between the front end of the lower-right-arm-member supported part and the back end of the lower-right-arm-member supported part are shortened. As a result, a reduction in size of the mechanism including the shock absorber tower and the link mechanism is achieved.

A leaning vehicle of (6) is configured in accordance with the leaning vehicle of (1), wherein:

the leaning vehicle has the structure of (A);

a length in the vehicle-body-frame front-back direction between a front end of the upper-left-arm-member supported part and a back end of the upper-left-arm-member supported part is shorter than a length equivalent to three times a diameter of the left shock absorber; and a length in the vehicle-body-frame front-back direction between a front end of the upper-right-arm-member supported part and a back end of the upper-right-arm-member supported part is shorter than a length equivalent to three times a diameter of the right shock absorber.

According to the leaning vehicle of (6), a reduction in size of the mechanism including the shock absorber tower and the link mechanism is achieved. More specifically, in general, a length between the front end and back end of the upper-left-arm-member supported part of the upper-left arm member to which the first end part of the left shock absorber is connected is equal to or longer than the length between the front end and back end of the lower-left-arm-member supported part of the lower-left arm member to which the first end part of the left shock absorber is not connected. Similarly, a length between the front end and back end of the upper-right-arm-member supported part of the upper-right arm member to which the first end part of the right shock absorber is connected is equal to or longer than the length between the front end and back end of the lower-right-arm-member supported part of the lower-right arm member to which the first end part of the right shock absorber is not connected. Hence, the length of the link mechanism in the vehicle-body-frame front-back direction depends greatly on the length between the front end and back end of the upper-left-arm-member supported part and the length between the front end and back end of the upper-right-arm-member supported part. Therefore, in the leaning vehicle of (6), the length in the vehicle-body-frame front-back direction between the front end of the upper-left-arm-member supported part and the back end of the upper-left-arm-member supported part is shorter than a length equivalent to three times the diameter of the left shock absorber, and the length in the vehicle-body-frame front-back direction between the front end of the upper-right-arm-member supported part and the back end of the upper-right-arm-member supported part is shorter than a length equivalent to three times the diameter of the right shock absorber. By this means, the length in the vehicle-body-frame front-back direction between the front end of the upper-left-arm-member supported part and the back end of the upper-left-arm-member supported part, and the length in the vehicle-body-frame front-back direction between the front end of the upper-right-arm-member supported part and the back end of the upper-right-arm-member supported part are shortened. As a result, a reduction in size of the mechanism including the shock absorber tower and the link mechanism is achieved.

A leaning vehicle of (7) is configured in accordance with the leaning vehicle of (1), wherein:

the leaning vehicle has the structure of (B);

a length in the vehicle-body-frame front-back direction between a front end of the lower-left-arm-member supported part and a back end of the lower-left-arm-member supported part is shorter than a length equivalent to three times the diameter of the left shock absorber; and a length in the vehicle-body-frame front-back direction between a front end of the lower-right-arm-member supported part and a back end of the lower-right-arm-member supported part is shorter than a length equivalent to three times the diameter of the right shock absorber.

According to the leaning vehicle of (7), a reduction in size of the mechanism including the shock absorber tower and the link mechanism is achieved. More specifically, in general, a length between the front end and back end of the lower-left-arm-member supported part of the lower-left arm member to which the first end part of the left shock absorber is connected is equal to or longer than the length between the front end and back end of the upper-left-arm-member supported part of the upper-left arm member to which the first end part of the left shock absorber is not connected. Similarly, a length between the front end and back end of the lower-right-arm-member supported part of the lower-right arm member to which the first end part of the right shock absorber is connected is equal to or longer than the length between the front end and back end of the upper-right-arm-member supported part of the upper-right arm member to which the first end part of the right shock absorber is not connected. Hence, the length of the link mechanism in the vehicle-body-frame front-back direction depends greatly on the length between the front end and back end of the lower-left-arm-member supported part and the length between the front end and back end of the lower-right-arm-member supported part. Therefore, in the leaning vehicle of (7), the length in the vehicle-body-frame front-back direction between the front end of the lower-left-arm-member supported part and the back end of the lower-left-arm-member supported part is shorter than a length equivalent to three times the diameter of the left shock absorber, and the length in the vehicle-body-frame front-back direction between the front end of the lower-right-arm-member supported part and the back end of the lower-right-arm-member supported part is shorter than a length equivalent to three times the diameter of the right shock absorber. By this means, the length in the vehicle-body-frame front-back direction between the front end of the lower-left-arm-member supported part and the back end of the lower-left-arm-member supported part, and the length in the vehicle-body-frame front-back direction between the front end of the lower-right-arm-member supported part and the back end of the lower-right-arm-member supported part are shortened. As a result, a reduction in size of the mechanism including the shock absorber tower and the link mechanism is achieved.

A leaning vehicle of (8) is configured in accordance with the leaning vehicle of (1), wherein:

the leaning vehicle has the structure of (A);

the upper-left arm member extends continuously in the vehicle-body-frame front-back direction between a front end of the upper-left-arm-member supported part and a back end of the upper-left-arm-member supported part; and the upper-right arm member extends continuously in the vehicle-body-frame front-back direction between a front end of the upper-right-arm-member supported part and a back end of the upper-right-arm-member supported part.

According to the leaning vehicle of (8), a first end of the left shock absorber is connected to the upper-left arm member. Since a large force is applied from the left shock absorber to the upper-left-arm-member supported part, the upper-left-arm-member supported part is required to have high rigidity. Therefore, in the leaning vehicle of (8), the upper-left arm member extends continuously in the vehicle-body-frame front-back direction between the front end and back end of the upper-left-arm-member supported part. Thus, there is no discontinuity between the front end and back end of the upper-left-arm-member supported part. As a result, the rigidity of the upper-left-arm-member supported part is enhanced. Further, a first end of the right shock absorber is connected to the upper-right arm member. Since a large force is applied from the right shock absorber to the upper-right-arm-member supported part, the upper-right-arm-member supported part is required to have high rigidity. Therefore, in the leaning vehicle of (8), the upper-right arm member extends continuously in the vehicle-body-frame front-back direction between the front end and back end of the upper-right-arm-member supported part. Thus, there is no discontinuity between the front end and back end of the upper-right-arm-member supported part. As a result, the rigidity of the upper-right-arm-member supported part is enhanced.

A leaning vehicle of (9) is configured in accordance with the leaning vehicle of (1), wherein:

the leaning vehicle has the structure of (B);

the lower-left arm member extends continuously in the vehicle-body-frame front-back direction between a front end of the lower-left-arm-member supported part and a back end of the lower-left-arm-member supported part; and the lower-right arm member extends continuously in the vehicle-body-frame front-back direction between a front end of the lower-right-arm-member supported part and a back end of the lower-right-arm-member supported part.

According to the leaning vehicle of (9), the first end of the left shock absorber is connected to the lower-left arm member. Since a large force is applied from the left shock absorber to the lower-left-arm-member supported part, the lower-left-arm-member supported part is required to have high rigidity. Therefore, in the leaning vehicle of (9), the lower-left arm member extends continuously in the vehicle-body-frame front-back direction between the front end and back end of the lower-left-arm-member supported part. Thus, there is no discontinuity between the front end and back end of the lower-left-arm-member supported part. As a result, the rigidity of the lower-left-arm-member supported part is enhanced. Further, a first end of the right shock absorber is connected to the lower-right arm member. Since a large force is applied from the right shock absorber to the lower-right-arm-member supported part, the lower-right-arm-member supported part is required to have high rigidity. Therefore, in the leaning vehicle of (9), the lower-right arm member extends continuously in the vehicle-body-frame front-back direction between the front end and back end of the lower-right-arm-member supported part. Thus, there is no discontinuity between the front end and back end of the lower-right-arm-member supported part. As a result, the rigidity of the lower-right-arm-member supported part is enhanced.

A leaning vehicle of (10) is configured in accordance with the leaning vehicle of (1), wherein:

the leaning vehicle has the structure of (A); and the vehicle body frame includes an up-down frame part that extends in the vehicle-body-frame up-down direction between the shock absorber tower and a back end of the upper-left-arm-member supported part and between the shock absorber tower and a back end of the upper-right-arm-member supported part.

According to the leaning vehicle of (10), the first end of the left shock absorber is connected to the upper-left arm member. Since a large force is applied from the left shock absorber to the upper-left-arm-member supported part, a portion that supports the upper-left-arm-member supported part in the vehicle body frame is required to have high rigidity. Therefore, in the leaning vehicle of (10), the vehicle body frame includes an up-down frame part that extends in the vehicle-body-frame up-down direction between the back end of the upper-left-arm-member supported part and the shock absorber tower. By this means, the back end of the upper-left-arm-member supported part is supported by the up-down frame part, and the support structure of the upper-left-arm-member supported part thus has high rigidity. The first end of the right shock absorber is connected to the upper-right arm member. Since a large force is applied from the right shock absorber to the upper-right-arm-member supported part, a portion that supports the upper-right-arm-member supported part in the vehicle body frame is required to have high rigidity. Therefore, in the leaning vehicle of (10), the vehicle body frame includes an up-down frame part that extends in the vehicle-body-frame up-down direction between the back end of the upper-right-arm-member supported part and the shock absorber tower. By this means, the back end of the upper-right-arm-member supported part is supported by the up-down frame part, and the support structure of the upper-right-arm-member supported part thus has high rigidity.

A leaning vehicle of (11) is configured in accordance with the leaning vehicle of (1), wherein:

the leaning vehicle has the structure of (B); and the vehicle body frame includes the up-down frame part that extends in the vehicle-body-frame up-down direction between the shock absorber tower and a back end of the lower-left-arm-member supported part and between the shock absorber tower and a back end of the lower-right-arm-member supported part.

According to the leaning vehicle of (11), the first end of the left shock absorber is connected to the lower-left arm member. Since a large force is applied from the left shock absorber to the lower-left-arm-member supported part, a portion that supports the lower-left-arm-member supported part in the vehicle body frame is required to have high rigidity. Therefore, in the leaning vehicle of (11), the vehicle body frame includes an up-down frame part that extends in the vehicle-body-frame up-down direction between the back end of the lower-left-arm-member supported part and the shock absorber tower. By this means, the back end of the lower-left-arm-member supported part is supported by the up-down frame part, and the support structure of the lower-left-arm-member supported part thus has high rigidity. The first end of the right shock absorber is connected to the lower-right arm member. Since a large force is applied from the right shock absorber to the lower-right-arm-member supported part, a portion that supports the lower-right-arm-member supported part in the vehicle body frame is required to have high rigidity. Therefore, in the leaning vehicle of (11), the vehicle body frame includes the up-down frame part that extends in the vehicle-body-frame up-down direction between the back end of the lower-right-arm-member supported part and the shock absorber tower. By this means, the back end of the lower-right-arm-member supported part is supported by the up-down frame part, and the support structure of the lower-right-arm-member supported part thus has high rigidity.

A leaning vehicle of (12) is configured in accordance with the leaning vehicle of (1), the leaning vehicle further including:

an actuator that generates a force which causes the vehicle body frame to lean in the leaning-vehicle leftward direction at the time of turning left, and generates a force which causes the vehicle body frame to lean in the leaning-vehicle rightward direction at the time of turning right.

According to the leaning vehicle of (12), in a leaning vehicle that includes an actuator also, the degree of freedom regarding the positions of the tires in the vehicle body frame can be increased while also reducing the size of the mechanism including the shock absorber tower and the link mechanism and maintaining the rigidity of the support mechanism for the shock absorber tower in the vehicle body frame.

A leaning vehicle of (13) is configured in accordance with the leaning vehicle of (1), wherein:

the leaning vehicle does not further include an actuator that generates a force which causes the vehicle body frame to lean in the leaning-vehicle leftward direction at the time of turning left, and generates a force which causes the vehicle body frame to lean in the leaning-vehicle rightward direction at the time of turning right.

According to the leaning vehicle of (13), in a leaning vehicle that does not include an actuator also, the degree of freedom regarding the positions of the tires in the vehicle body frame can be increased while also reducing the size of the mechanism including the shock absorber tower and the link mechanism and maintaining the rigidity of the support mechanism for the shock absorber tower in the vehicle body frame.

A leaning vehicle of (14) is configured in accordance with the leaning vehicle of (1), wherein:

a part of the vehicle body frame which is plate-shaped that extends in the vehicle-body-frame up-down direction is provided between the upper-left-arm-member supported part and the upper-right-arm-member supported part, and between the lower-left-arm-member supported part and the lower-right-arm-member supported part.

According to the leaning vehicle of (14), the rigidity of the vehicle body frame that supports the link mechanism is maintained.

The aforementioned objects and other objects, features, aspects and advantages of the present invention will become more apparent from the following detailed description of embodiments of the present invention that are described in association with the attached drawings.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components and/or groups thereof.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the invention, it will be understood that a number of techniques and steps are disclosed. Each of these have individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for the purpose of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

Advantageous Effects of Invention

According to the present invention, the degree of freedom regarding the positions of tires in a vehicle body frame can be increased while also reducing the size of a mechanism including a shock absorber tower and a link mechanism and maintaining the rigidity of a support mechanism for the shock absorber tower in the vehicle body frame.

DETAILED DESCRIPTION

Embodiment

[Overall Configuration]

Figure 1:
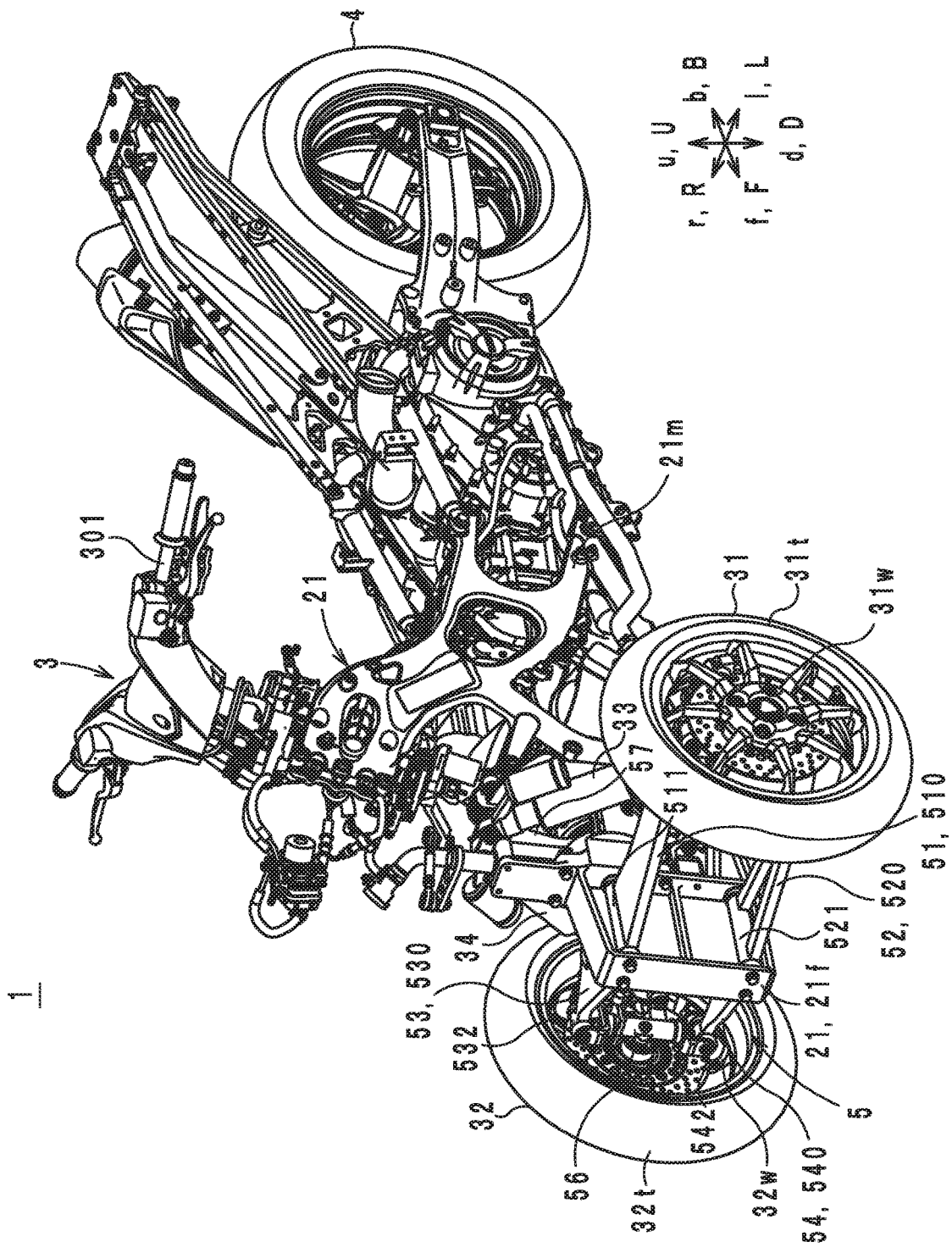
FIG. 1 is a perspective view of a leaning vehicle 1.
Figure 2:
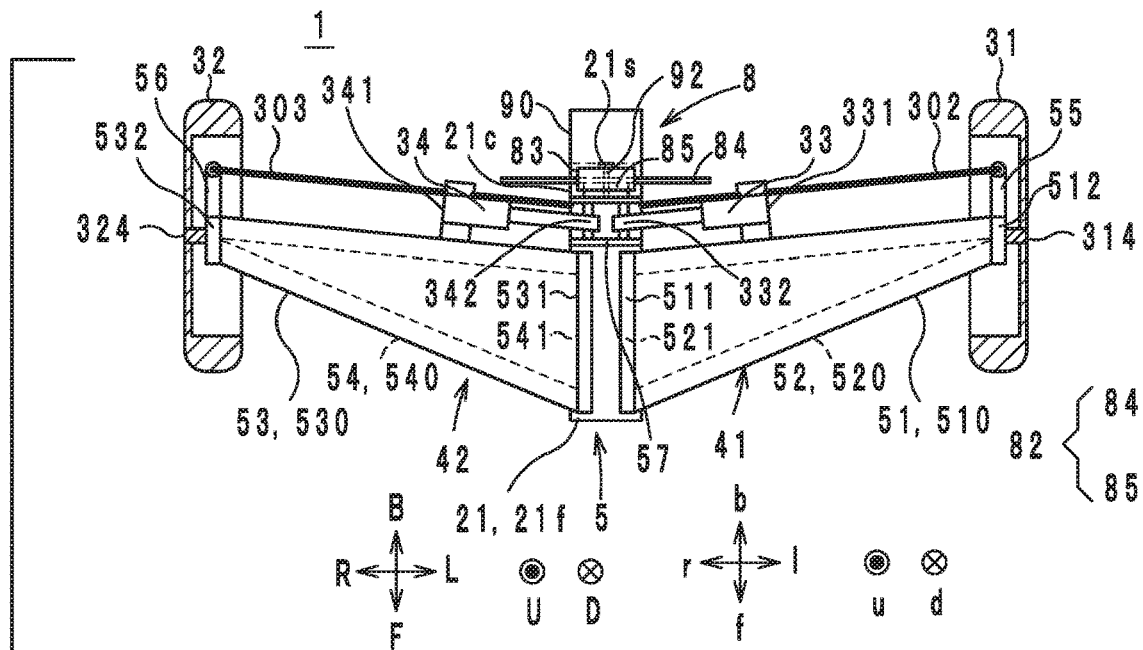
FIG. 2 is a multiple view drawing showing schematic diagrams of a front part of the leaning vehicle 1 as seen in a downward direction D and a backward direction B.
Figure 2:
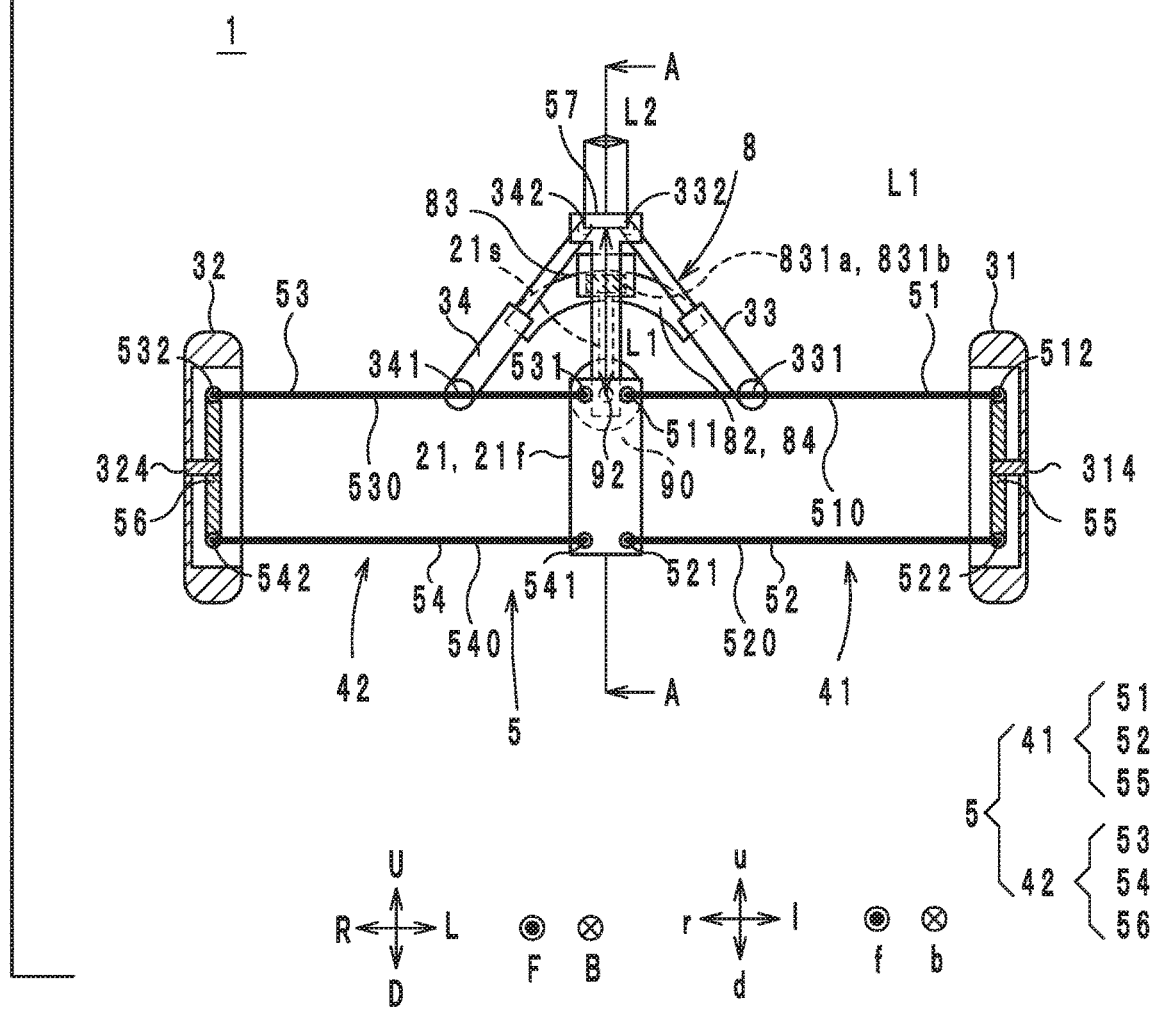
Figure 3:
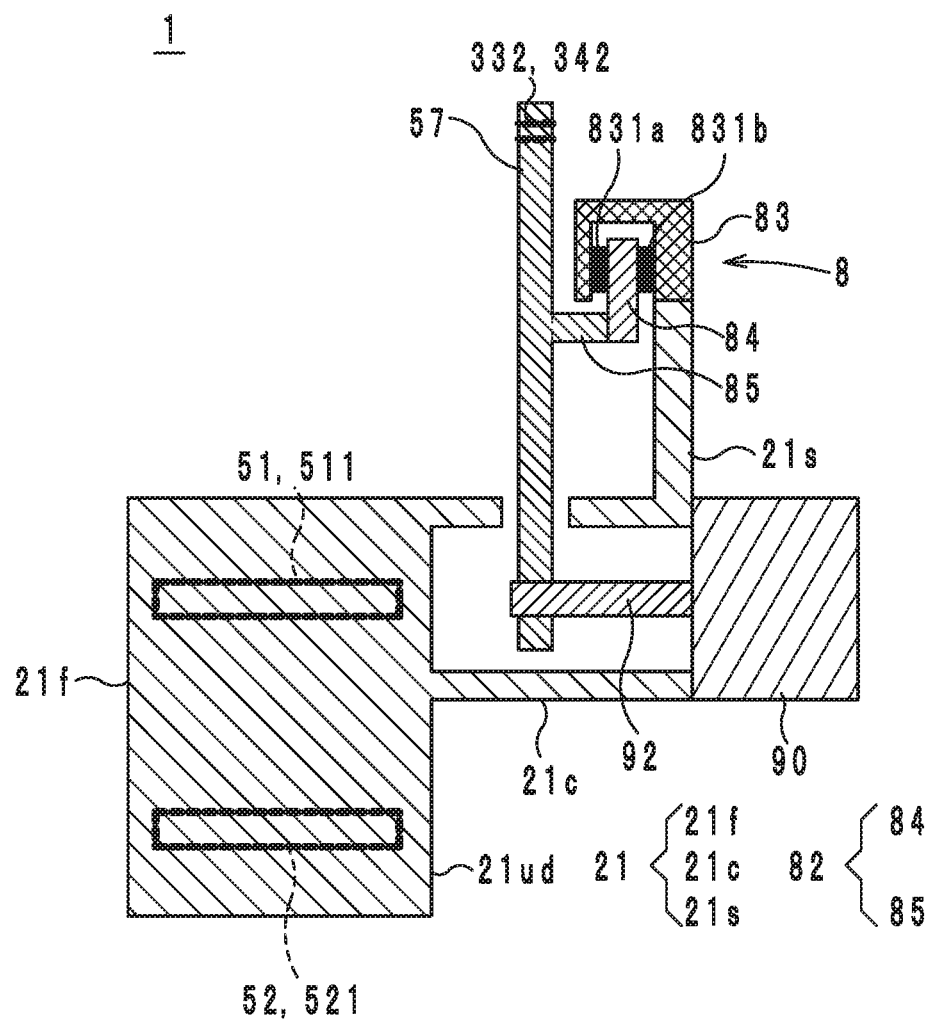
FIG. 3 is a cross-sectional structural drawing along a line A-A in FIG. 2.
Figure 3:
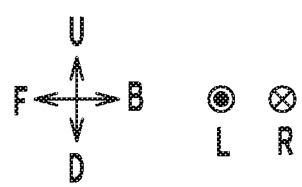
Figure 3:
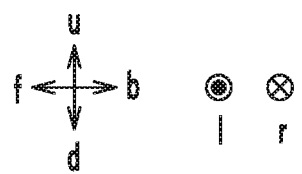
Figure 4:
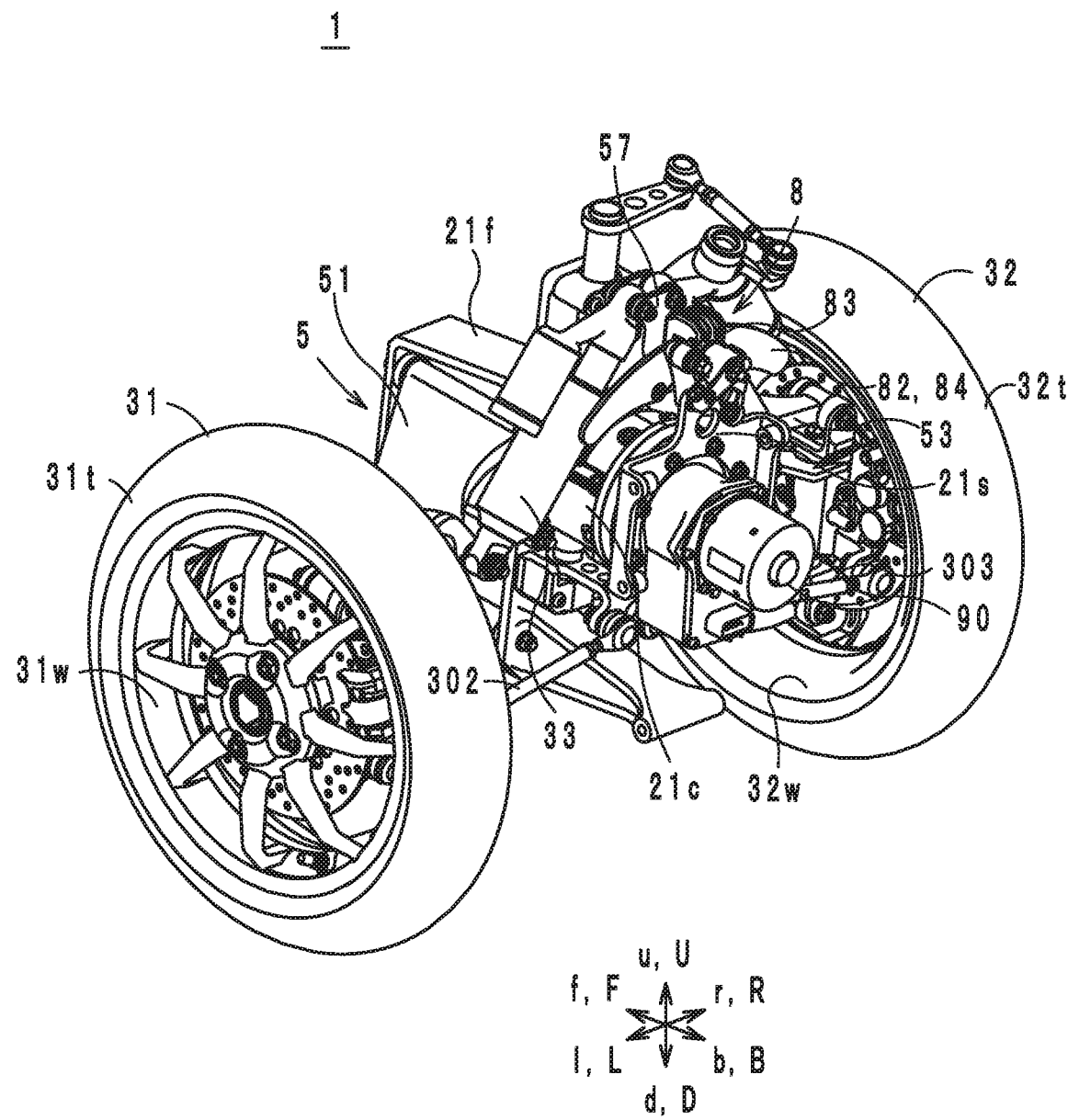
FIG. 4 is a perspective view of the front part of the leaning vehicle 1.
Figure 5:
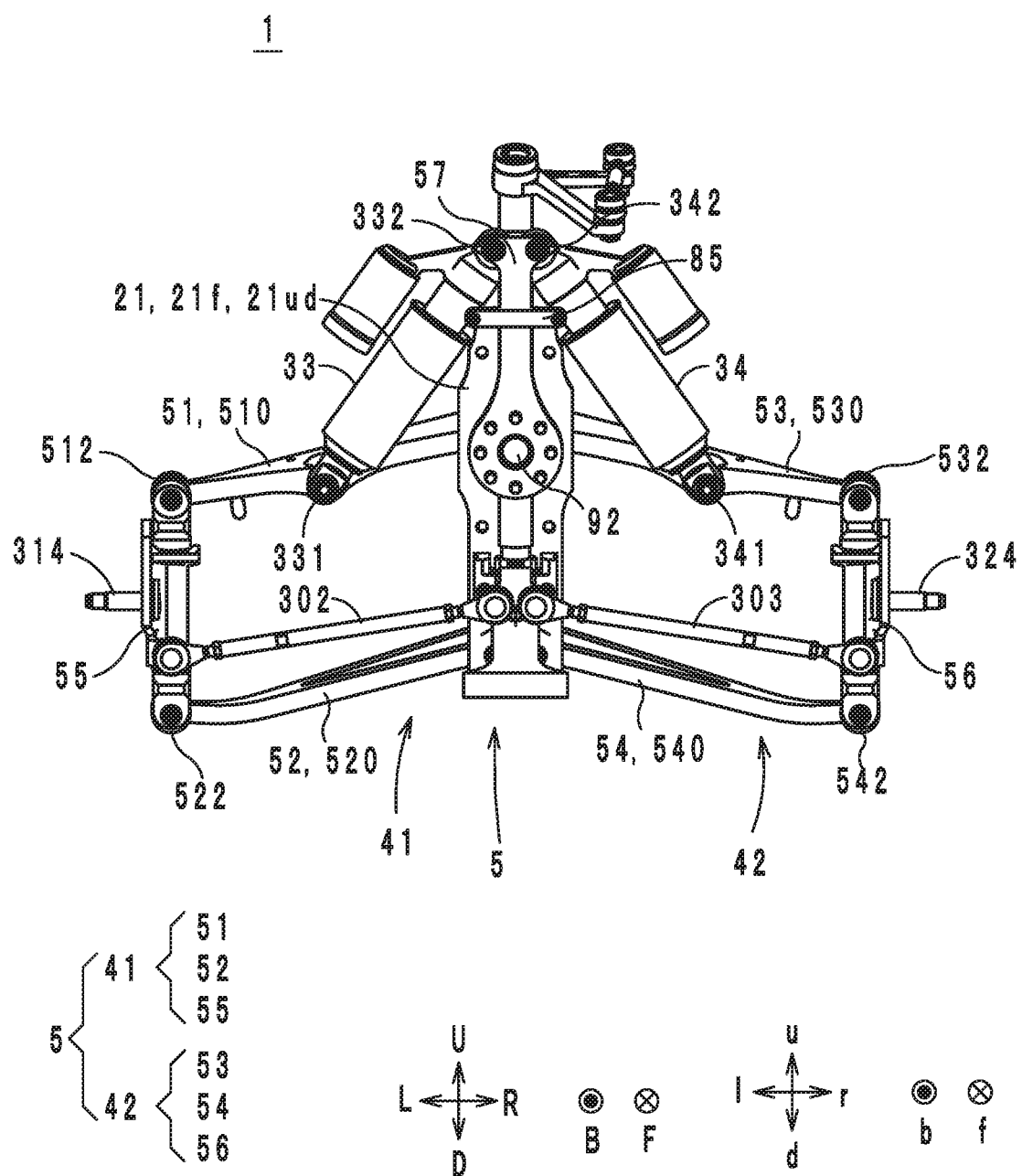
FIG. 5 is a view of the front part of the leaning vehicle 1 as seen in a frontward direction F.
Figure 6:
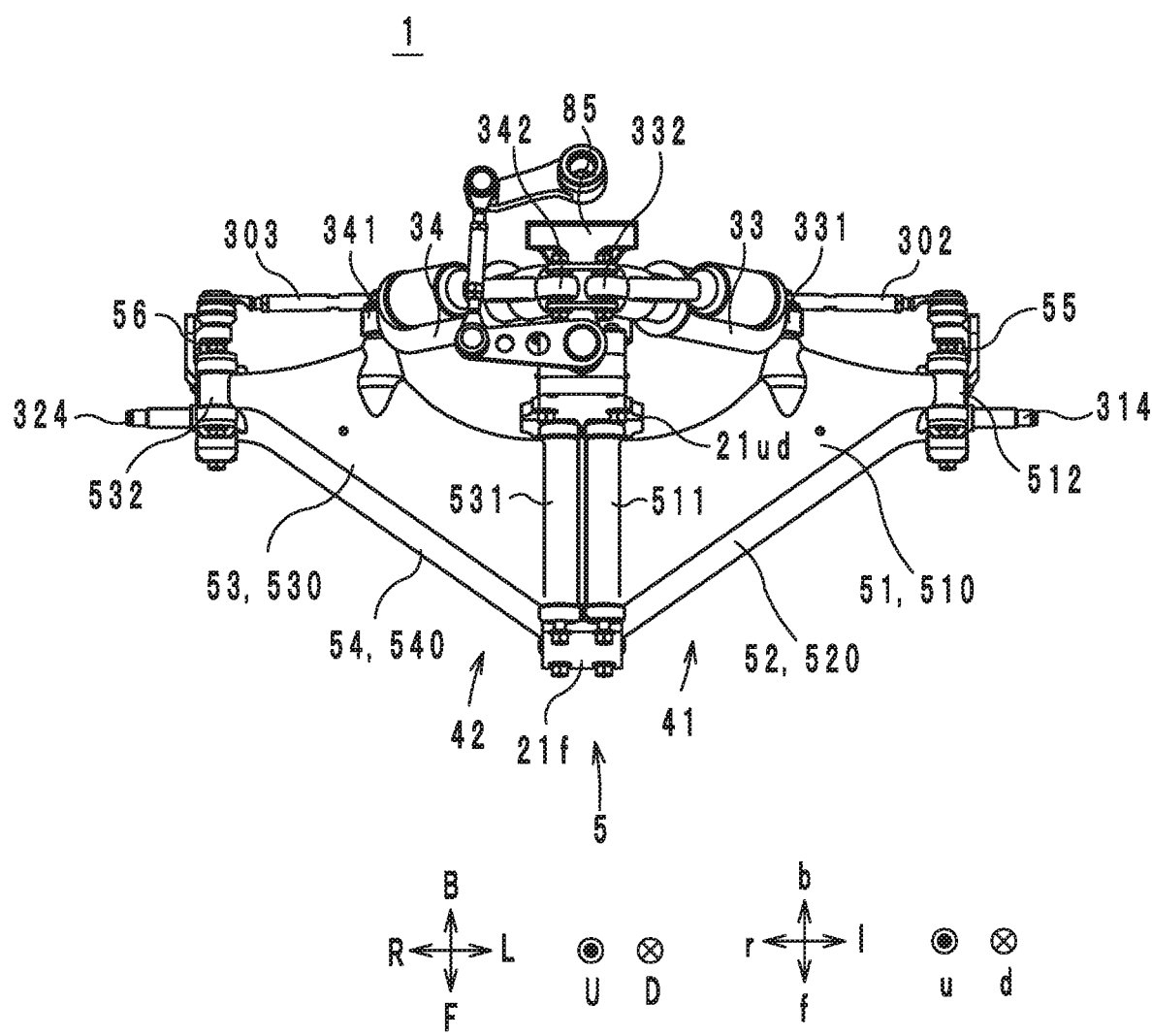
FIG. 6 is a view of the front part of the leaning vehicle 1 as seen in the downward direction D.
Figure 7:
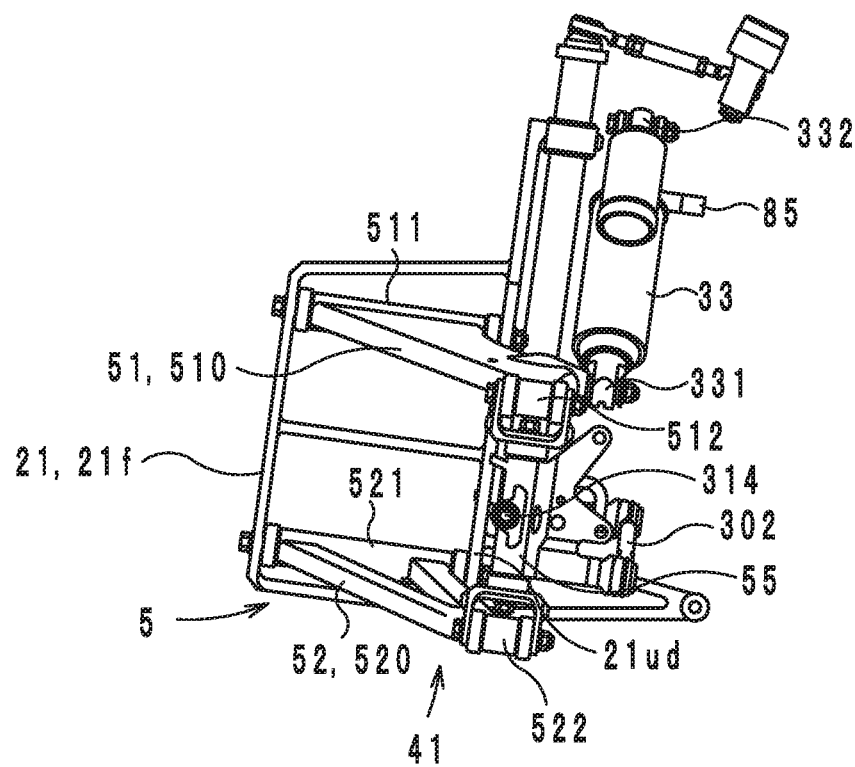
FIG. 7 is a view of the front part of the leaning vehicle 1 as seen in the rightward direction R.
Figure 7:
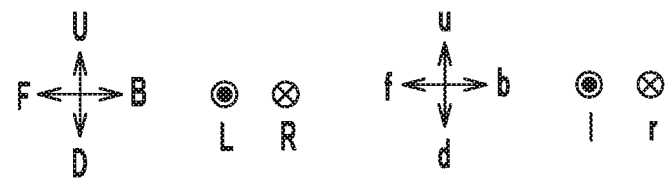

Hereunder, the overall configuration of a leaning vehicle 1 according to one embodiment of the present invention is described with reference to the accompanying drawings. In the present embodiment, a three-wheeled leaning vehicle (hereinafter, called a "leaning vehicle") having a vehicle body frame that is capable of leaning, two front wheel tire assemblies, and one rear wheel tire assembly is described as one example of a leaning vehicle. FIG. 1 is a perspective view of the leaning vehicle 1. FIG. 2 is a multiple view drawing showing schematic diagrams of a front part of the leaning vehicle 1 as seen in a downward direction D and a backward direction B. FIG. 3 is a cross-sectional structural drawing along a line A-A in FIG. 2. FIG. 4 is a perspective view of the front part of the leaning vehicle 1. FIG. 5 is a view of the front part of the leaning vehicle 1 as seen in a frontward direction F. FIG. 6 is a view of the front part of the leaning vehicle 1 as seen in the downward direction D. FIG. 7 is a view of the front part of the leaning vehicle 1 as seen in the rightward direction R. In FIGS. 2 and 3, to facilitate understanding, schematic diagrams in which the respective components are simplified are illustrated. Therefore, the sizes of the respective components in FIGS. 2 and 3 differ from the actual sizes thereof.

Hereinafter, the leaning-vehicle (1) frontward direction is referred to as the frontward direction "F". The leaning-vehicle (1) backward direction is referred to as the backward direction "B". The leaning-vehicle (1) leftward direction is referred to as the left "L". The leaning-vehicle (1) rightward direction is referred to as the right "R". The leaning-vehicle (1) upward direction is referred to as the upward direction "U". The leaning-vehicle (1) downward direction is referred to as the downward direction "D". The leaning-vehicle (1) front-back direction is referred to as the front-back direction "FB". The leaning-vehicle (1) left-right direction is referred to as the left-right direction "LR". The leaning-vehicle (1) up-down direction is referred to as the up-down direction "UD". The leaning-vehicle (1) frontward direction refers to the direction of travel of the leaning vehicle 1. The leaning-vehicle (1) backward direction refers to the opposite direction of the direction of travel of the leaning vehicle 1. The leaning-vehicle (1) leftward direction refers to the left when taking a rider who straddles the leaning vehicle 1 as a reference. The leaning-vehicle (1) rightward direction refers to the right when taking a rider who straddles the leaning vehicle 1 as a reference. The leaning-vehicle (1) upward direction refers to the upward direction when taking a rider who straddles the leaning vehicle 1 as a reference. The leaning-vehicle (1) downward direction refers to the downward direction when taking a rider who straddles the leaning vehicle 1 as a reference.

Further, in the leaning vehicle 1, a vehicle body frame 21 can lean to the left L or the right R. In a case where the vehicle body frame 21 leans to the left L or right R, the vehicle-body-frame (21) up-down and left-right directions do not match the leaning-vehicle (1) up-down direction UD and the leaning-vehicle (1) left-right direction LR, respectively. On the other hand, the vehicle-body-frame (21) up-down and left-right directions in an upright state match the leaning-vehicle (1) up-down direction UD and the leaning-vehicle (1) left-right direction LR, respectively. Hereinafter, the vehicle-body-frame (21) frontward direction is referred to as the frontward direction "f". The vehicle-body-frame (21) backward direction is referred to as the backward direction "b". The vehicle-body-frame (21) leftward direction is referred to as the leftward direction "l". The vehicle-body-frame (21) rightward direction is referred to as the rightward direction "r". The vehicle-body-frame (21) upward direction is referred to as the upward direction "u". The vehicle-body-frame (21) downward direction is referred to as the downward direction "d". The vehicle-body-frame (21) front-back direction is referred to as the front-back direction "fb". The vehicle-body-frame (21) left-right direction is referred to as the left-right direction "lr". The vehicle-body-frame (21) up-down direction is referred to as the up-down direction "ud".

Hereinafter, the term "top end" of a component means the end of the component in the upward direction. The term "bottom end" of a component means the end of the component in the downward direction. The term "front end" of a component means the end of the component in the frontward direction. The term "back end" of a component means the end of the component in the backward direction. The term "left end" of a component means the end of the component in the leftward direction. The term "right end" of a component means the end of the component in the rightward direction. The term "top end part" of a component means the top end and the vicinity of the top end of the component. The term "bottom end part" of a component means the bottom end and the vicinity of the bottom end of the component. The term "front end part" of a component means the front end and the vicinity of the front end of the component. The term "back end part" of a component means the back end and the vicinity of the back end of the component. The term "left end part" of a component means the left end and the vicinity of the left end of the component. The term "right end part" of a component means the right end and the vicinity of the right end of the component. The term "component" means the leaning vehicle 1 and a member constituting the leaning vehicle 1.

In this specification, an axis or a member extending in the front-back direction does not necessarily refer to only an axis or a member that is parallel with the front-back direction. In this specification, an axis or a member extending in the front-back direction refers to an axis or a member that is inclined within a range of ±45° with respect to the front-back direction. Similarly, herein, an axis or a member extending in the up-down direction refers to an axis or a member that is inclined within a range of ±45° with respect to the up-down direction. Likewise, herein, an axis or a member extending in the left-right direction refers to an axis or a member that is inclined within a range of ±45° with respect to the left-right direction. Further, the term "state in which the vehicle body frame 21 is upright" means a state in which the front wheel tire assembly is not steering or leaning, in a state in which a rider is not riding on the leaning vehicle 1 and there is no fuel in the leaning vehicle 1.

In the present specification, the phrase "a first member is supported by a second member" includes a case in which the first member is attached to the second member so as to be immovable with respect to the second member (that is, is secured thereto), and a case in which the first member is attached to the second member so as to be movable with respect to the second member. Further, the phrase "the first member is supported by the second member" includes both of a case in which the first member is directly attached to the second member, and a case in which the first member is attached to the second member via a third member.

As illustrated in FIG. 1, the leaning vehicle 1 includes the vehicle body frame 21, a steering mechanism 3, a left front wheel tire assembly 31, a right front wheel tire assembly 32, a left shock absorber 33, a right shock absorber 34, a rear wheel tire assembly 4, a link mechanism 5, a shock absorber tower 57 and an actuator 90 (see FIG. 2).

The vehicle body frame 21 leans to the left L when turning left. The vehicle body frame 21 leans to the right R when turning right. As illustrated in FIG. 2, the vehicle body frame 21 includes a main frame 21m (see FIG. 1), a frame front part 21f, an actuator support part 21c, and a caliper support part 21s. The main frame 21m extends in the front-back direction fb. The main frame 21m supports the steering mechanism 3, a seat (not illustrated in the drawings), a power unit and the like.

The frame front part 21f, the actuator support part 21c (not illustrated in FIG. 1) and the caliper support part 21s (not illustrated in FIG. 1) are supported by the front end of the main frame 21m as illustrated in FIG. 1. The frame front part 21f is a plate-like member having a rectangular shape when seen in the leftward direction l or the rightward direction r. However, in the frame front part 21f, a frame-like portion is provided so as to surround a plate-like portion. The frame front part 21f supports the link mechanism 5 that is described later. As illustrated in FIG. 3 and FIG. 4, the actuator support part 21c has a cylindrical shape that has a central axis extending in the front-back direction fb. The actuator support part 21c extends in the backward direction b from the frame front part 21f. As illustrated in FIG. 3 and FIG. 4, the actuator support part 21c supports the actuator 90 that is described later.

As illustrated in FIG. 3 and FIG. 4, the caliper support part 21s extends in the upward direction u from the actuator support part 21c. The caliper support part 21s supports a caliper 83 of a resistance force changing mechanism 8 that is described later.

The link mechanism 5 is a double wishbone-type link mechanism. As illustrated in FIG. 1 and FIG. 2, the link mechanism 5 is supported by the frame front part 21f. As illustrated in FIG. 2 and FIG. 5, the link mechanism 5 includes a left arm mechanism 41 and a right arm mechanism 42.

The left arm mechanism 41 swings in the upward direction u when the vehicle body frame 21 leans to the left L, and swings in the downward direction d when the vehicle body frame 21 leans to the right R. As illustrated in FIG. 2 and FIG. 5, the left arm mechanism 41 includes an upper-left arm member 51, a lower-left arm member 52 and a left knuckle 55.

As illustrated in FIG. 2, the upper-left arm member 51 is supported by the vehicle body frame 21 so as to rotate around an upper-left-arm-member right-end support shaft (not illustrated in the drawings) that extends in the front-back direction fb centering on a right part of the upper-left arm member 51. More specifically, the upper-left arm member 51 includes an upper-left-arm-member main body 510 and upper-left-arm-member supported parts 511 and 512.

The upper-left-arm-member main body 510 is a plate-like member that is substantially parallel to the horizontal plane. The upper-left-arm-member main body 510 extends in the left-right direction LR. The upper-left-arm-member supported part 511 is located at a right end part of the upper-left arm member 51. The upper-left-arm-member supported part 511 is a cylinder having a central axis extending in the front-back direction fb. Therefore, the upper-left-arm-member supported part 511 extends continuously in the front-back direction fb between a front end of the upper-left-arm-member supported part 511 and a back end of the upper-left-arm-member supported part 511. The upper-left-arm-member right-end support shaft (not illustrated in the drawings) is provided at an upper part of a left face of the frame front part 21f. The upper-left-arm-member right-end support shaft is fixed to the frame front part 21f. The upper-left-arm-member right-end support shaft penetrates through the upper-left-arm-member supported part 511 in the front-back direction fb. By this means, the upper-left arm member 51 can rotate around the upper-left-arm-member right-end support shaft. The upper-left-arm-member supported part 512 is located at a left end part of the upper-left arm member 51. The upper-left-arm-member supported part 512 is a cylinder having a central axis extending in the front-back direction fb. However, the length in the front-back direction fb of the upper-left-arm-member supported part 512 is shorter than the length in the front-back direction fb of the upper-left-arm-member supported part 511. Furthermore, as illustrated in FIG. 6, the center in the front-back direction fb of the upper-left-arm-member supported part 512 is located further backward in the backward direction b than the center in the front-back direction fb of the upper-left-arm-member supported part 511.

As illustrated in FIG. 2, the lower-left arm member 52 is disposed further downward in the downward direction d than the upper-left arm member 51. The lower-left arm member 52 is supported by the vehicle body frame 21 so as to rotate around a lower-left-arm-member right-end support shaft (not illustrated in the drawings) that extends in the front-back direction fb centering on a right part of the lower-left arm member 52. More specifically, the lower-left arm member 52 includes a lower-left-arm-member main body 520 and lower-left-arm-member supported parts 521 and 522. As illustrated in FIG. 1 and FIG. 5, the lower-left-arm-member main body 520 is a double-bar-shaped member that extends in the left-right direction LR. The lower-left-arm-member supported part 521 is located at a right end part of the lower-left arm member 52, as illustrated in FIG. 1. The lower-left-arm-member supported part 521 is a cylinder having a central axis extending in the front-back direction fb. Therefore, as illustrated in FIG. 1 and FIG. 7, the lower-left-arm-member supported part 521 extends continuously in the front-back direction fb between a front end of the lower-left-arm-member supported part 521 and a back end of the lower-left-arm-member supported part 521. The lower-left-arm-member right-end support shaft (not illustrated in the drawings) is provided at a lower part of a left face of the frame front part 21f. The lower-left-arm-member right-end support shaft is fixed to the frame front part 21f. The lower-left-arm-member right-end support shaft penetrates through the lower-left-arm-member supported part 521 in the front-back direction fb. By this means, the lower-left arm member 52 can rotate around the lower-left-arm-member right-end support shaft. The lower-left-arm-member supported part 522 is located at a left end part of the lower-left arm member 52. The lower-left-arm-member supported part 522 is a cylinder having a central axis extending in the front-back direction fb. However, the length in the front-back direction fb of the lower-left-arm-member supported part 522 is shorter than the length in the front-back direction fb of the lower-left-arm-member supported part 521. Furthermore, as illustrated in FIG. 7, the center in the front-back direction fb of the lower-left-arm-member supported part 522 is located further backward in the backward direction b than the center in the front-back direction fb of the lower-left-arm-member supported part 521.

The left knuckle 55 (one example of a left connection member) is connected to a left part of the upper-left arm member 51 and a left part of the lower-left arm member 52. An upper-left-arm-member left-end support shaft (not illustrated in the drawings) that extends in the front-back direction fb is provided at an upper part of the left knuckle 55. The upper-left-arm-member left-end support shaft is fixed to the left knuckle 55. The upper-left-arm-member left-end support shaft penetrates through the upper-left-arm-member supported part 512 in the front-back direction fb. By this means, the left knuckle 55 can rotate around the upper-left-arm-member left-end support shaft. A lower-left-arm-member left-end support shaft (not illustrated in the drawings) that extends in the front-back direction fb is provided at a lower part of the left knuckle 55. The lower-left-arm-member left-end support shaft is fixed to the left knuckle 55. The lower-left-arm-member left-end support shaft penetrates through the lower-left-arm-member supported part 522 in the front-back direction fb. By this means, the left knuckle 55 can rotate around the lower-left-arm-member left-end support shaft. When the vehicle body frame 21 leans to the left L, the left knuckle 55 having the configuration described above leans to the left L while maintaining a parallel state with respect to the frame front part 21f. When the vehicle body frame 21 leans to the right R, the left knuckle 55 leans to the right R while maintaining a parallel state with respect to the frame front part 21f.

The left knuckle 55 supports the left front wheel tire assembly 31. The left front wheel tire assembly 31 can rotate around a left front wheel tire assembly axle 314. The left front wheel tire assembly axle 314 extends in the left-right direction lr. By this means, the left front wheel tire assembly 31 leans to the left L together with the left knuckle 55 when the vehicle body frame 21 leans to the left L. The left front wheel tire assembly 31 leans to the right R together with the left knuckle 55 when the vehicle body frame 21 leans to the right R.

The right arm mechanism 42 swings in the downward direction d when the vehicle body frame 21 leans to the left L, and swings in the upward direction u when the vehicle body frame 21 leans to the right R. As illustrated in FIG. 2 and FIG. 5, the right arm mechanism 42 includes an upper-right arm member 53, a lower-right arm member 54 and a right knuckle 56.

As illustrated in FIG. 2, the upper-right arm member 53 is supported by the vehicle body frame 21 so as to rotate around an upper-right-arm-member left-end support shaft (not illustrated in the drawings) that extends in the front-back direction fb centering on a left part of the upper-right arm member 53. More specifically, the upper-right arm member 53 includes an upper-right-arm-member main body 530 and upper-right-arm-member supported parts 531 and 532.

The upper-right-arm-member main body 530 is a plate-like member that is substantially parallel to the horizontal plane. The upper-right-arm-member main body 530 extends in the left-right direction LR. The upper-right-arm-member supported part 531 is located at a left end part of the upper-right arm member 53. The upper-right-arm-member supported part 531 is a cylinder having a central axis extending in the front-back direction fb. Therefore, the upper-right-arm-member supported part 531 extends continuously in the front-back direction fb between a front end of the upper-right-arm-member supported part 531 and a back end of the upper-right-arm-member supported part 531. The upper-right-arm-member left-end support shaft (not illustrated in the drawings) is provided at an upper part of a right face of the frame front part 21f. The upper-right-arm-member left-end support shaft is fixed to the frame front part 21f. The upper-right-arm-member left-end support shaft penetrates through the upper-right-arm-member supported part 531 in the front-back direction fb. By this means, the upper-right arm member 53 can rotate around the upper-right-arm-member left-end support shaft. The upper-right-arm-member supported part 532 is located at a right end part of the upper-right arm member 53. The upper-right-arm-member supported part 532 is a cylinder having a central axis extending in the front-back direction fb. However, the length in the front-back direction fb of the upper-right-arm-member supported part 532 is shorter than the length in the front-back direction fb of the upper-right-arm-member supported part 531. Furthermore, as illustrated in FIG. 6, the center in the front-back direction fb of the upper-right-arm-member supported part 532 is located further backward in the backward direction b than the center in the front-back direction fb of the upper-right-arm-member supported part 531.

As illustrated in FIG. 2, the lower-right arm member 54 is disposed further downward in the downward direction d than the upper-right arm member 53. The lower-right arm member 54 is supported by the vehicle body frame 21 so as to rotate around a lower-right-arm-member left-end support shaft (not illustrated in the drawings) that extends in the front-back direction fb centering on a left part of the lower-right arm member 54. More specifically, the lower-right arm member 54 includes a lower-right-arm-member main body 540 and lower-right-arm-member supported parts 541 and 542. As illustrated in FIG. 5, the lower-right-arm-member main body 540 is a double-bar-shaped member that extends in the left-right direction LR. The lower-right-arm-member supported part 541 is located at a left end part of the lower-right arm member 54, as illustrated in FIG. 2. The lower-right-arm-member supported part 541 is a cylinder having a central axis extending in the front-back direction fb. Therefore, the lower-right-arm-member supported part 541 extends continuously in the front-back direction fb between a front end of the lower-right-arm-member supported part 541 and a back end of the lower-right-arm-member supported part 541. The lower-right-arm-member left-end support shaft (not illustrated in the drawings) is provided at a lower part of a right face of the frame front part 21*f*. The lower-right-arm-member left-end support shaft is fixed to the frame front part 21*f*. The lower-right-arm-member left-end support shaft penetrates through the lower-right-arm-member supported part 541 in the front-back direction fb. By this means, the lower-right arm member 54 can rotate around the lower-right-arm-member left-end support shaft. The lower-right-arm-member supported part 542 is located at a right end part of the lower-right arm member 54. The lower-right-arm-member supported part 542 is a cylinder having a central axis extending in the front-back direction fb. However, the length in the front-back direction fb of the lower-right-arm-member supported part 542 is shorter than the length in the front-back direction fb of the lower-right-arm-member supported part 541. Furthermore, the center in the front-back direction fb of the lower-right-arm-member supported part 542 is located further backward in the backward direction b than the center in the front-back direction fb of the lower-right-arm-member supported part 541.

The right knuckle 56 (one example of a right connection member) is connected to a right part of the upper-right arm member 53 and a right part of the lower-right arm member 54. An upper-right-arm-member right-end support shaft (not illustrated in the drawings) that extends in the front-back direction fb is provided at an upper part of the right knuckle 56. The upper-right-arm-member right-end support shaft is fixed to the right knuckle 56. The upper-right-arm-member right-end support shaft penetrates through the upper-right-arm-member supported part 532 in the front-back direction fb. By this means, the right knuckle 56 can rotate around the upper-right-arm-member right-end support shaft. A lower-right-arm-member right-end support shaft (not illustrated in the drawings) that extends in the front-back direction fb is provided at a lower part of the right knuckle 56. The lower-right-arm-member right-end support shaft is fixed to the right knuckle 56. The lower-right-arm-member right-end support shaft penetrates through the lower-right-arm-member supported part 542 in the front-back direction fb. By this means, the right knuckle 56 can rotate around the lower-right-arm-member right-end support shaft. When the vehicle body frame 21 leans to the left L, the right knuckle 56 having the configuration described above leans to the left L while maintaining a parallel state with respect to the frame front part 21*f*. When the vehicle body frame 21 leans to the right R, the right knuckle 56 leans to the right R while maintaining a parallel state with respect to the frame front part 21*f*.

The right knuckle 56 supports the right front wheel tire assembly 32. The right front wheel tire assembly 32 can rotate around a right front wheel tire assembly axle 324. The right front wheel tire assembly axle 324 extends in the left-right direction lr. By this means, the right front wheel tire assembly 32 leans to the left L together with the right knuckle 56 when the vehicle body frame 21 leans to the left L. The right front wheel tire assembly 32 leans to the right R together with the right knuckle 56 when the vehicle body frame 21 leans to the right R.

As illustrated in FIG. 2 and FIG. 6, the shock absorber tower 57 is disposed further backward in the backward direction b than the upper-left-arm-member supported part 511, the lower-left-arm-member supported part 521, the upper-right-arm-member supported part 531 and the lower-right-arm-member supported part 541. The shock absorber tower 57 is a bar-shaped member that extends in the up-down direction ud when the vehicle body frame 21 is in an upright state. As illustrated in FIG. 2 and FIG. 3, the shock absorber tower 57 is supported by the vehicle body frame 21 so as to rotate around a tower central shaft 92 extending in the front-back direction fb. The tower central shaft 92 is a rotary shaft of the actuator 90 that is described later. As illustrated in FIG. 3, the actuator 90 is supported by the actuator support part 21*c* (one part of the vehicle body frame 21). Therefore, the shock absorber tower 57 is supported by the vehicle body frame 21 through the actuator 90. Further, as illustrated in FIG. 2, in a case where the vehicle body frame 21 is in an upright state, the tower central shaft 92 is located at an upper part of the frame front part 21*f* when seen in the backward direction b. Therefore, when seen in the backward direction b, the tower central shaft 92 is located closer to the upper-left-arm-member supported part 511 and the upper-right-arm-member supported part 531 than to the lower-left-arm-member supported part 521 and the lower-right-arm-member supported part 541.

The left shock absorber 33 is a combination of a spring and a damper. The left shock absorber 33 can expand and contract in the longitudinal direction of the left shock absorber 33. Thus, the left shock absorber 33 has a cushioning action. As illustrated in FIG. 2 and FIG. 6, when seen in the downward direction d, the left shock absorber 33 is disposed behind the left arm mechanism 41 in the backward direction b. In a state in which the vehicle body frame 21 is upright, the left shock absorber 33 extends rectilinearly in the leftward direction l and the downward direction d from a top end part of the shock absorber tower 57. A first end part 331 of the left shock absorber 33 is connected to the left arm mechanism 41. In the present embodiment, as illustrated in FIG. 2 and FIG. 5, the first end part 331 of the left shock absorber 33 is connected to the upper-left arm member 51. A second end part 332 of the left shock absorber 33 is connected to the top end part of the shock absorber tower 57.

The right shock absorber 34 is a combination of a spring and a damper. The right shock absorber 34 can expand and contract in the longitudinal direction of the right shock absorber 34. Thus, the right shock absorber 34 has a cushioning action. As illustrated in FIG. 2 and FIG. 6, when seen in the downward direction d, the right shock absorber 34 is disposed behind the right arm mechanism 42 in the backward direction b. In a state in which the vehicle body frame 21 is upright, the right shock absorber 34 extends rectilinearly in the rightward direction r and the downward direction d from the top end part of the shock absorber tower 57. A first end part 341 of the right shock absorber 34 is connected to the right arm mechanism 42. In the present embodiment, as illustrated in FIG. 2 and FIG. 5, the first end part 341 of the right shock absorber 34 is connected to the upper-right arm member 53. A second end part 342 of the right shock absorber 34 is connected to the top end part of the shock absorber tower 57.

The shock absorber tower 57 extends in the up-down direction ud when the vehicle body frame 21 is in an upright state. Therefore, when the vehicle body frame 21 is in an upright state, the shock absorber tower 57 has a vertically long shape. Accordingly, as illustrated in FIG. 2 and FIG. 5, the shock absorber tower 57 has a shape in which, when the vehicle body frame 21 is in an upright state, a distance L1 in the up-down direction ud between the tower central shaft 92 and the second end part 332 of the left shock absorber 33 or between the tower central shaft 92 and the second end part 342 of the right shock absorber 34 is longer than a distance L2 in the left-right direction lr between the second end part 332 of the left shock absorber 33 and the second end part 342 of the right shock absorber 34.

In this connection, the frame front part 21f includes an up-down frame part 21ud. As illustrated in FIG. 3 and FIG. 7, the up-down frame part 21ud includes a rear face of the frame front part 21f. The up-down frame part 21ud extends in the up-down direction ud between the shock absorber tower 57 and the back end of the upper-left-arm-member supported part 511, between the shock absorber tower 57 and the back end of the upper-right-arm-member supported part 531, between the shock absorber tower 57 and the back end of the lower-left-arm-member supported part 521 and between the shock absorber tower 57 and the back end of the lower-right-arm-member supported part 541.

As illustrated in FIG. 3 and FIG. 4, the actuator 90 is supported by a back end of the actuator support part 21c. Based on leaning of the vehicle body frame 21 that is detected by an unshown sensor, the actuator 90 generates a force that causes the vehicle body frame 21 to lean to the left L when turning left, and generates a force that causes the vehicle body frame 21 to lean to the right R when turning right. As illustrated in FIG. 3, the actuator 90 includes the tower central shaft 92 that extends in the frontward direction f from the main body of the actuator 90.

As illustrated in FIG. 1, the steering mechanism 3 is a mechanism that is operated by a rider to steer the left front wheel tire assembly 31 and the right front wheel tire assembly 32. The steering mechanism 3 is supported by the main frame 21m. As illustrated in FIG. 1, the steering mechanism 3 includes a handle 301, a left tie rod 302 (see FIG. 2 and FIG. 5) and a right tie rod 303 (see FIG. 2 and FIG. 5). The steering mechanism 3 also includes a steering member such as a steering shaft that is not illustrated in the drawings.

As illustrated in FIG. 1, the handle 301 is disposed above the front part of the main frame 21m in the upward direction u. When seen in the downward direction d, the handle 301 is turned counterclockwise or clockwise by the rider. The left tie rod 302 transmits the turning of the handle 301 to the left knuckle 55. As illustrated in FIG. 2 and FIG. 5, the left tie rod 302 is a bar-shaped member that extends in the left-right direction LR. A right end of the left tie rod 302 is connected to the handle 301 through a steering member such as a steering shaft that is not illustrated in the drawings. A left end of the left tie rod 302 is connected to a back part of the left knuckle 55. The right tie rod 303 transmits the turning of the handle 301 to the right knuckle 56. As illustrated in FIG. 2 and FIG. 5, the right tie rod 303 is a bar-shaped member that extends in the left-right direction LR. A left end of the right tie rod 303 is connected to the handle 301 through a steering member such as a steering shaft that is not illustrated in the drawings. A right end of the right tie rod 303 is connected to a back part of the right knuckle 56.

In this connection, in the leaning vehicle 1, the length in the front-back direction fb of the upper-left-arm-member supported part 511, the length in the front-back direction fb of the lower-left-arm-member supported part 521, the length in the front-back direction fb of the upper-right-arm-member supported part 531, and the length in the front-back direction fb of the lower-right-arm-member supported part 541 are short in comparison to a common leaning vehicle that includes a double wishbone-type link mechanism. The phrase "length in the front-back direction fb of the upper-left-arm-member supported part 511" refers to a length in the front-back direction fb between the front end of the upper-left-arm-member supported part 511 and the back end of the upper-left-arm-member supported part 511. The phrases "length in the front-back direction fb of the lower-left-arm-member supported part 521", "length in the front-back direction fb of the upper-right-arm-member supported part 531", and "length in the front-back direction fb of the lower-right-arm-member supported part 541" likewise also refer to a similar length to the length in the front-back direction fb of the upper-left-arm-member supported part 511. The conditions whereby the length in the front-back direction fb of the upper-left-arm-member supported part 511, the length in the front-back direction fb of the lower-left-arm-member supported part 521, the length in the front-back direction fb of the upper-right-arm-member supported part 531, and the length in the front-back direction fb of the lower-right-arm-member supported part 541 are short are enumerated hereinafter. Note that, it is not necessary that the upper-left-arm-member supported part 511, the lower-left-arm-member supported part 521, the upper-right-arm-member supported part 531 and the lower-right-arm-member supported part 541 simultaneously satisfy all of the conditions described hereinafter.

As illustrated in FIG. 1, the length in the front-back direction fb of the upper-left-arm-member supported part 511 is shorter than a radius of a tire 31t of the left front wheel tire assembly 31. Further, as illustrated in FIG. 1, the length in the front-back direction fb of the upper-left-arm-member supported part 511 is shorter than a diameter of a wheel 31w of the left front wheel tire assembly 31. Furthermore, as illustrated in FIG. 6, the length in the front-back direction fb of the upper-left-arm-member supported part 511 is shorter than a length equivalent to three times a diameter of the left shock absorber 33. The phrase "diameter of the left shock absorber 33" refers to a diameter of an outer cylinder of the damper of the left shock absorber 33.

The length in the front-back direction fb of the upper-right-arm-member supported part 531 is shorter than a radius of a tire 32t of the right front wheel tire assembly 32. Further, the length in the front-back direction fb of the upper-right-arm-member supported part 531 is shorter than a diameter of a wheel 32w of the right front wheel tire assembly 32. Furthermore, as illustrated in FIG. 6, the length in the front-back direction fb of the upper-right-arm-member supported part 531 is shorter than a length equivalent to three times a diameter of the right shock absorber 34. The phrase "diameter of the right shock absorber 34" refers to a diameter of an outer cylinder of the damper of the right shock absorber 34.

As illustrated in FIG. 1, the length in the front-back direction fb of the lower-left-arm-member supported part 521 is shorter than the radius of the tire 31t of the left front wheel tire assembly 31. Further, as illustrated in FIG. 1, the length in the front-back direction fb of the lower-left-arm-member supported part 521 is shorter than the diameter of the wheel 31w of the left front wheel tire assembly 31. Furthermore, the length in the front-back direction fb of the lower-left-arm-member supported part 521 is shorter than a length equivalent to three times the diameter of the left shock absorber 33.

The length in the front-back direction fb of the lower-right-arm-member supported part 541 is shorter than the radius of the tire 32t of the right front wheel tire assembly 32. Further, the length in the front-back direction fb of the lower-right-arm-member supported part 541 is shorter than the diameter of the wheel 32w of the right front wheel tire assembly 32. Furthermore, the length in the front-back direction fb of the lower-right-arm-member supported part 541 is shorter than a length equivalent to three times the diameter of the right shock absorber 34.

[Steering Operations]

Figure 8:
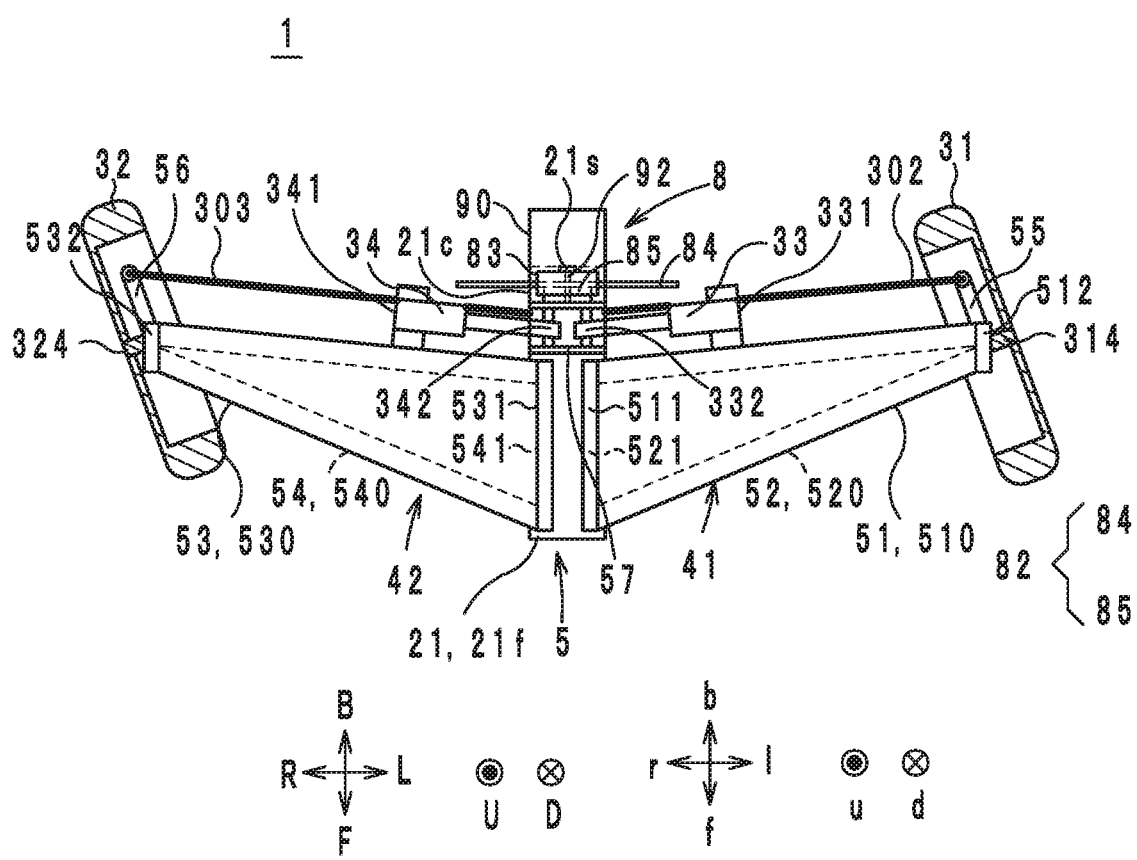
FIG. 8 is a schematic diagram of the front part of the leaning vehicle 1 as seen in the downward direction D.
Figure 9:
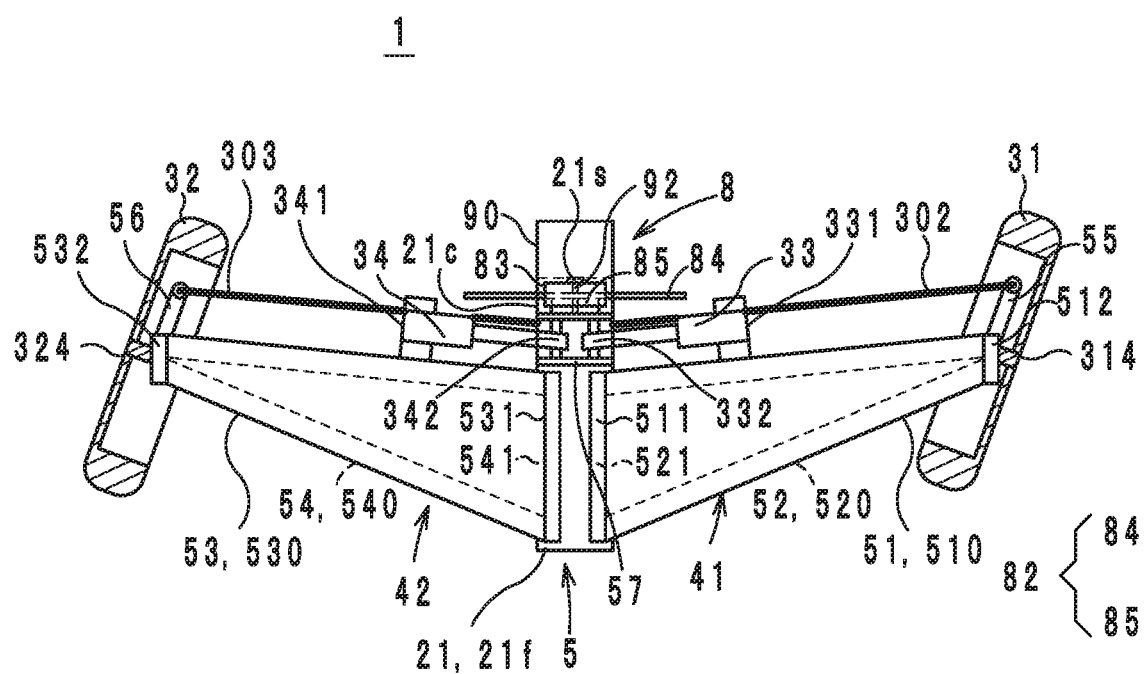
FIG. 9 is a schematic diagram of the front part of the leaning vehicle 1 as seen in the downward direction D.
Figure 9:
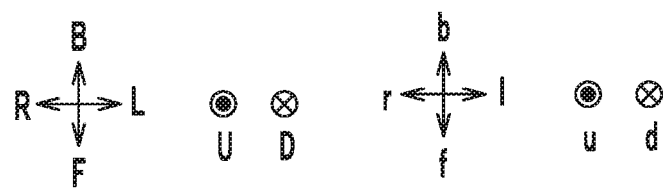

Hereunder, steering operations of the leaning vehicle 1 are described with reference to FIG. 8 and FIG. 9. FIG. 8 and FIG. 9 are schematic diagrams illustrating the front part of the leaning vehicle 1 as seen in the downward direction D. FIG. 8 illustrates a state when the leaning vehicle 1 is being steered to the left. FIG. illustrates a state when the leaning vehicle 1 is being steered to the right.

First, steering of the leaning vehicle 1 to the left will be described with reference to FIG. 8. When the rider turns the handle 301 (not illustrated in FIG. 8) counterclockwise as seen in the downward direction d, the left tie rod 302 moves in the rightward direction r. By this means, as seen in the downward direction d, the back part of the left knuckle 55 moves in the rightward direction r, and the left knuckle 55 and the left front wheel tire assembly 31 rotate counterclockwise. In addition, as seen in the downward direction d, the right tie rod 303 moves in the rightward direction r. By this means, as seen in the downward direction d, the back part of the right knuckle 56 moves in the rightward direction r, and the right knuckle 56 and the right front wheel tire assembly 32 rotate counterclockwise. By this means, the leaning vehicle 1 is steered to the left.

Next, steering of the leaning vehicle 1 to the right will be described with reference to FIG. 9. When the rider turns the handle 301 (not illustrated in FIG. 9) clockwise as seen in the downward direction d, the left tie rod 302 moves in the leftward direction l. By this means, as seen in the downward direction d, the back part of the left knuckle 55 moves in the leftward direction l, and the left knuckle 55 and the left front wheel tire assembly 31 rotate clockwise. In addition, as seen in the downward direction d, the right tie rod 303 moves in the leftward direction l. By this means, as seen in the downward direction d, the back part of the right knuckle 56 moves in the leftward direction l, and the right knuckle 56 and the right front wheel tire assembly 32 rotate clockwise. By this means, the leaning vehicle 1 is steered to the right.

[Leaning Operations]

Figure 10:
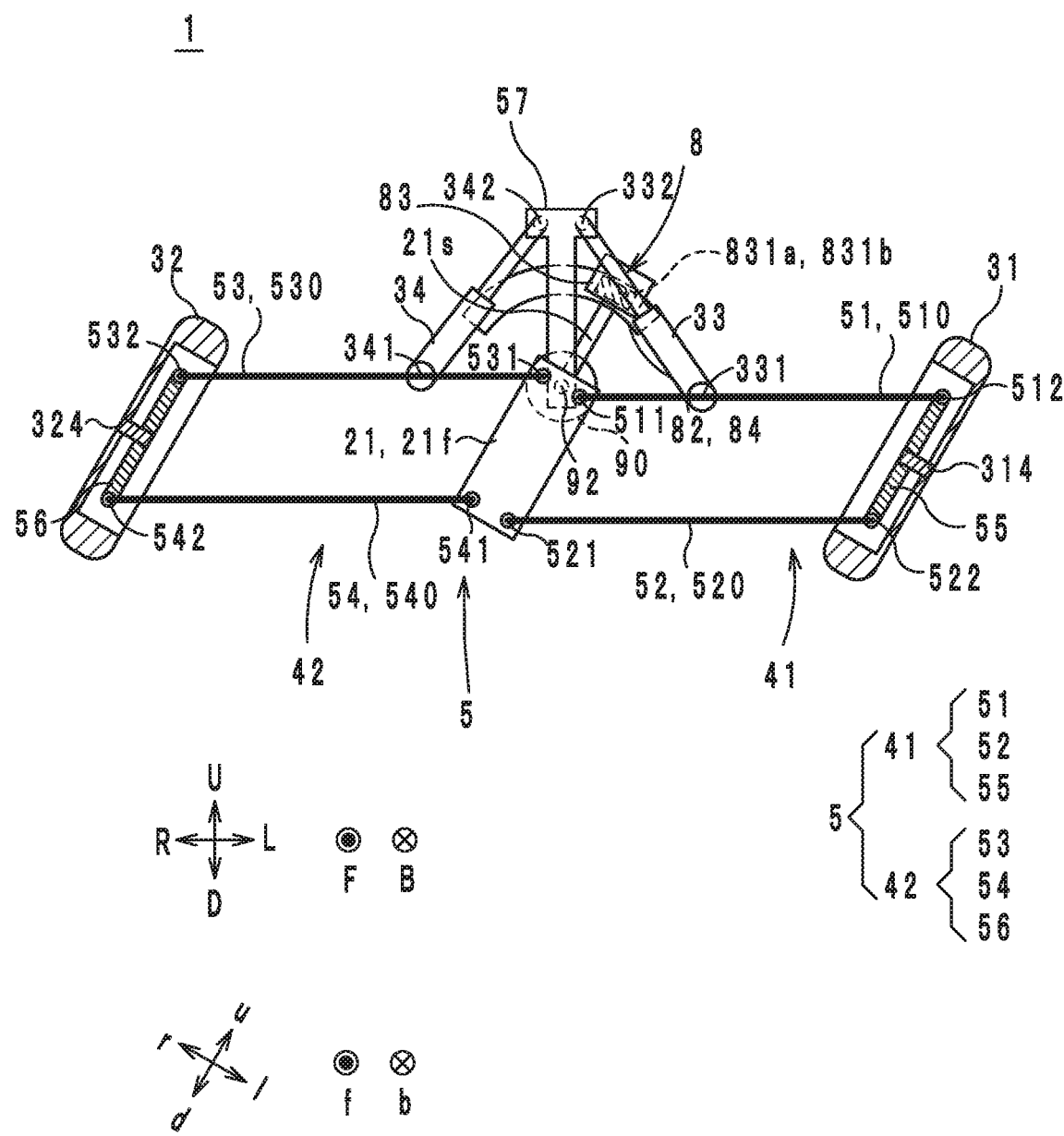
FIG. 10 is a schematic diagram of the front part of the leaning vehicle 1 as seen in the backward direction B.
Figure 11:
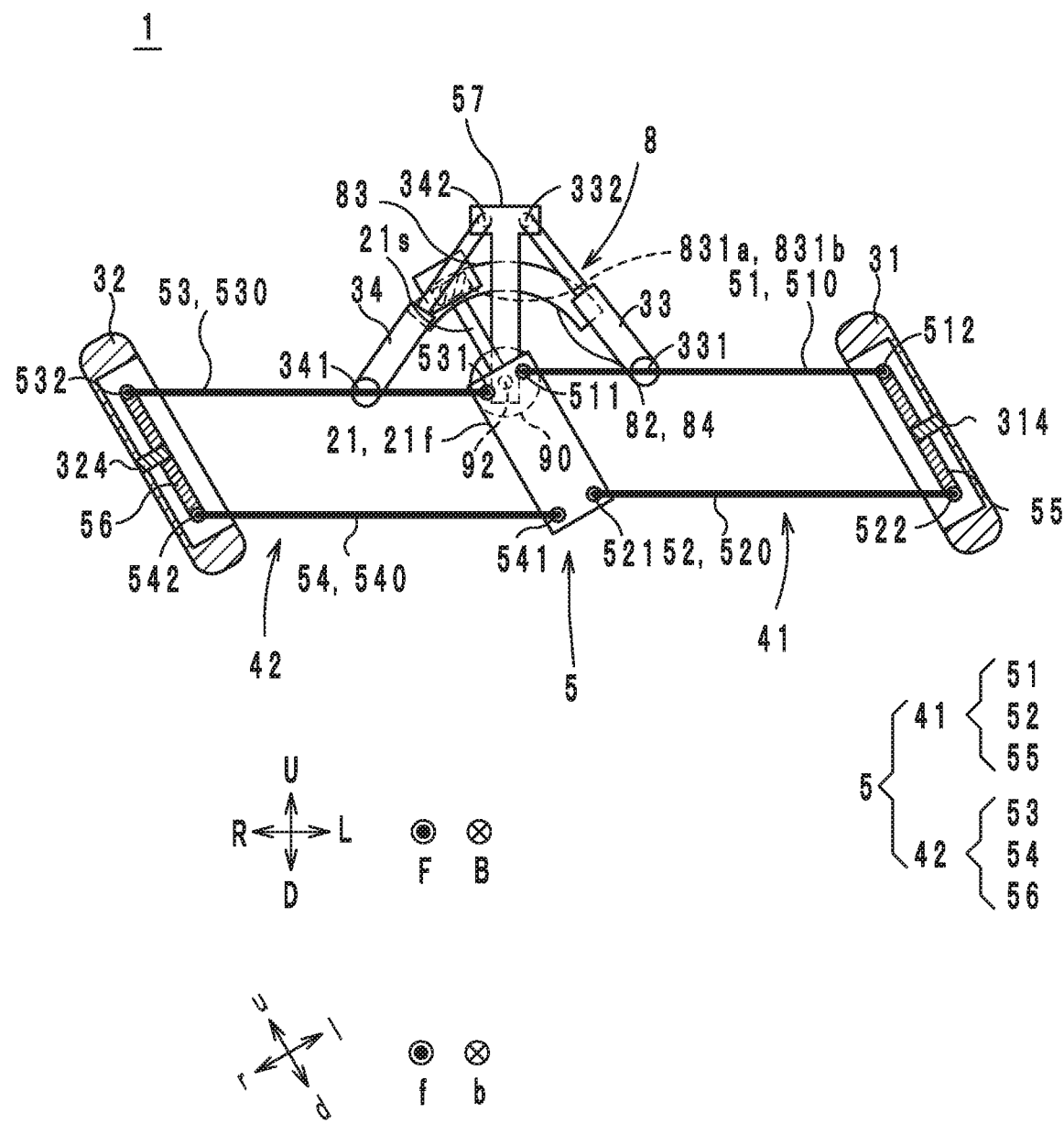
FIG. 11 is a schematic diagram of the front part of the leaning vehicle 1 as seen in the backward direction B.

Next, leaning operations of the leaning vehicle 1 will be described with reference to FIG. 10 and FIG. 11. FIG. 10 and FIG. 11 are schematic diagrams illustrating the front part of the leaning vehicle 1 as seen in the backward direction B. FIG. 10 illustrates a state when the vehicle body frame 21 is leaning to the left L. FIG. 11 illustrates a state when the vehicle body frame 21 is leaning to the right R.

First, an operation whereby the vehicle body frame 21 leans to the left L will be described with reference to FIG. 10. When the rider causes the vehicle body frame 21 to lean to the left L, the frame front part 21$f$ leans to the left L. Based on leaning of the vehicle body frame 21 that is detected by an unshown sensor, the actuator 90 generates a force that causes the vehicle body frame 21 to lean to the left L. When the frame front part 21$f$ leans to the left L, the left arm mechanism 41 swings in the upward direction u. When the left arm mechanism 41 swings in the upward direction u, the left knuckle 55 changes its position in the upward direction u while maintaining a parallel state with respect to the frame front part 21$f$. Accordingly, the left knuckle 55 leans to the left L together with the vehicle body frame 21. As a result, the left front wheel tire assembly 31 leans to the left L together with the left knuckle 55.

Further, when the frame front part 21$f$ leans to the left L, the right arm mechanism 42 swings in the downward direction d. When the right arm mechanism 42 swings in the downward direction d, the right knuckle 56 changes its position in the downward direction d while maintaining a parallel state with respect to the frame front part 21$f$. Accordingly, the right knuckle 56 leans to the left L together with the vehicle body frame 21. As a result, the right front wheel tire assembly 32 leans to the left L together with the right knuckle 56.

However, the left shock absorber 33 and the right shock absorber 34 try to maintain the same length as the length when the vehicle body frame 21 is in an upright state (that is, the length when in the state illustrated in FIG. 2). Therefore, the shock absorber tower 57 does not lean to the left L, and extends in the up-down direction UD.

Next, an operation whereby the vehicle body frame 21 leans to the right R will be described with reference to FIG. 11. When the rider causes the vehicle body frame 21 to lean to the right R, the frame front part 21$f$ leans to the right R. Based on leaning of the vehicle body frame 21 that is detected by an unshown sensor, the actuator 90 generates a force that causes the vehicle body frame 21 to lean to the right R. When the frame front part 21$f$ leans to the right R, the left arm mechanism 41 swings in the downward direction d. When the left arm mechanism 41 swings in the downward direction d, the left knuckle 55 changes its position in the downward direction d while maintaining a parallel state with respect to the frame front part 21$f$. Accordingly, the left knuckle 55 leans to the right R together with the vehicle body frame 21. As a result, the left front wheel tire assembly 31 leans to the right R together with the left knuckle 55.

Further, when the frame front part 21$f$ leans to the right R, the right arm mechanism 42 swings in the upward direction u. When the right arm mechanism 42 swings in the upward direction u, the right knuckle 56 changes its position in the upward direction u while maintaining a parallel state with respect to the frame front part 21$f$. Accordingly, the right knuckle 56 leans to the right R together with the vehicle body frame 21. As a result, the right front wheel tire assembly 32 leans to the right R together with the right knuckle 56.

However, the left shock absorber 33 and the right shock absorber 34 try to maintain the same length as the length when the vehicle body frame 21 is in an upright state (that is, the length when in the state illustrated in FIG. 2). Therefore, the shock absorber tower 57 does not lean to the right R, and extends in the up-down direction UD.

[Resistance Force Changing Mechanism]

Figure 12:
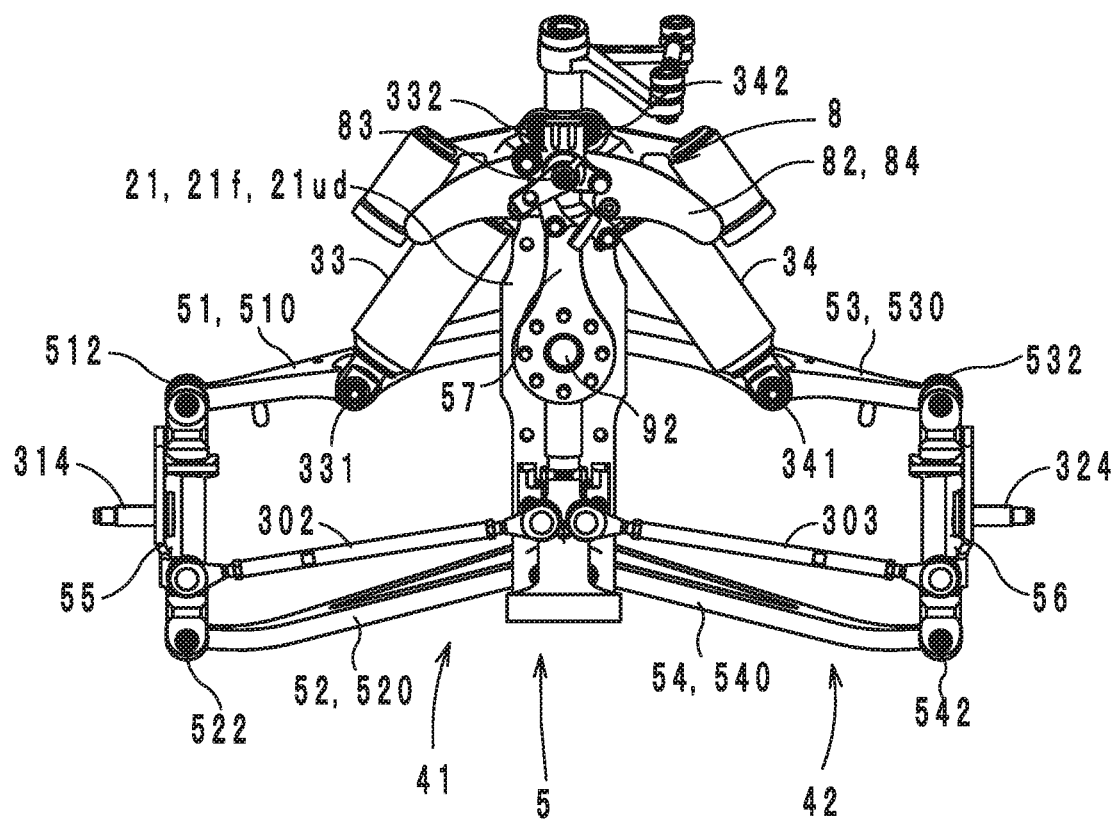
FIG. 12 is a view of the front part of the leaning vehicle 1 as seen in the frontward direction F.
Figure 12:
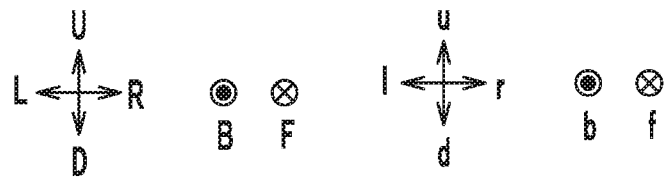

Next, the resistance force changing mechanism 8 will be described with reference to FIG. 2, FIG. 3 and FIG. 12. FIG. 12 is a view of the front part of the leaning vehicle 1 as seen in the frontward direction F.

As illustrated in FIG. 2 and FIG. 12, the leaning vehicle 1 includes the resistance force changing mechanism 8. The resistance force changing mechanism 8 is configured to change a resistance force that is applied with respect to operations in which the vehicle body frame 21 and the shock absorber tower 57 perform relative rotational movements. As illustrated in FIG. 2, as seen in the downward direction d, the resistance force changing mechanism 8 is provided at a position that is behind the shock absorber tower 57 in the backward direction b and is in front of the actuator 90 in the frontward direction f.

As illustrated in FIG. 2 and FIG. 12, the resistance force changing mechanism 8 includes a disk 82 and the caliper 83. The disk 82 includes a disk contact part 84 and a disk support part 85. As illustrated in FIG. 3 and FIG. 12, the disk contact part 84 is disposed behind the shock absorber tower 57 in the backward direction b. The disk contact part 84 is a plate-like member having a circular arc shape as seen in the frontward direction f. When the vehicle body frame 21 is in an upright state, the disk support part 85 supports the disk contact part 84 at a position that is further upward in the upward direction u than the tower central shaft 92. As illustrated in FIG. 3, FIG. 4 and FIG. 7, the disk support part 85 protrudes in the backward direction b from a rear face of the shock absorber tower 57. The disk contact part 84 is supported by the disk support part 85 at a back end of the disk support part 85. Further, a central axis of the circular arc of the disk contact part 84 coincides with the tower central shaft 92.

As illustrated in FIG. 3, the caliper 83 is fixed to a top end of the caliper support part 21s. The frame front part 21f is rotatable with respect to the shock absorber tower 57. Accordingly, the caliper 83 can change its position so as to follow an arc-shaped trajectory along the disk contact part 84.

As illustrated in FIG. 2 and FIG. 3, the caliper 83 includes pads 831a and 831b. The pad 831a is disposed in front of the disk contact part 84 in the frontward direction f. The pad 831b is disposed behind the disk contact part 84 in the backward direction b. An outer edge of the pad 831a and an outer edge of the pad 831b overlap so as to coincide with each other as seen in the frontward direction f. The pads 831a and 831b are made from a high friction material. The pads 831a and 831b can change their positions in the front-back direction fb so that a space between the pad 831a and the pad 831b changes in accordance with operation of a switch or a lever, not illustrated in the drawings, by the rider. The source of power for the change in position of the pads 831a and 831b may be hydraulic pressure, may be an electric motor or may be human power. In a state in which the space between the pad 831a and the pad 831b is relatively small, the pad 831a contacts a front face of the disk contact part 84, and the pad 831b contacts a rear face of the disk contact part 84. At such time, the caliper 83 holds the disk 82. A state in which the caliper 83 is holding the disk 82 is a locked state. In the locked state, leaning of the vehicle body frame 21 to the left L or the right R is inhibited. In contrast, in a state in which the space between the pad 831a and the pad 831b is relatively large, the pad 831a does not contact the front face of the disk contact part 84, and the pad 831b does not contact the rear face of the disk contact part 84. At such time, the caliper 83 does not hold the disk 82. A state in which the caliper 83 is not holding the disk 82 is an unlocked state. In the unlocked state, leaning of the vehicle body frame 21 to the left L or the right R is not inhibited.

[Action of Resistance Force Changing Mechanism]

Next, the action of the resistance force changing mechanism 8 will be described with reference to FIG. 10 and FIG. 11.

First, the action of the resistance force changing mechanism 8 when the vehicle body frame 21 leans to the left L will be described with reference to FIG. 10. When the rider causes the vehicle body frame 21 to lean to the left L, the frame front part 21f leans to the left L. The disk 82 is fixed to the shock absorber tower 57. On the other hand, the caliper 83 is fixed to the caliper support part 21s of the vehicle body frame 21. Therefore, as illustrated in FIG. 10, as seen in the backward direction b, the caliper 83 rotates clockwise with respect to the disk 82.

Next, the action of the resistance force changing mechanism 8 when the vehicle body frame 21 leans to the right R will be described with reference to FIG. 11. When the rider causes the vehicle body frame 21 to lean to the right R, the frame front part 21f leans to the right R. The disk 82 is fixed to the shock absorber tower 57. On the other hand, the caliper 83 is fixed to the caliper support part 21s of the vehicle body frame 21. Therefore, as illustrated in FIG. 11, as seen in the backward direction b, the caliper 83 rotates counterclockwise with respect to the disk 82.

In this connection, if an unshown switch or lever provided in the handle 301 (not illustrated in FIG. 10 and FIG. 11) is operated by the rider during an operation in which the disk 82 changes its position with respect to the caliper 83, the pad 831a contacts the front face of the disk contact part 84, and the pad 831b contacts the rear face of the disk contact part 84. As a result, a frictional force arises between the disk contact part 84 and the pads 831a and 831b, and a resistance force that is applied with respect to an operation whereby the disk 82 and the caliper 83 are displaced relative to each other increases. The disk 82 is fixed to the shock absorber tower 57. The caliper 83 is fixed to the caliper support part 21s. Accordingly, when the resistance force that is applied with respect to an operation whereby the disk 82 and the caliper 83 are displaced relative to each other increases, a resistance force that is applied with respect to an operation whereby the vehicle body frame 21 rotates relative to the shock absorber tower 57 also increases. In other words, a resistance force that is applied with respect to operations whereby the upper-left arm member 51, the lower-left arm member 52, the upper-right arm member 53 and the lower-right arm member 54 and the vehicle body frame 21 are relatively displaced increases. As described above, the resistance force changing mechanism 8 is configured so as to change a resistance force that is applied with respect to operations whereby the vehicle body frame 21 and a plurality of link members (the upper-left arm member 51, the lower-left arm member 52, the upper-right arm member 53 and the lower-right arm member 54) are relatively displaced, by changing a contact state between the pads 831a and 831b and the disk 82.

Effects

According to the leaning vehicle 1 configured as described above, the rigidity of the support mechanism for the shock absorber tower 57 can be maintained. A tensile load is mainly applied to the shock absorber tower 57, and it is difficult for a large bending load to be applied to the shock absorber tower 57. In general, it is easier to secure rigidity with respect to a tensile load than to secure rigidity with respect to a bending load. Therefore, it is easy to establish the function of the shock absorber tower 57 even without increasing the rigidity of the shock absorber tower 57. Accordingly, a thickness in the front-back direction fb of the shock absorber tower 57 can be reduced.

When the thickness in the front-back direction fb of the shock absorber tower 57 is small, it suffices that a shaft (support mechanism for the shock absorber tower in the vehicle body frame) for supporting the shock absorber tower 57 in the vehicle body frame 21 be short. It is easier to obtain high rigidity with a short shaft in comparison to a long shaft. Thus, the shock absorber tower 57 has a characteristic such that it is easy to secure the rigidity of the support mechanism for the shock absorber tower 57 in the vehicle body frame 21. Therefore, even if the shock absorber tower 57 is supported at a portion other than a portion located between the front end and back end of the upper-left-arm-member supported part 511 and a portion located between the front end and back end of the upper-right-arm-member supported part 531 in the vehicle body frame 21, the rigidity of the support mechanism for the shock absorber tower 57 in the vehicle body frame 21 is maintained.

Further, according to the leaning vehicle 1, a mechanism including the shock absorber tower 57 and the link mechanism 5 is reduced in size. More specifically, in the leaning vehicle 1, the shock absorber tower 57 is disposed further backward in the backward direction b than the upper-left-arm-member supported part 511 at which the upper-left arm member 51 to which the first end part 331 of the left shock absorber 33 is connected is supported by the vehicle body frame 21, and the upper-right-arm-member supported part 531 at which the upper-right arm member 53 to which the first end part 341 of the right shock absorber 34 is connected is supported by the vehicle body frame 21. Thus, the shock absorber tower 57 is not supported at a portion that is located between the front end and back end of the upper-left-arm-member supported part 511 and a portion that is located between the front end and back end of the upper-right-arm-member supported part 531 in the vehicle body frame 21. Therefore, a length between the front end and the back end of the upper-left-arm-member supported part 511 and a length between the front end and the back end of the upper-right-arm-member supported part 531 can be reduced.

In general, a length between the front end and back end of the upper-left-arm-member supported part 511 of the upper-left arm member 51 to which the first end part 331 of the left shock absorber 33 is connected is equal to or longer than the length between the front end and back end of the lower-left-arm-member supported part 521 of the lower-left arm member 52 to which the first end part 331 of the left shock absorber 33 is not connected. Similarly, a length between the front end and back end of the upper-right-arm-member supported part 531 of the upper-right arm member 53 to which the first end part 341 of the right shock absorber 34 is connected is equal to or longer than the length between the front end and back end of the lower-right-arm-member supported part 541 of the lower-right arm member 54 to which the first end part 341 of the right shock absorber 34 is not connected. Hence, the length of the link mechanism 5 in the front-back direction fb depends greatly on the length between the front end and back end of the upper-left-arm-member supported part 511 and the length between the front end and back end of the upper-right-arm-member supported part 531. Therefore, if the length between the front end and back end of the upper-left-arm-member supported part 511 and the length between the front end and back end of the upper-right-arm-member supported part 531 can be made smaller, the length of the link mechanism 5 in the front-back direction fb can be shortened. As a result, a reduction in size of the mechanism including the shock absorber tower 57 and the link mechanism 5 is achieved irrespective of the fact that a portion located between the front end and back end of the upper-left-arm-member supported part 511 and a portion located between the front end and back end of the upper-right-arm-member supported part 531 in the vehicle body frame 21 are not utilized to support the shock absorber tower 57.

Furthermore, according to the leaning vehicle 1, the degree of freedom regarding the positions of the left front wheel tire assembly 31 and the right front wheel tire assembly 32 in the vehicle body frame 21 can be increased. More specifically, in the leaning vehicle 1, the shock absorber tower 57 is disposed further backward in the backward direction b than the upper-left-arm-member supported part 511 at which the upper-left arm member 51 to which the first end part 331 of the left shock absorber 33 is connected is supported by the vehicle body frame 21, and the upper-right-arm-member supported part 531 at which the upper-right arm member 53 to which the first end part 341 of the right shock absorber 34 is connected is supported by the vehicle body frame 21. By this means, the movable range of the shock absorber tower 57 is separated from the movable range of the left arm mechanism 41 and the movable range of the right arm mechanism 42 in the front-back direction fb. Therefore, interference between the shock absorber tower 57 and the left arm mechanism 41 and between the shock absorber tower 57 and right arm mechanism 42 can be avoided comparatively easily. That is, with respect to the design of the left arm mechanism 41 and the right arm mechanism 42, a restriction for preventing the interference between the shock absorber tower 57 and the left arm mechanism 41 and between the shock absorber tower 57 and right arm mechanism 42 is alleviated. As a result, the degree of design freedom with respect to the left arm mechanism 41 and the right arm mechanism 42 increases.

When the degree of design freedom with respect to the left arm mechanism 41 and the right arm mechanism 42 increases as described above, the degree of freedom with respect to the positional relation between the upper-left-arm-member supported part 511 and the left knuckle 55 and the positional relation between the upper-right-arm-member supported part 531 and the right knuckle 56 increases. As a result, by devising a suitable design with respect to the shape of the upper-left arm member 51 and the upper-right arm member 53, the degree of freedom regarding the positions of the left front wheel tire assembly 31 and the right front wheel tire assembly 32 in the vehicle body frame 21 can be increased.

Further, according to the leaning vehicle 1, a reduction in size of the mechanism including the shock absorber tower 57 and the link mechanism 5 is achieved. In general, a length between the front end and back end of the upper-left-arm-member supported part 511 of the upper-left arm member to which the first end part 331 of the left shock absorber 33 is connected is equal to or longer than the length between the front end and back end of the lower-left-arm-member supported part 521 of the lower-left arm member 52 to which the first end part 331 of the left shock absorber 33 is not connected. Similarly, a length between the front end and back end of the upper-right-arm-member supported part 531 of the upper-right arm member 53 to which the first end part 341 of the right shock absorber 34 is connected is equal to or longer than the length between the front end and back end of the lower-right-arm-member supported part 541 of the lower-right arm member 54 to which the first end part 341 of the right shock absorber 34 is not connected. Hence, the length of the link mechanism 5 in the front-back direction fb depends greatly on the length between the front end and back end of the upper-left-arm-member supported part 511 and the length between the front end and back end of the upper-right-arm-member supported part 531. Therefore, in the leaning vehicle 1, the length in the front-back direction fb between the front end and back end of the upper-left-arm-member supported part 511 is short. Further, the length in the front-back direction fb between the front end and back end of the upper-right-arm-member supported part 531 is short. As a result, a reduction in size of the mechanism including the shock absorber tower 57 and the link mechanism 5 is achieved.

Further, according to the leaning vehicle 1, the first end part 331 of the left shock absorber 33 is connected to the upper-left arm member. Since a large force is applied from the left shock absorber 33 to the upper-left-arm-member supported part 511, the upper-left-arm-member supported part 511 is required to have high rigidity. Therefore, in the leaning vehicle 1, the upper-left arm member 51 extends continuously in the front-back direction fb between the front end and back end of the upper-left-arm-member supported part 511. Thus, there is no discontinuity between the front end and back end of the upper-left-arm-member supported part 511. As a result, the rigidity of the upper-left-arm-member supported part 511 is enhanced. Further, the first end part 341 of the right shock absorber 34 is connected to the upper-right arm member 53. Since a large force is applied from the right shock absorber 34 to the upper-right-arm-member supported part 531, the upper-right-arm-member supported part 531 is required to have high rigidity. Therefore, in the leaning vehicle 1, the upper-right arm member 53 extends continuously in the front-back direction fb between the front end and back end of the upper-right-arm-member supported part 531. Thus, there is no discontinuity between the front end and back end of the upper-right-arm-member supported part 531. As a result, the rigidity of the upper-right-arm-member supported part 531 is enhanced.

Furthermore, according to the leaning vehicle 1, the lower-left-arm-member supported part 521 extends continuously in the front-back direction fb between the front end and back end of the lower-left-arm-member supported part 521. Therefore, there is no discontinuity between the front end and back end of the lower-left-arm-member supported part 521. Further, the lower-right-arm-member supported part 541 extends continuously in the front-back direction fb between the front end and back end of the lower-right-arm-member supported part 541. Thus, there is no discontinuity between the front end and back end of the lower-right-arm-member supported part 541. It is thereby easy to secure the rigidity of the lower-left-arm-member supported part 521 and the lower-right-arm-member supported part 541.

In addition, according to the leaning vehicle 1, the first end part 331 of the left shock absorber 33 is connected to the upper-left arm member 51. Since a large force is applied from the left shock absorber 33 to the upper-left-arm-member supported part 511, a portion that supports the upper-left-arm-member supported part 511 in the vehicle body frame 21 is required to have high rigidity. Therefore, in the leaning vehicle 1, the vehicle body frame 21 includes the up-down frame part 21ud that extends in the up-down direction ud between the back end of the upper-left-arm-member supported part 511 and the shock absorber tower 57. By this means, the back end of the upper-left-arm-member supported part 511 is supported by the up-down frame part 21ud, and the support structure of the upper-left-arm-member supported part 511 thus has high rigidity. Further, the first end part 341 of the right shock absorber 34 is connected to the upper-right arm member 53. Since a large force is applied from the right shock absorber 34 to the upper-right-arm-member supported part 531, a portion that supports the upper-right-arm-member supported part 531 in the vehicle body frame 21 is required to have high rigidity. Therefore, in the leaning vehicle 1, the vehicle body frame 21 includes the up-down frame part 21ud that extends in the up-down direction ud between the back end of the upper-right-arm-member supported part 531 and the shock absorber tower 57. By this means, the back end of the upper-right-arm-member supported part 531 is supported by the up-down frame part 21ud, and the support structure of the upper-right-arm-member supported part 531 thus has high rigidity.

According to the leaning vehicle 1, the plate-shaped frame front part 21f that extends in the up-down direction ud is present between the upper-left-arm-member supported part 511 and the upper-right-arm-member supported part 531.

Furthermore, the plate-shaped frame front part 21f that extends in the up-down direction ud is present between the lower-left-arm-member supported part 521 and the lower-right-arm-member supported part 541. By this means, the back end of the lower-left-arm-member supported part 521 and the back end of the lower-right-arm-member supported part 541 are supported by the up-down frame part 21ud. Thus, enhancement of the rigidity of the frame front part 21f that supports the link mechanism 5 is achieved.

[First Modification]

Figure 13:
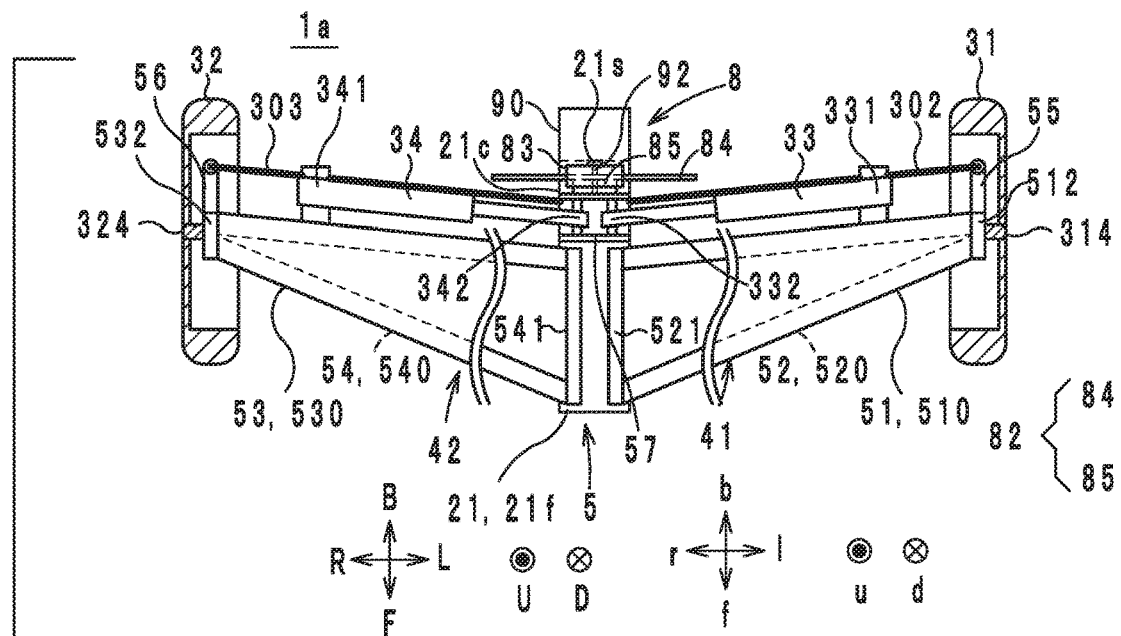
FIG. 13 is a multiple view drawing showing schematic diagrams of a leaning vehicle 1a as seen in the downward direction D and backward direction B.
Figure 13:
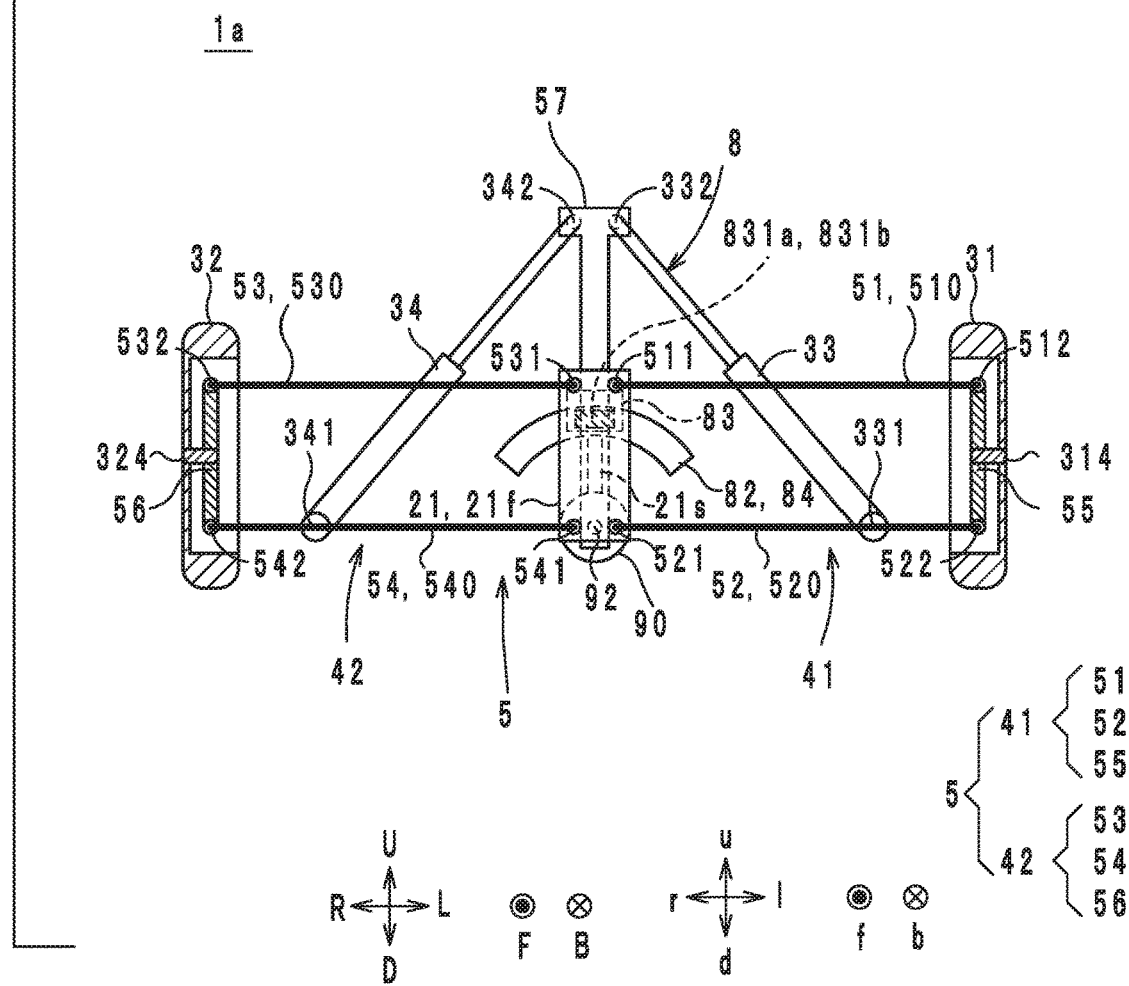

Hereinafter, a leaning vehicle 1a according to a first modification will be described with reference to FIG. 13. FIG. 13 is a multiple view drawing showing schematic diagrams of a front part of the leaning vehicle 1a as seen in the downward direction D and the backward direction B. In FIG. 13, to facilitate understanding, schematic diagrams in which the respective components are simplified are illustrated. Therefore, the sizes of the respective components in FIG. 13 differ from the actual sizes thereof. Further, in FIG. 13, a part of the upper-left arm member 51 and a part of the upper-right arm member 53 are not shown, and instead a part of the lower-left arm member 52 and the lower-right arm member 54 are shown.

The leaning vehicle 1a differs from the leaning vehicle 1 in the following respects: the first end part 331 of the left shock absorber 33 is connected to the lower-left arm member 52; the first end part 341 of the right shock absorber 34 is connected to the lower-right arm member 54; and the resistance force changing mechanism 8 and the actuator 90 are disposed at a lower part of the frame front part 21f. Further, in the leaning vehicle 1a, the vehicle body frame 21 includes the up-down frame part 21ud that extends in the up-down direction ud between the back end of the lower-left-arm-member supported part 521 and the shock absorber tower 57. The vehicle body frame 21 includes the up-down frame part 21ud that extends in the up-down direction ud between the back end of the lower-right-arm-member supported part 541 and the shock absorber tower 57.

In the leaning vehicle 1a described above, the shock absorber tower 57 is disposed further backward in the backward direction b than the lower-left-arm-member supported part 521 at which the lower-left arm member 52 to which the first end part 331 of the left shock absorber 33 is connected is supported by the vehicle body frame 21, and the lower-right-arm-member supported part 541 at which the lower-right arm member 54 to which the first end part 341 of the right shock absorber 34 is connected is supported by the vehicle body frame 21. Further, when seen in the backward direction b, the actuator 90 and the tower central shaft 92 are disposed in the vicinity of the lower-left-arm-member supported part 521 and the lower-right-arm-member supported part 541. Furthermore, when seen in the backward direction b, the disk 82 and the caliper 83 are disposed in the vicinity of the upper-left-arm-member supported part 511 and the upper-right-arm-member supported part 531. The other components of the leaning vehicle 1a are the same as in the leaning vehicle 1, and hence a description thereof is omitted here.

According to the leaning vehicle 1a configured as described above, for the same reason as described above with respect to the leaning vehicle 1, the degree of freedom regarding the positions of the left front wheel tire assembly 31 and the right front wheel tire assembly 32 in the vehicle body frame 21 can be increased while maintaining the rigidity of the support mechanism for the shock absorber tower 57 in the vehicle body frame 21. Further, according to the leaning vehicle 1a, for the same reason as described above with respect to the leaning vehicle 1, it is easy to secure the rigidity of the upper-left-arm-member supported part 511, the upper-right-arm-member supported part 531, the lower-left-arm-member supported part 521 and the lower-right-arm-member supported part 541. In addition, according to the leaning vehicle 1a, for the same reason as described above with respect to the leaning vehicle 1, enhancement of the rigidity of the frame front part 21f that supports the link mechanism 5 is achieved.

Further, according to the leaning vehicle 1a, a mechanism including the shock absorber tower 57 and the link mechanism 5 is reduced in size. More specifically, in the leaning vehicle 1a, the shock absorber tower 57 is disposed further backward in the backward direction b than the lower-left-arm-member supported part 521 at which the lower-left arm member 52 to which the first end part 331 of the left shock absorber 33 is connected is supported by the vehicle body frame 21, and the lower-right-arm-member supported part 541 at which the lower-right arm member 54 to which the first end part 341 of the right shock absorber 34 is connected is supported by the vehicle body frame 21. Thus, the shock absorber tower 57 is not supported at a portion located between the front end and back end of the lower-left-arm-member supported part 521 and a portion located between the front end and back end of the lower-right-arm-member supported part 541 in the vehicle body frame 21. Therefore, the length between the front end and the back end of the lower-left-arm-member supported part 521 and the length between the front end and the back end of the lower-right-arm-member supported part 541 can be reduced.

In general, a length between the front end and back end of the lower-left-arm-member supported part 521 of the lower-left arm member 52 to which the first end part 331 of the left shock absorber 33 is connected is equal to or longer than the length between the front end and back end of the upper-left-arm-member supported part 511 of the upper-left arm member 51 to which the first end part 331 of the left shock absorber 33 is not connected. Similarly, a length between the front end and back end of the lower-right-arm-member supported part 541 of the lower-right arm member 54 to which the first end part 341 of the right shock absorber 34 is connected is equal to or longer than the length between the front end and back end of the upper-right-arm-member supported part 531 of the upper-right arm member 53 to which the first end part 341 of the right shock absorber 34 is not connected. Hence, the length of the link mechanism 5 in the front-back direction fb depends greatly on the length between the front end and back end of the lower-left-arm-member supported part 521 and the length between the front end and back end of the lower-right-arm-member supported part 541. Therefore, if the length between the front end and back end of the lower-left-arm-member supported part 521 and the length between the front end and back end of the lower-right-arm-member supported part 541 can be made smaller, the length of the link mechanism 5 in the front-back direction fb can be shortened. As a result, a reduction in size of the mechanism including the shock absorber tower 57 and the link mechanism 5 is achieved irrespective of the fact that a portion located between the front end and back end of the lower-left-arm-member supported part 521 and a portion located between the front end and back end of the lower-right-arm-member supported part 541 in the vehicle body frame 21 are not utilized to support the shock absorber tower 57.

Furthermore, according to the leaning vehicle 1a, for the reason described hereunder also, a reduction in size of the mechanism including the shock absorber tower 57 and the link mechanism 5 is achieved. More specifically, in general, a length between the front end and back end of the lower-left-arm-member supported part 521 of the lower-left arm member 52 to which the first end part 331 of the left shock absorber 33 is connected is equal to or longer than the length between the front end and back end of the upper-left-arm-member supported part 511 of the upper-left arm member 51 to which the first end part 331 of the left shock absorber 33 is not connected. Similarly, a length between the front end and back end of the lower-right-arm-member supported part 541 of the lower-right arm member 54 to which the first end part 341 of the right shock absorber 34 is connected is equal to or longer than the length between the front end and back end of the upper-right-arm-member supported part 531 of the upper-right arm member 53 to which the first end part 341 of the right shock absorber 34 is not connected. Hence, the length of the link mechanism 5 in the front-back direction fb depends greatly on the length between the front end and back end of the lower-left-arm-member supported part 521 and the length between the front end and back end of the lower-right-arm-member supported part 541. Therefore, in the leaning vehicle 1a, the length in the front-back direction fb between the front end and back end of the lower-left-arm-member supported part 521 is short. Further, the length in the front-back direction fb between the front end and back end of the lower-right-arm-member supported part 541 is short. As a result, the size of the mechanism including the shock absorber tower 57 and the link mechanism 5 is reduced.

In addition, according to the leaning vehicle 1a, the first end part 331 of the left shock absorber 33 is connected to the lower-left arm member 52. Since a large force is applied from the left shock absorber 33 to the lower-left-arm-member supported part 521, the lower-left-arm-member supported part 521 is required to have high rigidity. Therefore, in the leaning vehicle 1a, the lower-left arm member 52 extends continuously in the front-back direction fb between the front end and back end of the lower-left-arm-member supported part 521. Thus, there is no discontinuity between the front end and back end of the lower-left-arm-member supported part 521. As a result, the rigidity of the lower-left-arm-member supported part 521 is enhanced. Further, the first end part 341 of the right shock absorber 34 is connected to the lower-right arm member 54. Since a large force is applied from the right shock absorber 34 to the lower-right-arm-member supported part 541, the lower-right-arm-member supported part 541 is required to have high rigidity. Therefore, in the leaning vehicle 1a, the lower-right arm member 54 extends continuously in the front-back direction fb between the front end and back end of the lower-right-arm-member supported part 541. Thus, there is no discontinuity between the front end and back end of the lower-right-arm-member supported part 541. As a result, the rigidity of the lower-right-arm-member supported part 541 is enhanced.

[Second Modification]

Figure 14:
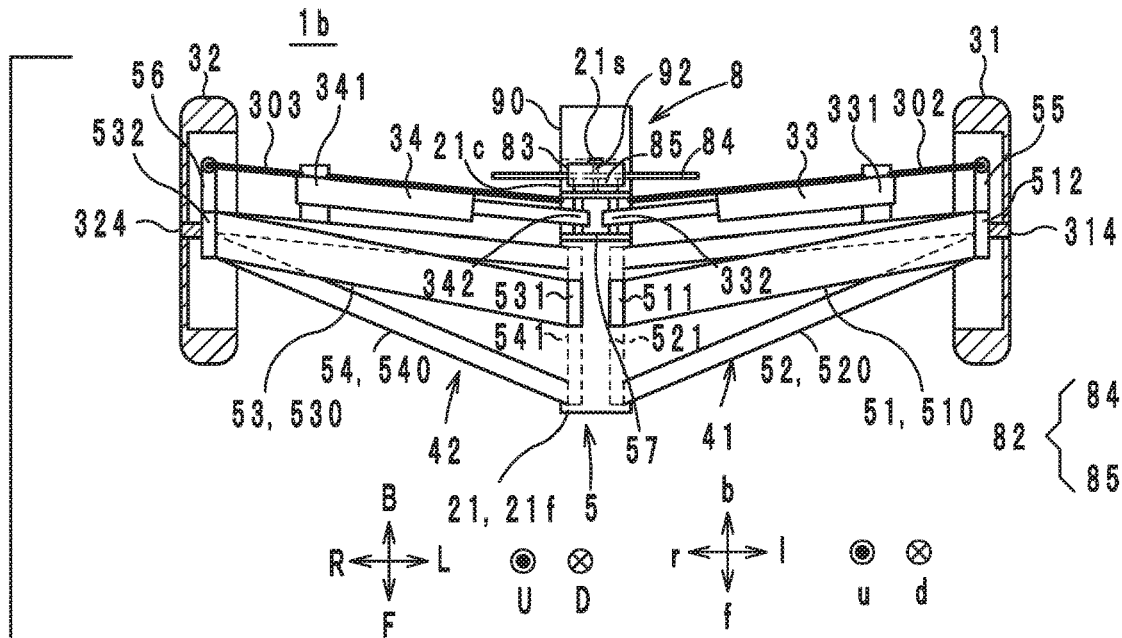
FIG. 14 is a multiple view drawing showing schematic diagrams of a leaning vehicle 1b as seen in the downward direction D and backward direction B.
Figure 14:
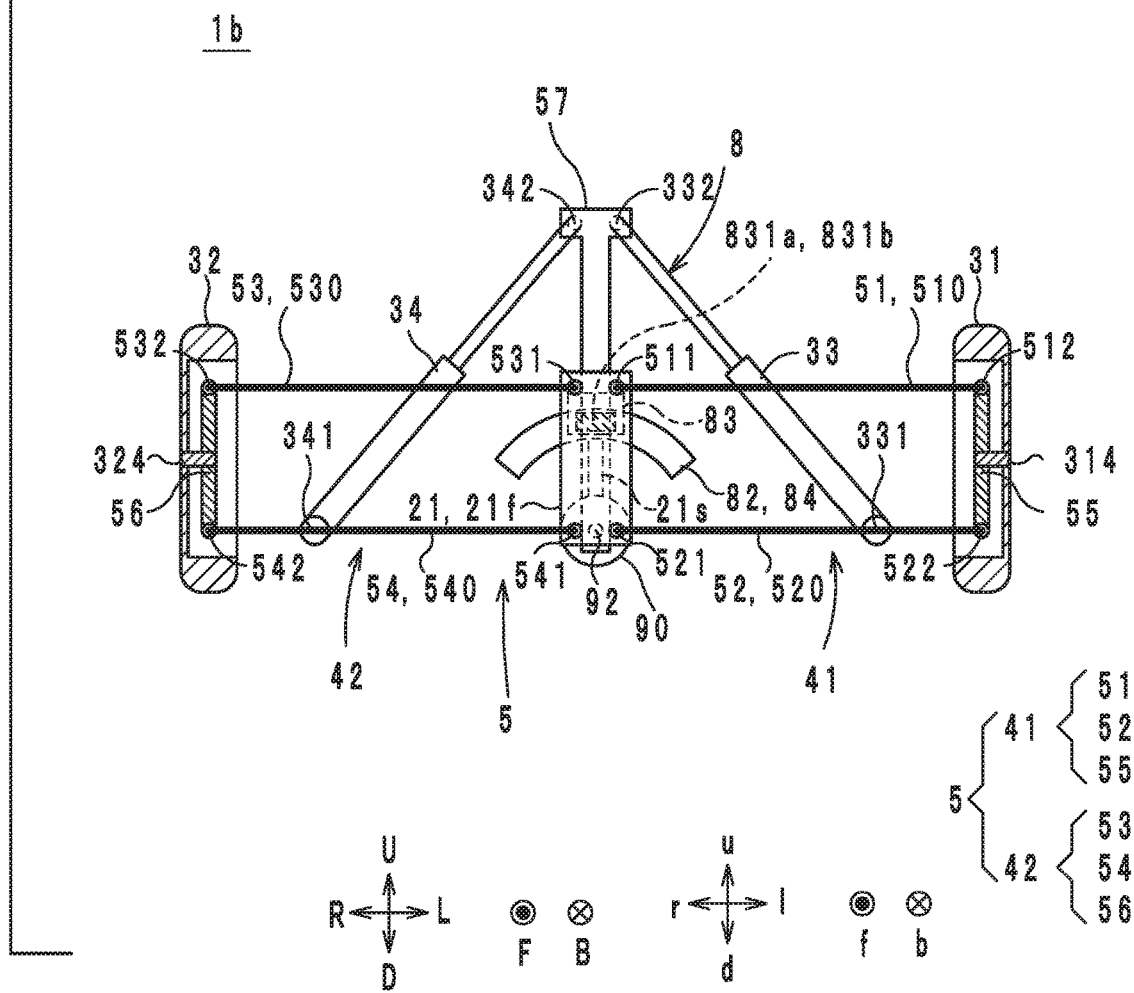

Hereinafter, a leaning vehicle 1b according to a second modification will be described with reference to FIG. 14. FIG. 14 is a multiple view drawing showing schematic diagrams of a front part of the leaning vehicle 1b as seen in the downward direction D and the backward direction B. In FIG. 14, to facilitate understanding, schematic diagrams in which the respective components are simplified are illustrated. Therefore, the sizes of the respective components in FIG. 14 differ from the actual sizes thereof.

The leaning vehicle 1b differs from the leaning vehicle 1a in the respect that a width in the front-back direction fb of the upper-left arm member 51 and a width in the front-back direction fb of the upper-right arm member 53 are narrow. Therefore, in the leaning vehicle 1b, a length between the front end and back end of the upper-left-arm-member supported part 511 is less than a length between the front end and back end of the lower-left-arm-member supported part 521. Further, a length between the front end and back end of the upper-right-arm-member supported part 531 is less than a length between the front end and back end of the lower-right-arm-member supported part 541. The other components of the leaning vehicle 1b are the same as in the leaning vehicle 1a, and hence a description thereof is omitted here.

According to the leaning vehicle 1b configured as described above, for the same reason as described above with respect to the leaning vehicle 1a, a reduction in size of a mechanism including the shock absorber tower 57 and the link mechanism 5 can be achieved, and the degree of freedom regarding the positions of the left front wheel tire assembly 31 and the right front wheel tire assembly 32 in the vehicle body frame 21 can be increased while maintaining the rigidity of the support mechanism for the shock absorber tower 57 in the vehicle body frame 21. Further, according to the leaning vehicle 1b, for the same reason as described above with respect to the leaning vehicle 1a, it is easy to secure the rigidity of the upper-left-arm-member supported part 511, the upper-right-arm-member supported part 531, the lower-left-arm-member supported part 521 and the lower-right-arm-member supported part 541. Furthermore, according to the leaning vehicle 1b, for the same reason as described above with respect to the leaning vehicle 1a, the support structure of the lower-left-arm-member supported part 521 and the support structure of the lower-right-arm-member supported part 541 each have high rigidity. In addition, according to the leaning vehicle 1b, for the same reason as described above with respect to the leaning vehicle 1a, the rigidity of the frame front part 21f that supports the link mechanism 5 is enhanced.

[Third Modification]

Figure 15:
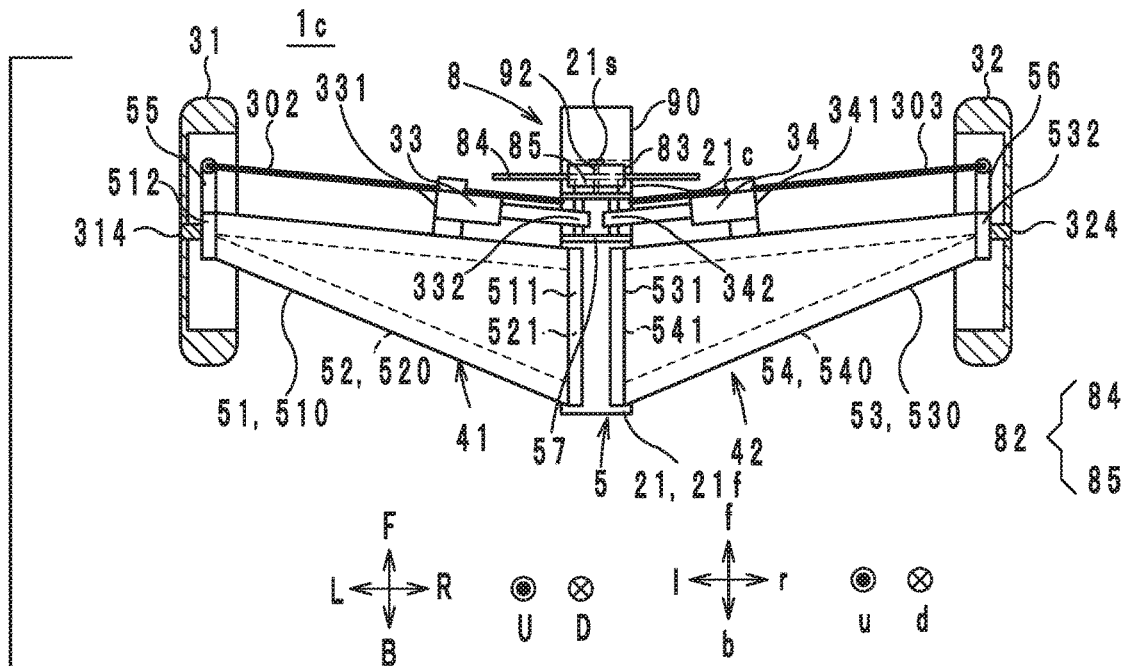
FIG. 15 is a multiple view drawing showing schematic diagrams of a leaning vehicle 1c as seen in the downward direction D and frontward direction F.
Figure 15:
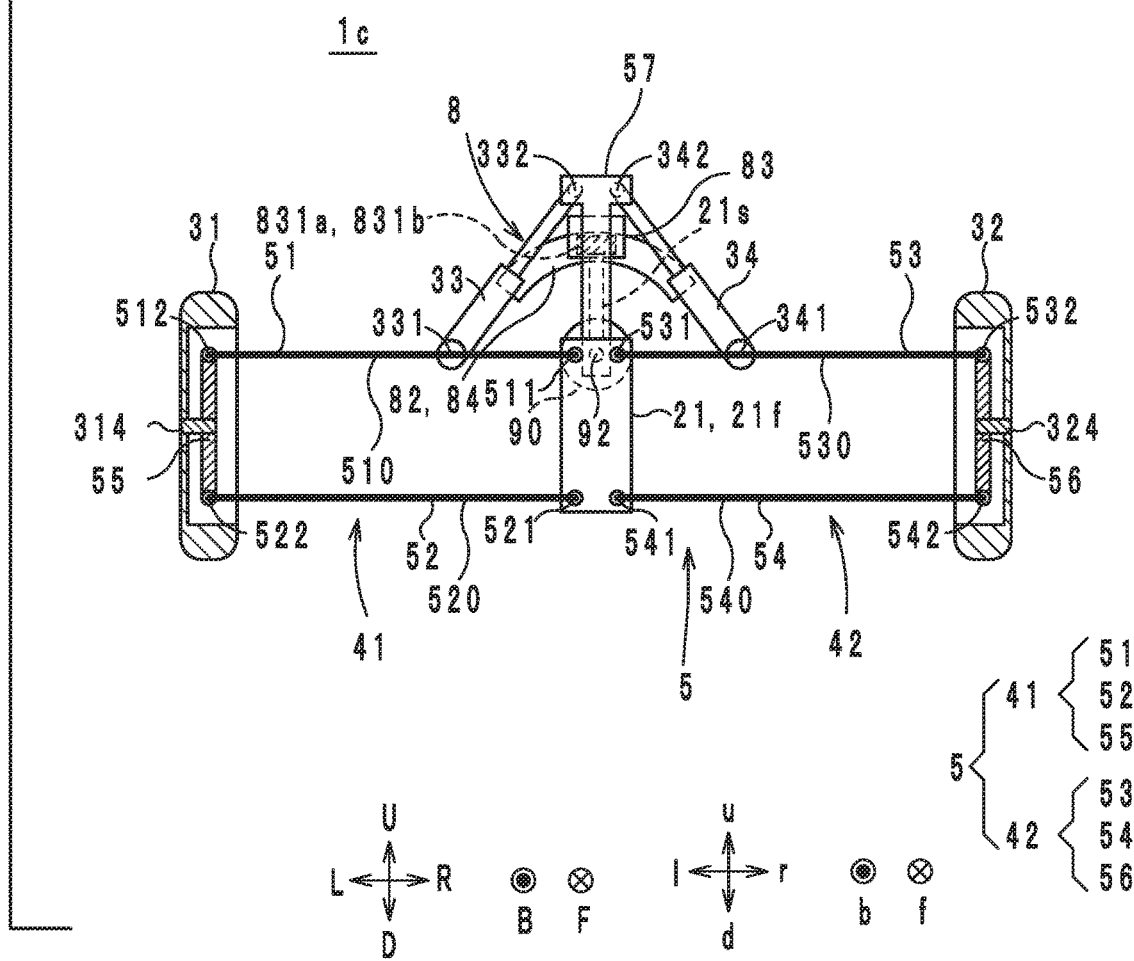

Hereinafter, a leaning vehicle 1c according to a third modification will be described with reference to FIG. 15. FIG. 15 is a multiple view drawing showing schematic diagrams of a front part of the leaning vehicle 1c as seen in the downward direction D and the frontward direction F. In FIG. 15, to facilitate understanding, schematic diagrams in which the respective components are simplified are illustrated. Therefore, the sizes of the respective components in FIG. 15 differ from the actual sizes thereof.

The leaning vehicle 1c differs from the leaning vehicle 1 in the respect that the left shock absorber 33, the right shock absorber 34, the shock absorber tower 57, the resistance force changing mechanism 8 and the actuator 90 are disposed further forward in the frontward direction f than the upper-left-arm-member supported part 511, the upper-right-arm-member supported part 531, the lower-left-arm-member supported part 521 and the lower-right-arm-member supported part 541. By this means, the shock absorber tower 57 is disposed further forward in the frontward direction f than the upper-left-arm-member supported part 511 at which the upper-left arm member 51 to which the first end part 331 of the left shock absorber 33 is connected is supported by the vehicle body frame 21, and the upper-right-arm-member supported part 531 at which the upper-right arm member 53 to which the first end part 341 of the right shock absorber 34 is connected is supported by the vehicle body frame 21. The other components of the leaning vehicle 1c are the same as in the leaning vehicle 1, and hence a description thereof is omitted here.

According to the leaning vehicle 1c configured as described above, for the same reason as described above with respect to the leaning vehicle 1, a reduction in size of a mechanism including the shock absorber tower 57 and the link mechanism 5 can be achieved, and the degree of freedom regarding the positions of the left front wheel tire assembly 31 and the right front wheel tire assembly 32 in the vehicle body frame 21 can be increased while maintaining the rigidity of the support mechanism for the shock absorber tower 57 in the vehicle body frame 21. Further, according to the leaning vehicle 1c, for the same reason as described above with respect to the leaning vehicle 1, it is easy to secure the rigidity of the upper-left-arm-member supported part 511, the upper-right-arm-member supported part 531, the lower-left-arm-member supported part 521 and the lower-right-arm-member supported part 541. Furthermore, according to the leaning vehicle 1c, for the same reason as described above with respect to the leaning vehicle 1, the support structure of the upper-left-arm-member supported part 511 and the support structure of the upper-right-arm-member supported part 531 each have high rigidity. In addition, according to the leaning vehicle 1c, for the same reason as described above with respect to the leaning vehicle 1, the rigidity of the frame front part 21f that supports the link mechanism 5 is enhanced.

[Fourth Modification]

Figure 16:
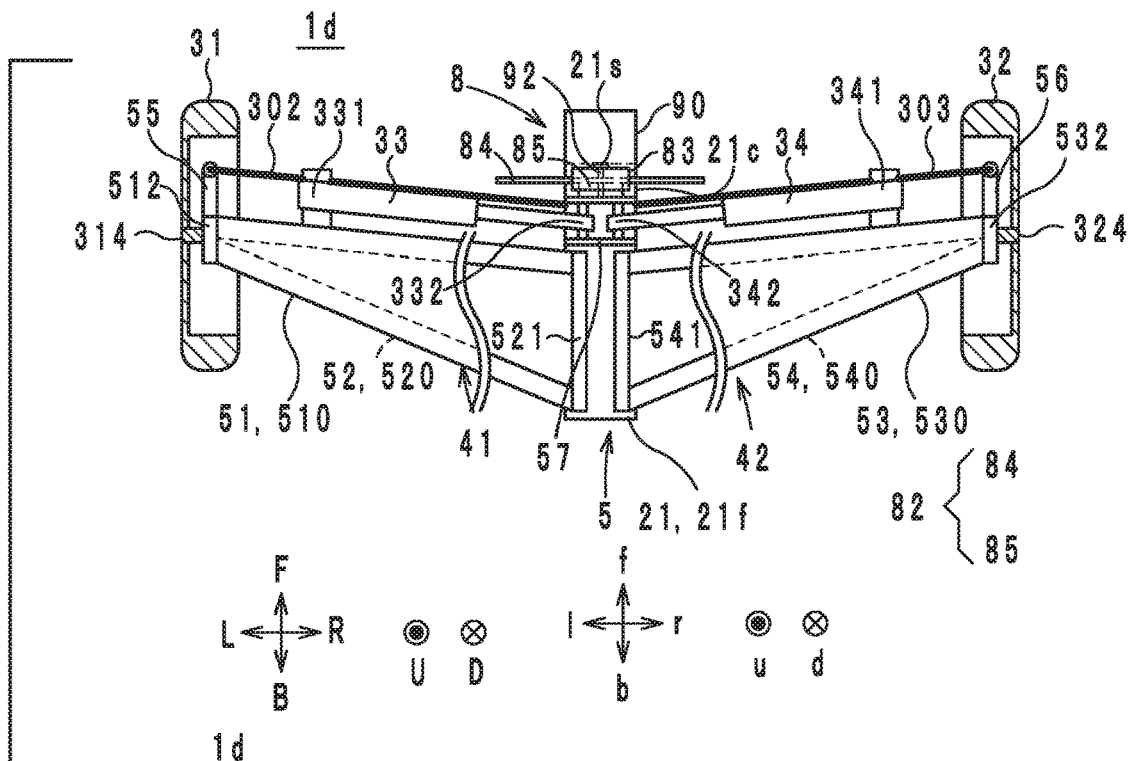
FIG. 16 is a multiple view drawing showing schematic diagrams of a leaning vehicle 1d as seen in the downward direction D and frontward direction F.
Figure 16:
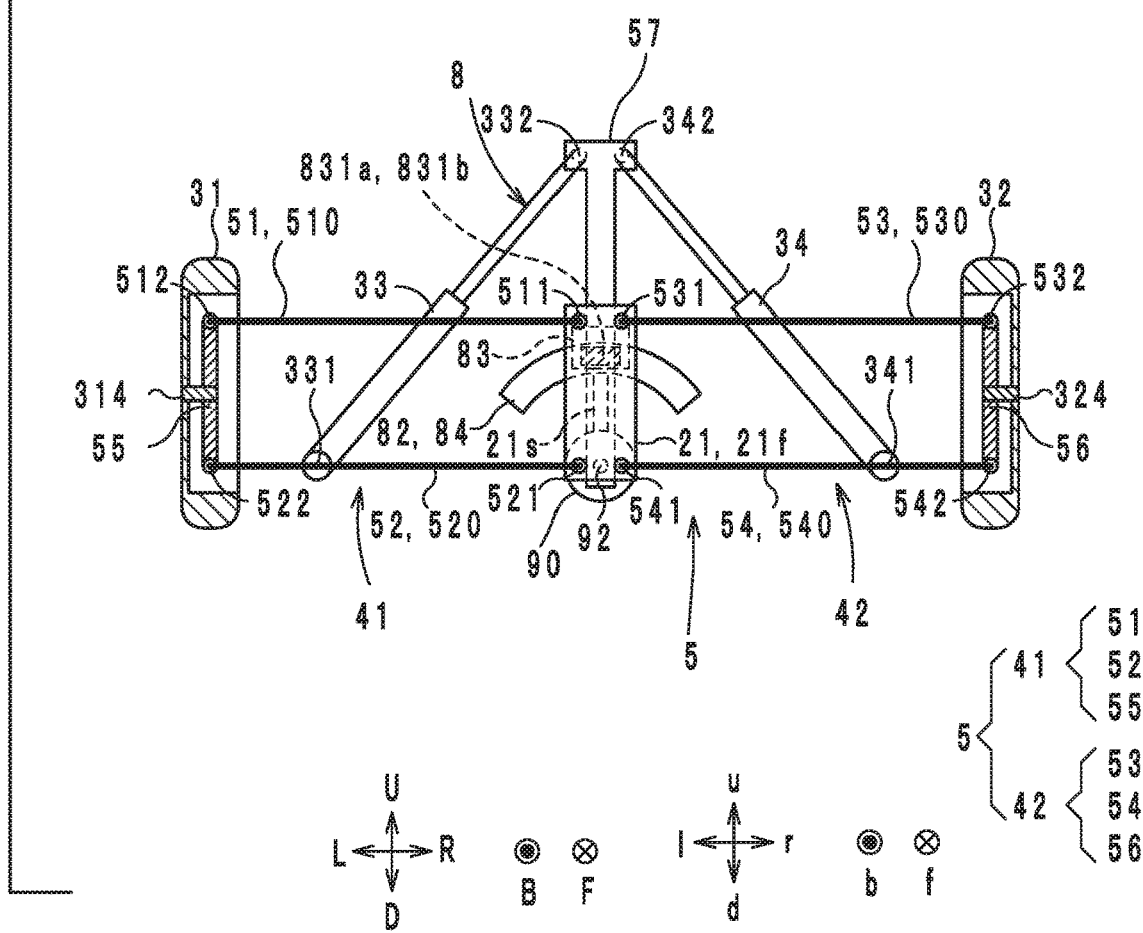

Hereinafter, a leaning vehicle 1d according to a fourth modification will be described with reference to FIG. 16. FIG. 16 is a multiple view drawing showing schematic diagrams of a front part of the leaning vehicle 1d as seen in the downward direction D and the frontward direction F. In FIG. 16, to facilitate understanding, schematic diagrams in which the respective components are simplified are illustrated. Therefore, the sizes of the respective components in FIG. 16 differ from the actual sizes thereof.

The leaning vehicle 1d differs from the leaning vehicle 1a in the respect that the left shock absorber 33, the right shock absorber 34, the shock absorber tower 57, the resistance force changing mechanism 8 and the actuator 90 are disposed further forward in the frontward direction f than the upper-left-arm-member supported part 511, the upper-right-arm-member supported part 531, the lower-left-arm-member supported part 521 and the lower-right-arm-member supported part 541. By this means, the shock absorber tower 57 is disposed further forward in the frontward direction f than the lower-left-arm-member supported part 521 at which the lower-left arm member 52 to which the first end part 331 of the left shock absorber 33 is connected is supported by the vehicle body frame 21, and the lower-right-arm-member supported part 541 at which the lower-right arm member 54 to which the first end part 341 of the right shock absorber 34 is connected is supported by the vehicle body frame 21. The other components of the leaning vehicle 1d are the same as in the leaning vehicle 1a, and hence a description thereof is omitted here.

According to the leaning vehicle 1d configured as described above, for the same reason as described above with respect to the leaning vehicle 1a, a reduction in size of a mechanism including the shock absorber tower 57 and the link mechanism 5 can be achieved, and the degree of freedom regarding the positions of the left front wheel tire assembly 31 and the right front wheel tire assembly 32 in the vehicle body frame 21 can be increased while maintaining the rigidity of the support mechanism for the shock absorber tower 57 in the vehicle body frame 21. Further, according to the leaning vehicle 1d, for the same reason as described above with respect to the leaning vehicle 1a, it is easy to secure the rigidity of the upper-left-arm-member supported part 511, the upper-right-arm-member supported part 531, the lower-left-arm-member supported part 521 and the lower-right-arm-member supported part 541. Furthermore, according to the leaning vehicle 1d, for the same reason as described above with respect to the leaning vehicle 1a, the support structure of the lower-left-arm-member supported part 521 and the support structure of the lower-right-arm-member supported part 541 each have high rigidity. In addition, according to the leaning vehicle 1d, for the same reason as described above with respect to the leaning vehicle 1a, the rigidity of the frame front part 21f that supports the link mechanism 5 is enhanced.

[Fifth Modification]

Figure 17:
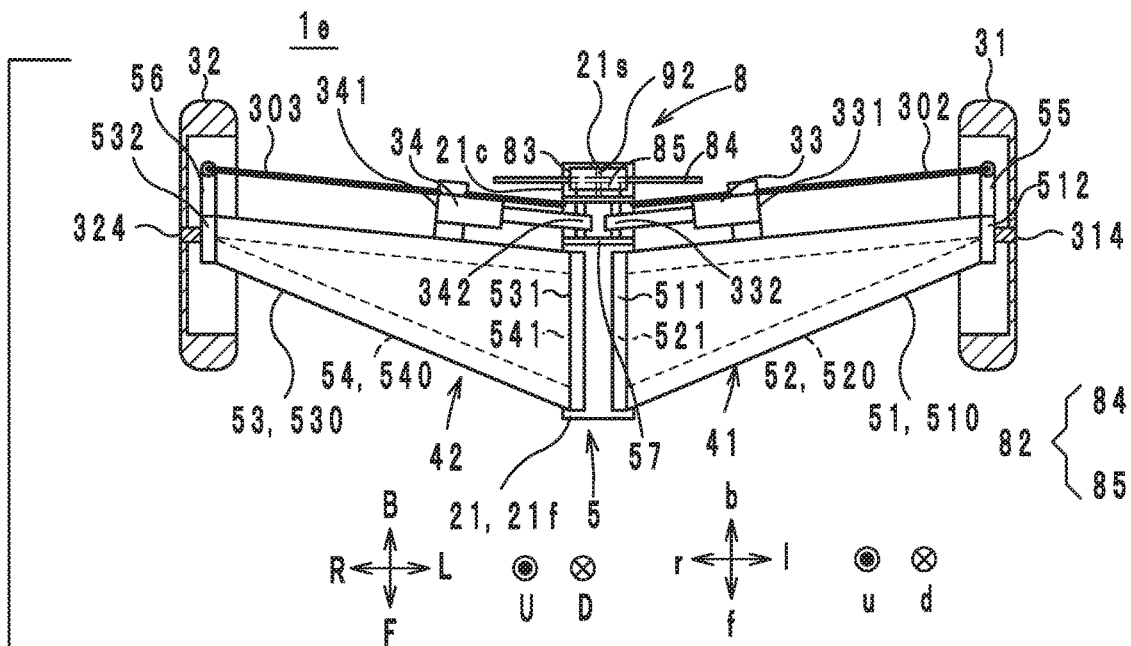
FIG. 17 is a multiple view drawing showing schematic diagrams of a leaning vehicle 1e as seen in the downward direction D and backward direction B.

Hereinafter, a leaning vehicle 1e according to a fifth modification will be described with reference to FIG. 17. FIG. 17 is a multiple view drawing showing schematic diagrams of a front part of the leaning vehicle 1e as seen in the downward direction D and the backward direction B. In FIG. 17, to facilitate understanding, schematic diagrams in which the respective components are simplified are illustrated. Therefore, the sizes of the respective components in FIG. 17 differ from the actual sizes thereof.

The leaning vehicle 1e differs from the leaning vehicle 1 in the respect that the leaning vehicle 1e does not include the actuator 90. The other components of the leaning vehicle 1e are the same as in the leaning vehicle 1, and hence a description thereof is omitted here.

According to the leaning vehicle 1e configured as described above, for the same reason as described above with respect to the leaning vehicle 1, a reduction in size of a mechanism including the shock absorber tower 57 and the link mechanism 5 can be achieved, and the degree of freedom regarding the positions of the left front wheel tire assembly 31 and the right front wheel tire assembly 32 in the vehicle body frame 21 can be increased while enhancing the rigidity of the support mechanism for the shock absorber tower 57 in the vehicle body frame 21. Further, according to the leaning vehicle 1e, for the same reason as described above with respect to the leaning vehicle 1, it is easy to secure the rigidity of the upper-left-arm-member supported part 511, the upper-right-arm-member supported part 531, the lower-left-arm-member supported part 521 and the lower-right-arm-member supported part 541. Furthermore, according to the leaning vehicle 1e, for the same reason as described above with respect to the leaning vehicle 1, the support structure of the upper-left-arm-member supported part 511 and the support structure of the upper-right-arm-member supported part 531 each have high rigidity. In addition, according to the leaning vehicle 1e, for the same reason as described above with respect to the leaning vehicle 1, the rigidity of the frame front part 21f that supports the link mechanism 5 is enhanced.

[Sixth Modification]

Figure 18:
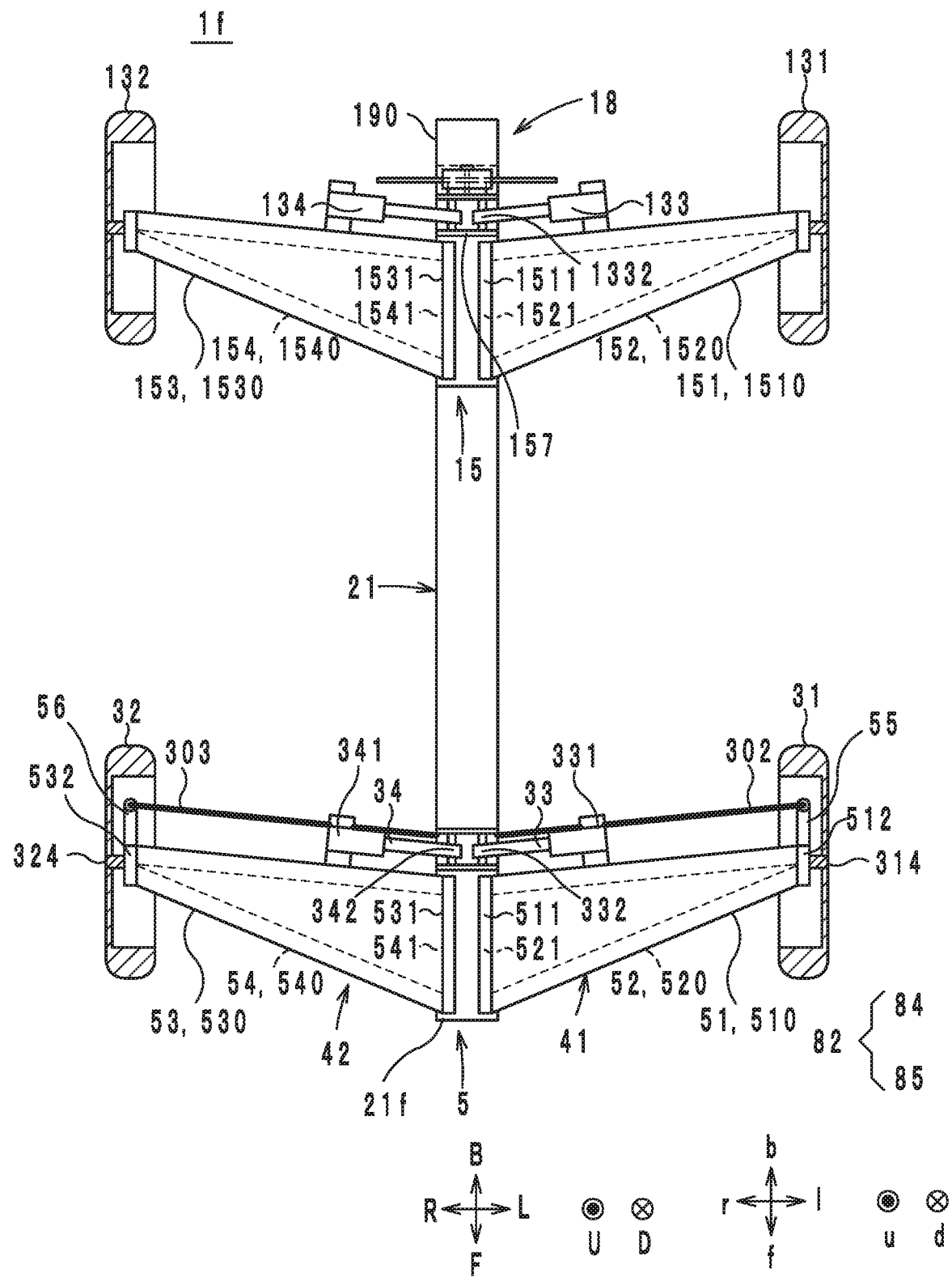
FIG. 18 is a schematic diagram of a leaning vehicle 1f as seen in the downward direction D.

Hereinafter, a leaning vehicle 1f according to a sixth modification will be described with reference to FIG. 18. FIG. 18 is a schematic diagram of the leaning vehicle 1f as seen in the downward direction D. In FIG. 18, to facilitate understanding, a schematic diagram in which the respective components are simplified is illustrated. Therefore, the sizes of the respective components in FIG. 18 differ from the actual sizes thereof.

As illustrated in FIG. 18, the leaning vehicle 1f may be a four-wheeled leaning vehicle having a vehicle body frame that is capable of leaning, two front wheel tire assemblies and two rear wheel tire assemblies. More specifically, the leaning vehicle 1f differs from the leaning vehicle 1 in the respect that the leaning vehicle 1f includes a left rear wheel tire assembly 131, a right rear wheel tire assembly 132, a link mechanism 15, a left shock absorber 133, a right shock absorber 134 and a shock absorber tower 157. The respective structures of the link mechanism 15, the left shock absorber 133, the right shock absorber 134 and the shock absorber tower 157 are the same as the respective structures of the link mechanism 5, the left shock absorber 33, the right shock absorber 34 and the shock absorber tower 57, and hence a description of those structures will be omitted here.

According to the leaning vehicle 1f configured as described above, for the same reason as described above with respect to the leaning vehicle 1, a reduction in size of a mechanism including the shock absorber tower 157 and the link mechanism 15 can be achieved, and the degree of freedom regarding the positions of the left rear wheel tire assembly 131 and the right rear wheel tire assembly 132 in the vehicle body frame 21 can be increased while maintaining the rigidity of the support mechanism for the shock absorber tower 157 in the vehicle body frame 21. Further, according to the leaning vehicle 1f, for the same reason as described above with respect to the leaning vehicle 1, it is easy to secure the rigidity of an upper-left-arm-member supported part 1511, an upper-right-arm-member supported part 1531, a lower-left-arm-member supported part 1521 and a lower-right-arm-member supported part 1541. Furthermore, according to the leaning vehicle 1f, for the same reason as described above with respect to the leaning vehicle 1, the support structure of the upper-left-arm-member supported part 1511 and the support structure of the upper-right-arm-member supported part 1531 each have high rigidity. In addition, according to the leaning vehicle 1f, for the same reason as described above with respect to the leaning vehicle 1, the rigidity of a frame front part that supports the link mechanism 15 is enhanced.

Other Embodiments

The embodiments described and/or illustrated in this specification are described in order to facilitate understanding of the present disclosure, and are not intended to limit the concept of the present disclosure. The above described embodiments may be changed or modified without departing from the gist thereof.

The gist includes equivalent elements, corrections, deletions, combinations (for example, combinations of features spanning over various embodiments), improvements, and alterations that can be recognized by those skilled in the art based on the embodiments disclosed in the present specification. The limitations of the appended claims should be broadly interpreted based on the terms used in the appended claims, and the limitations should not be limited by the embodiments described in the present description or in the prosecution of the present application. The embodiments should be construed as non-exclusive. For example, the terms "preferably" and "may" are non-exclusive in the present specification, meaning "preferable, but not limited to this" and "may be, but not limited to this."

In the leaning vehicles 1 and 1a to 1f, a configuration may be adopted in which the upper-left-arm-member supported part 511 does not extend continuously in the front-back direction between the front end and back end of the upperleft-arm-member supported part 511. In other words, the upper-left-arm-member supported part 511 may be separated into two parts, for example, a front part that includes the front end of the upper-left-arm-member supported part 511, and a back part that includes the back end of the upper-left-arm-member supported part 511. Note that the foregoing description regarding separation of the upper-left-arm-member supported part 511 into two parts similarly applies to the upper-right-arm-member supported part 531, the lower-left-arm-member supported part 521, the lower-right-arm-member supported part 541, the upper-left-arm-member supported part 1511, the upper-right-arm-member supported part 1531, the lower-left-arm-member supported part 1521 and the lower-right-arm-member supported part 1541.

In the leaning vehicle 1f, the left shock absorber 33, the right shock absorber 34, the shock absorber tower 57 (not illustrated in the drawing), the resistance force changing mechanism 8 (not illustrated in the drawing) and the actuator 90 (not illustrated in the drawing) may be disposed further forward in the frontward direction f or further backward in the backward direction b than the upper-left-arm-member supported part 511, the upper-right-arm-member supported part 531, the lower-left-arm-member supported part 521 and the lower-right-arm-member supported part 541. Further, in the leaning vehicle 1f, the left shock absorber 133, the right shock absorber 134, the shock absorber tower 157, a resistance force changing mechanism 18 and an actuator 190 may be disposed further forward in the frontward direction f than the upper-left-arm-member supported part 1511, the upper-right-arm-member supported part 1531, the lower-left-arm-member supported part 1521 and the lower-right-arm-member supported part 1541.

The leaning vehicle 1f may include one front wheel tire assembly instead of two front wheel tire assemblies.

In the leaning vehicle 1f, either one of the link mechanism 5 and the link mechanism 15 need not be a double wishbone-type link mechanism. For example, a parallelogram link-type link mechanism may be mentioned as an example of a link mechanism other than a double wishbone-type link mechanism.

In the leaning vehicles 1 and 1a to 1f, the lower-left arm member 52 includes the lower-left-arm-member main body 520 that is a double-bar-shaped member. However, the lower-left arm member 52 may include the lower-left-arm-member main body 520 that is a plate-like member. The lower-right arm member 54 includes the lower-right-arm-member main body 540 that is a double-bar-shaped member. However, the lower-right arm member 54 may include the lower-right-arm-member main body 540 that is a plate-like member.

In the leaning vehicles 1, 1a and 1c to 1f, the upper-left arm member 51 includes the upper-left-arm-member main body 510 that is a plate-like member. However, the upper-left arm member 51 may include the upper-left-arm-member main body 510 that is a double-bar-shaped member. The upper-right arm member 53 includes the upper-right-arm-member main body 530 that is a plate-like member. However, the upper-right arm member 53 may include the upper-right-arm-member main body 530 that is a double-bar-shaped member.

In the leaning vehicle 1f, a lower-left arm member 152 includes a lower-left-arm-member main body 1520 that is a double-bar-shaped member. However, the lower-left arm member 152 may include the lower-left-arm-member main body 1520 that is a plate-like member. A lower-right arm member 154 includes a lower-right-arm-member main body 1540 that is a double-bar-shaped member. However, the lower-right arm member 154 may include the lower-right-arm-member main body 1540 that is a plate-like member.

In the leaning vehicle 1f, an upper-left arm member 151 includes an upper-left-arm-member main body 1510 that is a plate-like member. However, the upper-left arm member 151 may include the upper-left-arm-member main body 1510 that is a double-bar-shaped member. An upper-right arm member 153 includes an upper-right-arm-member main body 1530 that is a plate-like member. However, the upper-right arm member 153 may include the upper-right-arm-member main body 1530 that is a double-bar-shaped member.

Note that, as illustrated in FIG. 5, the shock absorber tower 57 and the disk support part 85 are constituted by a single member. However, the shock absorber tower 57 and the disk support part 85 may be constituted by separate members. Further, the disk contact part 84 and the disk support part 85 may be constituted by a single member.

Note that, normally, when the vehicle body frame 21 is in an upright state, the position in the up-down direction ud of the second end part 332 of the left shock absorber 33 and the position in the up-down direction ud of the second end part 342 of the right shock absorber 34 are the same. Therefore, the distance L1 in the up-down direction ud between the tower central shaft 92 and the second end part 332 of the left shock absorber 33 or between the tower central shaft 92 and the second end part 342 of the right shock absorber 34 is the distance between the tower central shaft 92 and a straight line linking the second end part 332 of the left shock absorber 33 and the second end part 342 of the right shock absorber 34. Hence, it suffices that the distance between the tower central shaft 92 and the straight line linking the second end part 332 of the left shock absorber 33 and the second end part 342 of the right shock absorber 34 is longer than the distance L2 in the left-right direction lr between the second end part 332 of the left shock absorber 33 and the second end part 342 of the right shock absorber 34.

However, when the vehicle body frame 21 is in an upright state, there are some cases where the position in the up-down direction ud of the second end part 332 of the left shock absorber 33 and the position in the up-down direction ud of the second end part 342 of the right shock absorber 34 are different. First, a case will be described in which the second end part 332 of the left shock absorber 33 is located further downward in the downward direction d than the second end part 342 of the right shock absorber 34. In this case, it suffices that the shock absorber tower 57 has a shape such that, when the vehicle body frame 21 is in an upright state, the distance L1 in the up-down direction ud between the tower central shaft 92 and the second end part 332 of the left shock absorber 33 is longer than the distance L2 in the left-right direction lr between the second end part 332 of the left shock absorber 33 and the second end part 342 of the right shock absorber 34. Next, a case in which the second end part 342 of the right shock absorber 34 is located further downward in the downward direction d than the second end part 332 of the left shock absorber 33 will be described as an example. In this case, it suffices that the shock absorber tower 57 has a shape such that, when the vehicle body frame 21 is in an upright state, the distance L1 in the up-down direction ud between the tower central shaft 92 and the second end part 342 of the left shock absorber 34 is longer than the distance L2 in the left-right direction lr between the second end part 332 of the left shock absorber 33 and the second end part 342 of the right shock absorber 34.

Further, the shock absorber tower 57 is constituted by a single bar-shaped member. However, the shock absorber tower 57 may be constituted by a combination of a plurality of members. More specifically, the shock absorber tower 57 may include, for example, a tower part, a right link part and a left link part. The tower part is a member that, when the vehicle body frame 21 is in an upright state, extends in the up-down direction ud. The left link part is supported by a top end part of the tower part. The left link part can rotate around a left-link support shaft that extends in the front-back direction fb. The right link part is supported by the top end part of the tower part. The right link part can rotate around a right-link support shaft that extends in the front-back direction fb. The left link part and the right link part are arranged side-by-side in that order from left to right at the top end part of the tower part. The second end part 332 of the left shock absorber 33 is connected to the left link part. The second end part 342 of the right shock absorber 34 is connected to the right link part.

REFERENCE SIGNS LIST 1, 1a to 1f: Leaning Vehicle
3: Steering Mechanism
4: Rear Wheel tire assembly
5, 15: Link Mechanism
8, 18: Resistance Force Changing Mechanism
21: Vehicle Body Frame
21c: Actuator Support Part
21f: Frame Front Part
21m: Main Frame
21s: Caliper Support Part
21ud: Up-down Frame Part
31: Left Front Wheel tire assembly
32: Right Front Wheel tire assembly
33, 133: Left Shock Absorber
34, 134: Right Shock Absorber
41: Left Arm Mechanism
42: Right Arm Mechanism
51, 151: Upper-left Arm Member
52, 152: Lower-left Arm Member
53, 153: Upper-right Arm Member
54, 154: Lower-right Arm Member
55: Left Knuckle
56: Right Knuckle
57, 157: Shock Absorber Tower
82: Disk
83: Caliper
84: Disk Contact Part
85: Disk Support Part
90, 190: Actuator
92: Tower Central Shaft
131: Left Rear Wheel tire assembly
132: Right Rear Wheel tire assembly
301: Handle
302: Left Tie Rod
303: Right Tie Rod
314: Left Front Wheel tire assembly Axle
324: Right Front Wheel tire assembly Axle
511, 1511, 512: Upper-left-arm-member Supported Part
521, 1521, 522: Lower-left-arm-member Supported Part
531, 1531, 532: Upper-right-arm-member Supported Part
541, 1541, 542: Lower-right-arm-member Supported Part

What is claimed is:

1. A leaning vehicle, comprising:
   a vehicle body frame that leans in a leaning-vehicle leftward direction at a time of turning left, and leans in a leaning-vehicle rightward direction at a time of turning right;
   a link mechanism that is a double wishbone link mechanism, the link mechanism including
      a left arm mechanism including:
         an upper-left arm member that is supported by the vehicle body frame so as to rotate about an axis extending in a vehicle-body-frame front-back direction centering on a right part of the upper-left arm member;
         a lower-left arm member that is disposed further downward in a vehicle body-frame downward direction than the upper-left arm member and is supported by the vehicle body frame so as to rotate about an axis extending in the vehicle-body-frame front-back direction centering on a right part of the lower-left arm member; and
         a left connection member that is connected to a left part of the upper-left arm member and a left part of the lower-left arm member, wherein
      the left arm mechanism swings in a vehicle-body-frame upward direction when the vehicle body frame leans in the leaning-vehicle leftward direction and swings in the vehicle-body-frame downward direction when the vehicle body frame leans in the leaning-vehicle rightward direction; and
      a right arm mechanism including:
         an upper-right arm member that is supported by the vehicle body frame so as to rotate about an axis extending in the vehicle-body-frame front-back direction centering on a left part of the upper-right arm member;
         a lower-right arm member that is disposed further downward in the vehicle-body-frame downward direction than the upper-right arm member and is supported by the vehicle body frame so as to rotate about an axis extending in the vehicle body frame front back direction centering on a left part of the lower-right arm member; and
         a right connection member that is connected to a right part of the upper-right arm member and a right part of the lower-right arm member, wherein
      the right arm mechanism swings in the vehicle-body-frame upward direction when the vehicle body frame leans in the leaning-vehicle rightward direction and swings in the vehicle-body-frame downward direction when the vehicle body frame leans in the leaning vehicle leftward direction;
   a left shock absorber having a cushioning action, with a first end part of the left shock absorber being connected to the left arm mechanism;
   a right shock absorber having a cushioning action, with a first end part of the right shock absorber being connected to the right arm mechanism;
   a shock absorber tower to which a second end part of the left shock absorber and a second end part of the right shock absorber are connected, the shock absorber tower being supported by the vehicle body frame so as to rotate around a tower central shaft that extends in the vehicle-body-frame front-back direction, the shock absorber tower having a shape in which, when the vehicle body frame is in an upright state, a distance in a vehicle-body-frame up-down direction between the tower central shaft and the second end part of the left shock absorber or the second end part of the right shock absorber is longer than a distance in a vehicle-body-frame left right direction between the second end part of the left shock absorber and the second end part of the right shock absorber;

a left wheel tire assembly that is rotatably supported by the left connection member; and a right wheel tire assembly that is rotatably supported by the right connection member, wherein the vehicle body frame includes a first frame part supporting the link mechanism and being rotatable with respect to the shock absorber tower, wherein the leaning vehicle has a structure of (A) or (B):

(A)

the upper-left arm member includes; a first-upper-left-arm-member supported part at which the upper-left arm member to which the first end part of the left shock absorber is connected is supported by the vehicle body frame, and a second-upper-left-arm-member supported part located at a left end part of the upper-left arm member, wherein a length in the front-back direction of the second-upper-left-arm-member supported part is shorter than a length in the front-back direction of the first-upper-left-arm-member supported part; and the upper-right arm member includes: a first-upper-right-arm-member supported part at which the upper-right arm member to which the first end part of the right shock absorber is connected is supported by the vehicle body frame, and a second-upper-right-arm-member supported part located at a right end part of the upper-right arm member, wherein a length in the front-back direction of the second-upper-right-arm-member supported part is shorter than a length in the front-back direction of the first-upper-right-arm-member supported part; or (B)

the lower-left arm member includes; a first-lower-left-arm-member supported part at which the lower-left arm member to which the first end part of the left shock absorber is connected is supported by the vehicle body frame, and a second-lower-left-arm-member supported part located at a left end part of the lower-left arm member, wherein a length in the front-back direction of the second-lower-left-arm-member supported part is shorter than a length in the front-back direction of the first-lower-left-arm-member supported part; and the lower-right arm member includes: a first-lower-right-arm-member supported part at which the lower-right arm member to which the first end part of the right shock absorber is connected is supported by the vehicle body frame, and a second-lower-right-arm-member supported part located at a right end part of the lower-right arm member, wherein a length in the front-back direction of the second-lower-right-arm-member supported part is shorter than a length in the front-back direction of the first-lower-right-arm-member supported part;

wherein in the case where the leaning vehicle has the structure of (A):

the shock absorber tower is disposed further forward in a vehicle-body-frame frontward direction or further backward in a vehicle-body-frame backward direction than the first-upper-left-arm-member supported part and the first-upper-right-arm-member supported part so that the movable range of the shock absorber tower is separated from a movable range of the left arm mechanism and movable range of the right arm mechanism in the vehicle-body-frame front-back direction, and the shock absorber tower is supported at a portion other than a portion located between a front end and back end of the first-upper-left-arm-member supported part and a portion located between a front end and back end of the first-upper-right-arm-member supported part in the vehicle body frame; or wherein in the case where the leaning vehicle has the structure of (B):

the shock absorber tower is disposed further forward in a vehicle-body-frame frontward direction or further backward in a vehicle-body-frame backward direction than the first-lower-left-arm-member supported part and the first-lower-right-arm-member supported part so that the movable range of the shock absorber tower is separated from a movable range of the left arm mechanism and movable range of the right arm mechanism in the vehicle-body-frame front-back direction, and the shock absorber tower is supported at a portion other than a portion located between a front end and back end of the first-lower-left-arm-member supported part and a portion located between a front end and back end of the first-lower-right-arm-member supported part in the vehicle body frame.

2. The leaning vehicle according to claim 1, wherein:

the leaning vehicle has the structure of (A);

a length in the vehicle-body-frame front-back direction between the front end of the first-upper-left-arm-member supported part and the back end of the first-upper-left-arm-member supported part is shorter than a radius of a tire of the left wheel tire assembly; and a length in the vehicle-body-frame front-back direction between the front end of the first-upper-right-arm-member supported part and the back end of the first-upper-right-arm-member supported part is shorter than a radius of a tire of the right wheel tire assembly.

3. The leaning vehicle according to claim 1, wherein:

the leaning vehicle has the structure of (B);

a length in the vehicle-body-frame front-back direction between the front end of the first-lower-left-arm-member supported part and the back end of the first-lower-left-arm-member supported part is shorter than a radius of a tire of the left wheel tire assembly; and a length in the vehicle-body-frame front-back direction between a front end of the first-lower-right-arm-member supported part and a back end of the first-lower-right-arm-member supported part is shorter than a radius of a tire of the right wheel tire assembly.

4. The leaning vehicle according to claim 1, wherein:

the leaning vehicle has the structure of (A);

a length in the vehicle-body-frame front-back direction between the front end of the first-upper-left-arm-member supported part and the back end of the first-upper-left-arm-member supported part is shorter than a diameter of a wheel of the left wheel tire assembly; and a length in the vehicle-body-frame front-back direction between the front end of the first-upper-right-arm-member supported part and the back end of the first-upper-right-arm-member supported part is shorter than a diameter of a wheel of the right wheel tire assembly.

5. The leaning vehicle according to claim 1, wherein:

the leaning vehicle has the structure of (B);

a length in the vehicle-body-frame front-back direction between the front end of the first-lower-left-arm-member supported part and the back end of the first-lower-left-arm-member supported part is shorter than a diameter of the wheel of the left wheel tire assembly; and a length in the vehicle-body-frame front-back direction between a front end of the first-lower-right-arm-member supported part and a back end of the first-lowerright-arm-member supported part is shorter than a diameter of the wheel of the right wheel tire assembly.

6. The leaning vehicle according to claim 1, wherein:

the leaning vehicle has the structure of (A);

a length in the vehicle-body-frame front-back direction between the front end of the first-upper-left-arm-member supported part and the back end of the first upper-left-arm-member supported part is shorter than a length equivalent to three times a diameter of the left shock absorber; and a length in the vehicle-body-frame front-back direction between the front end of the first-upper-right-arm-member supported part and the back end of the first-upper-right-arm-member supported part is shorter than a length equivalent to three times a diameter of the right shock absorber.

7. The leaning vehicle according to claim 1, wherein:

the leaning vehicle has the structure of (B);

a length in the vehicle-body-frame front-back direction between the front end of the first-lower-left-arm-member supported part and the back end of the first-lower-left-arm-member supported part is shorter than a length equivalent to three times a diameter of the left shock absorber; and a length in the vehicle-body-frame front-back direction between a front end of the first-lower-right-arm-member supported part and a back end of the first-lower-right-arm-member supported part is shorter than a length equivalent to three times a diameter of the right shock absorber.

8. The leaning vehicle according to claim 1, wherein:

the leaning vehicle has the structure of (A);

the upper-left arm member extends continuously in the vehicle-body-frame front-back direction between the front end of the first-upper-left-arm-member supported part and the back end of the first-upper-left-arm-member supported part; and the upper-right arm member extends continuously in the vehicle-body-frame front-back direction between the front end of the first-upper-right-arm-member supported part and the back end of the first-upper-right-arm-member supported part.

9. The leaning vehicle according to claim 1, wherein:

the leaning vehicle has the structure of (B);

the lower-left arm member extends continuously in the vehicle-body-frame front-back direction between the front end of the first-lower-left-arm-member supported part and the back end of the first-lower-left-arm-member supported part; and the lower-right arm member extends continuously in the vehicle-body-frame front-back direction between a front end of the first-lower-right-arm-member supported part and a back end of the first-lower-right-arm-member supported part.

10. The leaning vehicle according to claim 1, wherein:

the leaning vehicle has the structure of (A); and the vehicle body frame includes an up-down frame part that extends in the vehicle-body-frame up-down direction between the shock absorber tower and the back end of the first-upper-left-arm-member supported part and between the shock absorber tower and the back end of the first-upper-right-arm-member supported part.

11. The leaning vehicle according to claim 1, wherein:

the leaning vehicle has the structure of (B); and the vehicle body frame includes an up-down frame part that extends in the vehicle-body-frame up-down direction between the shock absorber tower and the back end of the first-lower-left-arm-member supported part and between the shock absorber tower and a back end of the first-lower-right-arm-member supported part.

12. The leaning vehicle according to claim 1, further comprising:

an actuator that generates a force which causes the vehicle body frame to lean in the leaning-vehicle leftward direction at the time of turning left, and generates a force which causes the vehicle body frame to lean in the leaning-vehicle rightward direction at the time of turning right.

13. The leaning vehicle according to claim 1, wherein:

the leaning vehicle does not further comprise an actuator that generates a force which causes the vehicle body frame to lean in the leaning-vehicle leftward direction at the time of turning left, and generates a force which causes the vehicle body frame to lean in the leaning-vehicle rightward direction at the time of turning right.

14. The leaning vehicle according to claim 1, wherein:

a part of the vehicle body frame which is plate-shaped that extends in the vehicle-body-frame up-down direction is provided between the first-upper-left-arm-member supported part and the first-upper-right-arm-member supported part, and between the first-lower-left-arm-member supported part and the first-lower-right-arm-member supported part.

* * * * *